(12) United States Patent
Tang et al.

(10) Patent No.: US 8,736,978 B2
(45) Date of Patent: May 27, 2014

(54) SINGLE FOCUS OPTICAL IMAGE CAPTURING SYSTEM

(71) Applicant: Largan Precision Co., Ltd., Taichung (TW)

(72) Inventors: Hsiang-Chi Tang, Taichung (TW); Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 81 days.

(21) Appl. No.: 13/661,307

(22) Filed: Oct. 26, 2012

(65) Prior Publication Data

US 2013/0342919 A1    Dec. 26, 2013

(30) Foreign Application Priority Data

Jun. 26, 2012   (TW) .............................. 101122839 A

(51) Int. Cl.
  *G02B 3/02*  (2006.01)
  *G02B 13/00* (2006.01)
(52) U.S. Cl.
  CPC .................................. *G02B 13/0045* (2013.01)
  USPC .......................................................... 359/714
(58) Field of Classification Search
  CPC .................................................. G02B 13/0045
  USPC .......................................................... 359/714
  See application file for complete search history.

(56) References Cited

U.S. PATENT DOCUMENTS

2003/0223123 A1 * 12/2003 Abe ............................. 359/680
2013/0107376 A1 *  5/2013 Tsai et al. .................... 359/714

* cited by examiner

*Primary Examiner* — James Jones
(74) *Attorney, Agent, or Firm* — CKC & Partners Co., Ltd.

(57) ABSTRACT

A single focus optical image capturing system includes, in order from an object side to an image side, a first lens element, a second lens element, a third lens element, a fourth lens element and a fifth lens element. The first lens element with positive refractive power has a convex object-side surface. The second lens element has negative refractive power. The third lens element has refractive power. The fourth lens element with refractive power has an object-side surface and an image-side surface being aspheric. The fifth lens element with refractive power has a concave image-side surface, wherein an object-side surface and the image-side surface of the fifth lens element are aspheric, and the fifth lens element has at least one inflection point on at least one of the object-side surface and the image-side surface thereof.

25 Claims, 52 Drawing Sheets

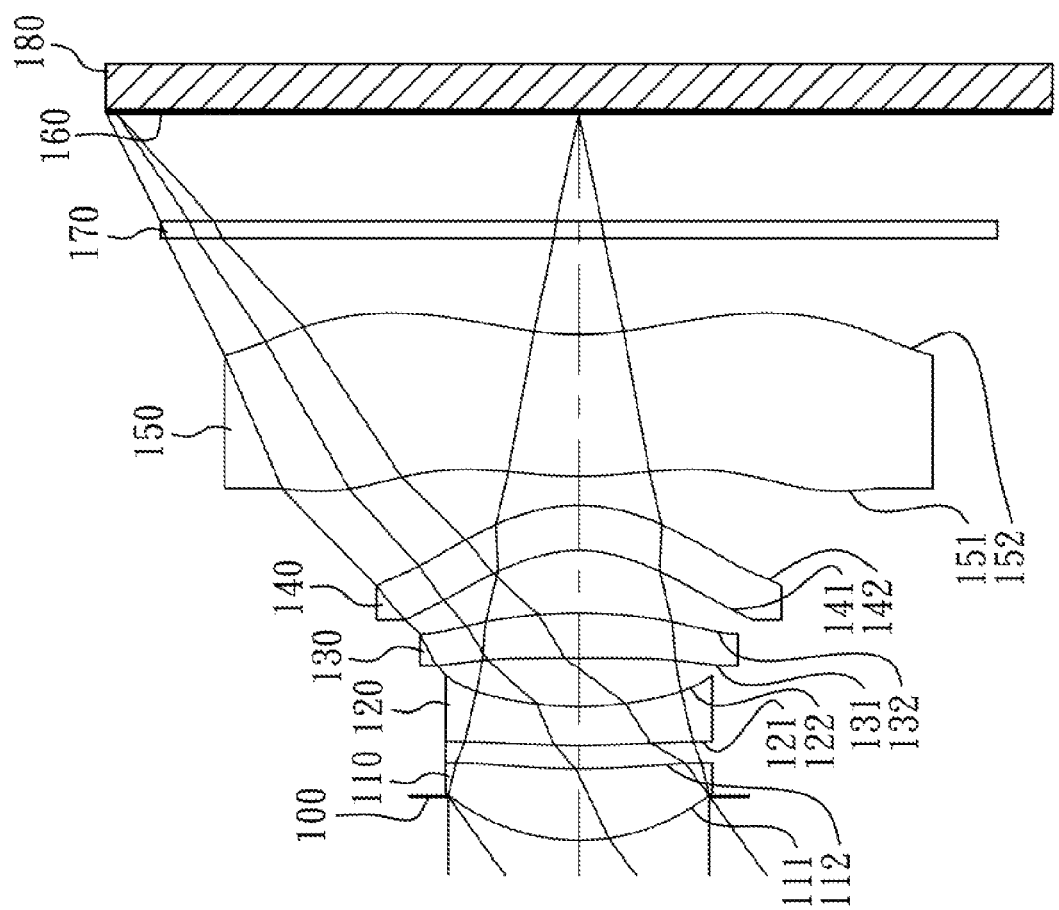

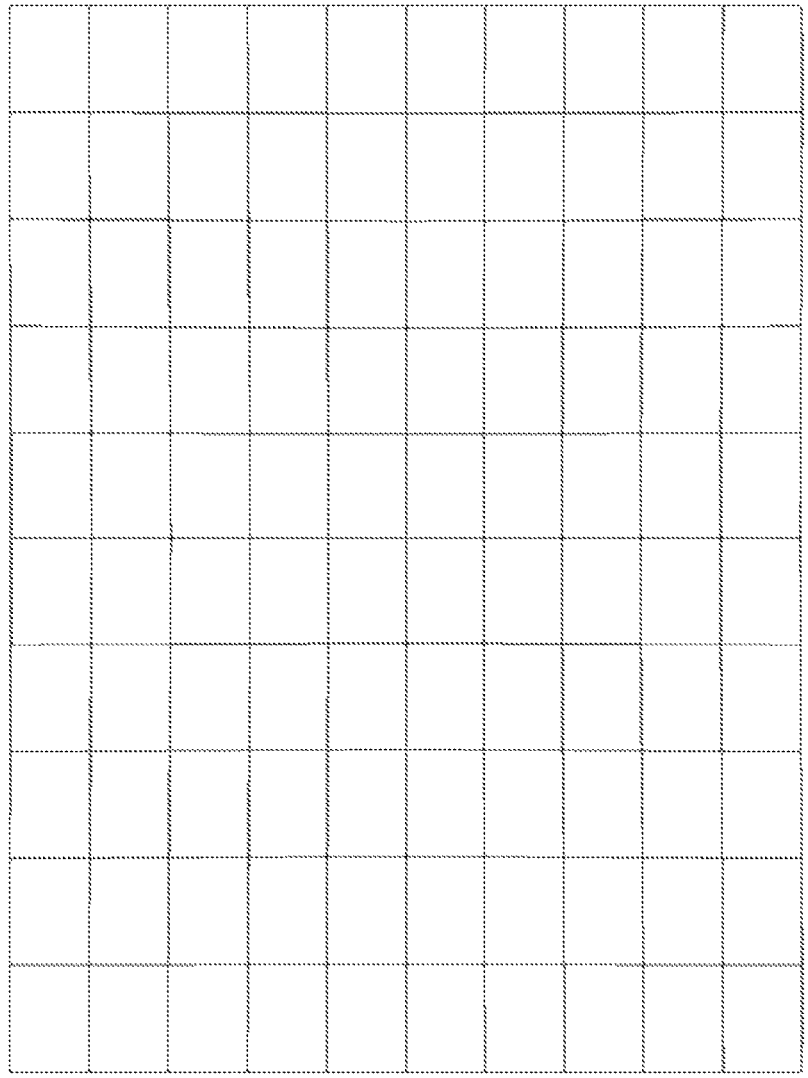
Fig. 1B  TVDi = 0.293%

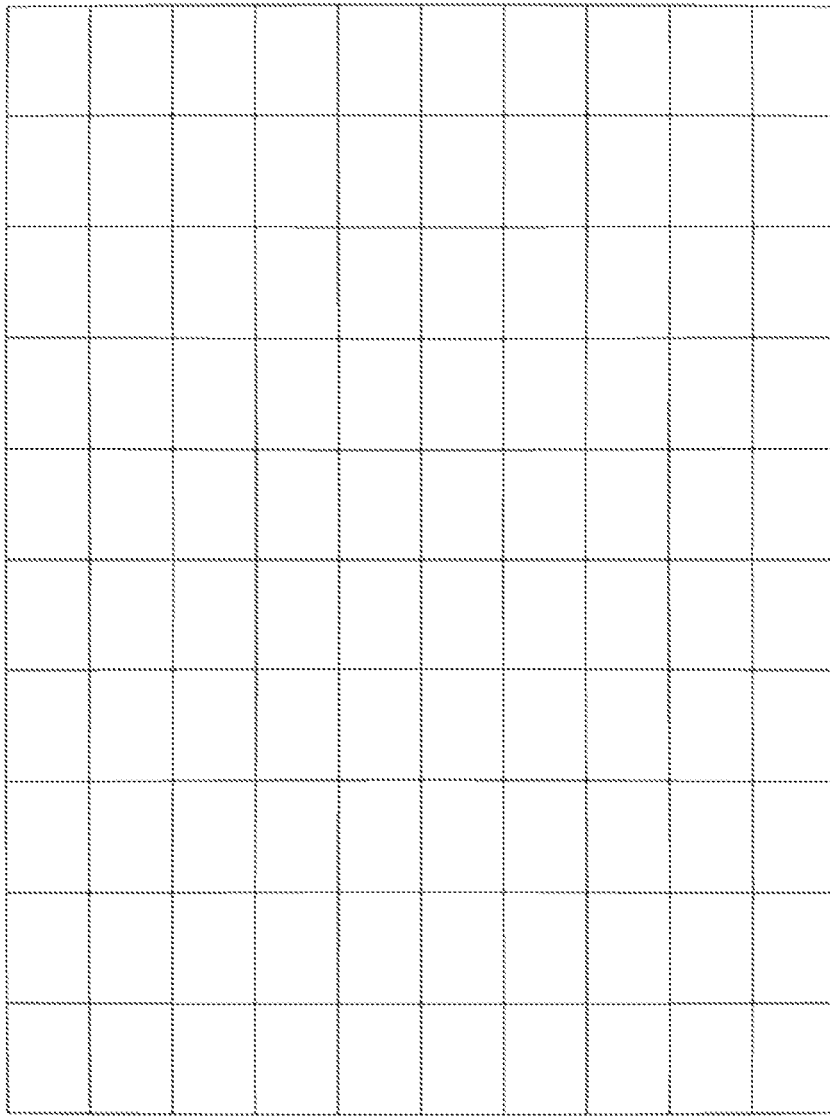
Fig. 1D  TVDm = -0.438%

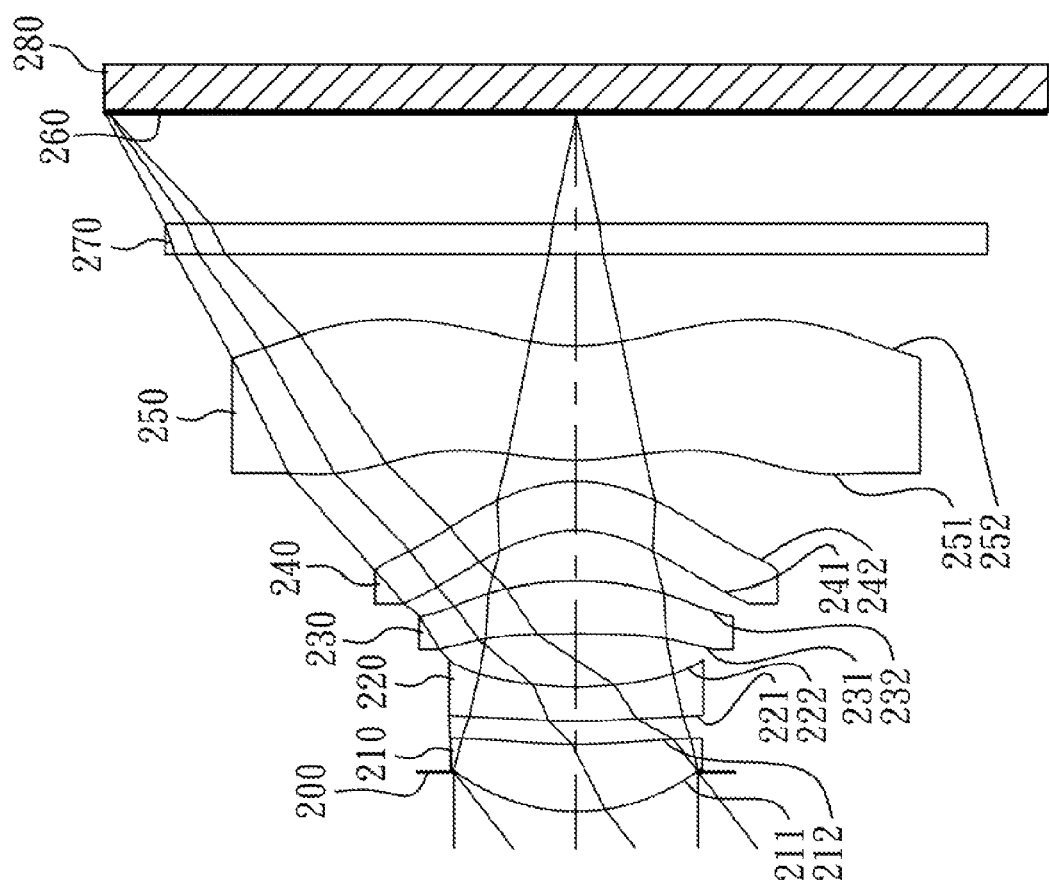

TVDi = 0.070%

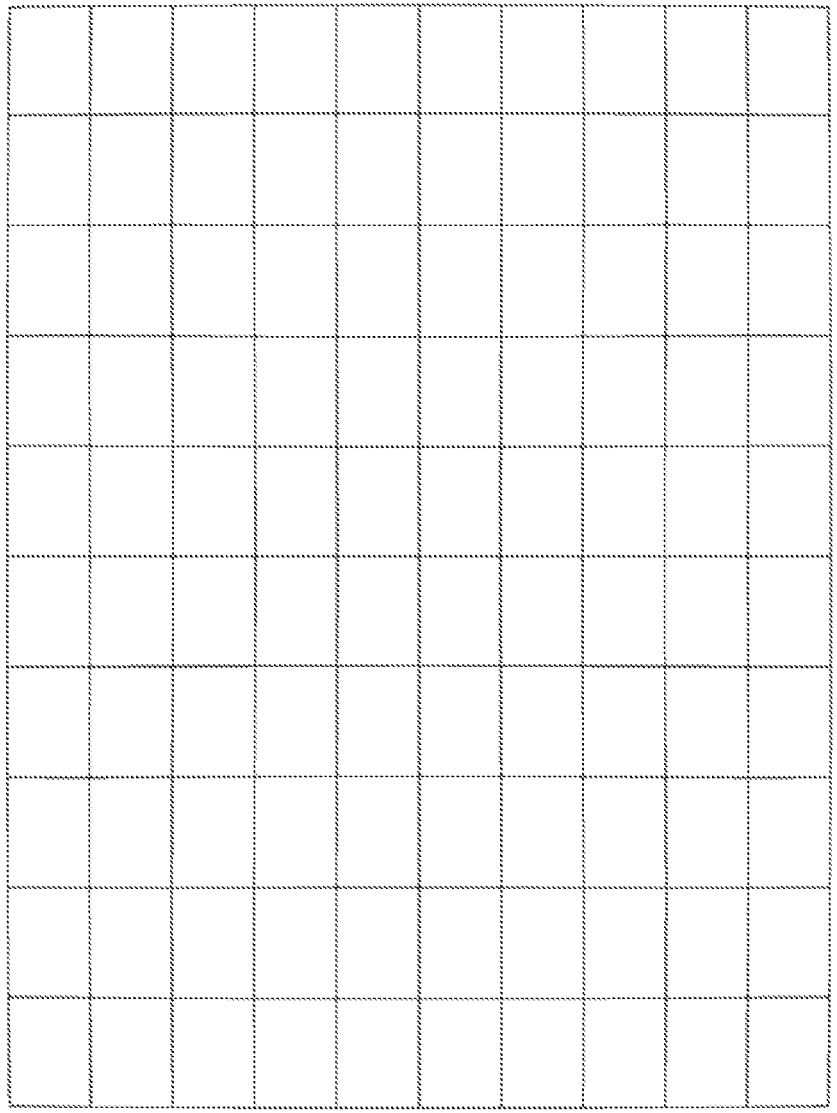
Fig. 2D  TVDm = -0.627%

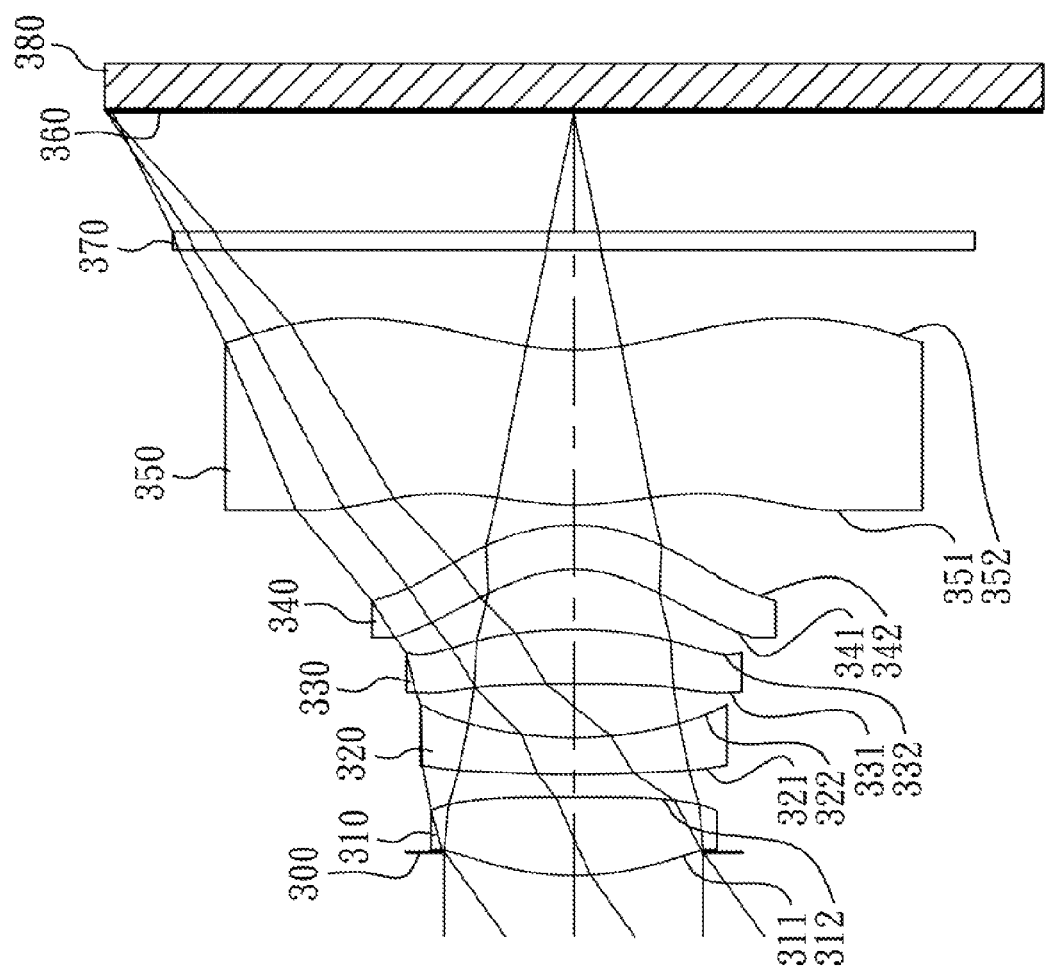

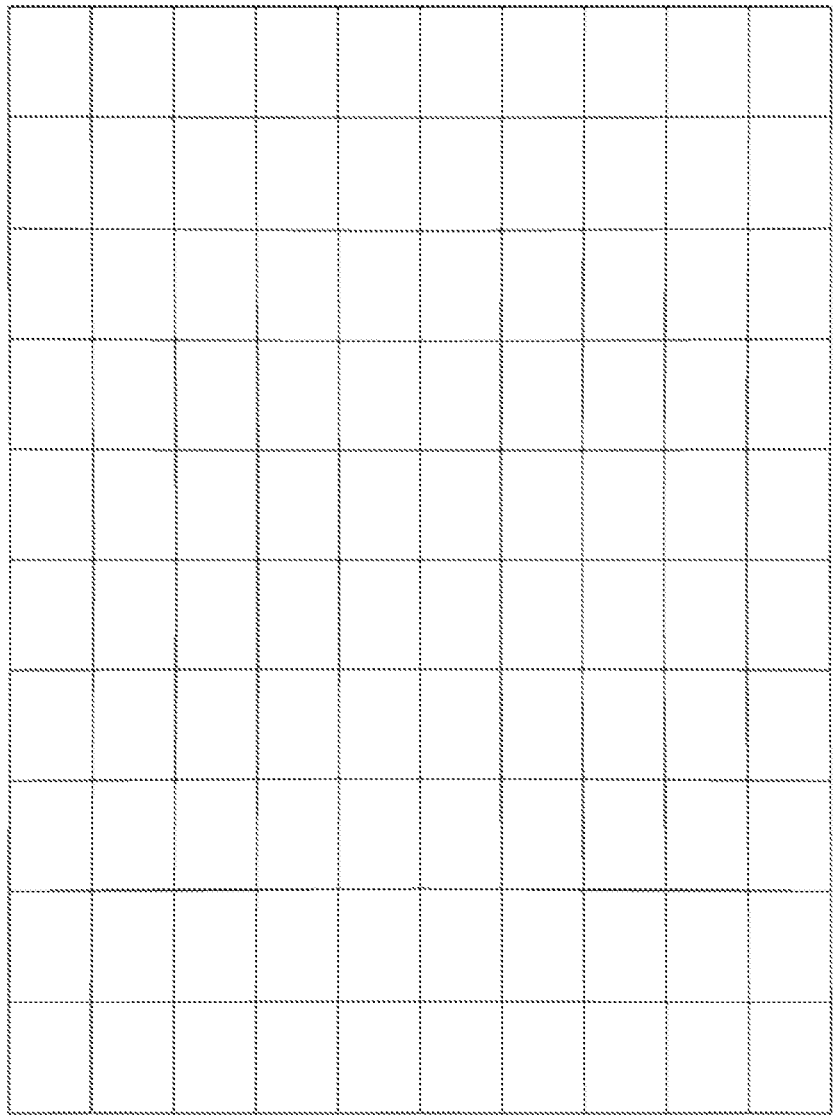
Fig. 3B   TVDi = 0.304%

TVDm = -0.379%

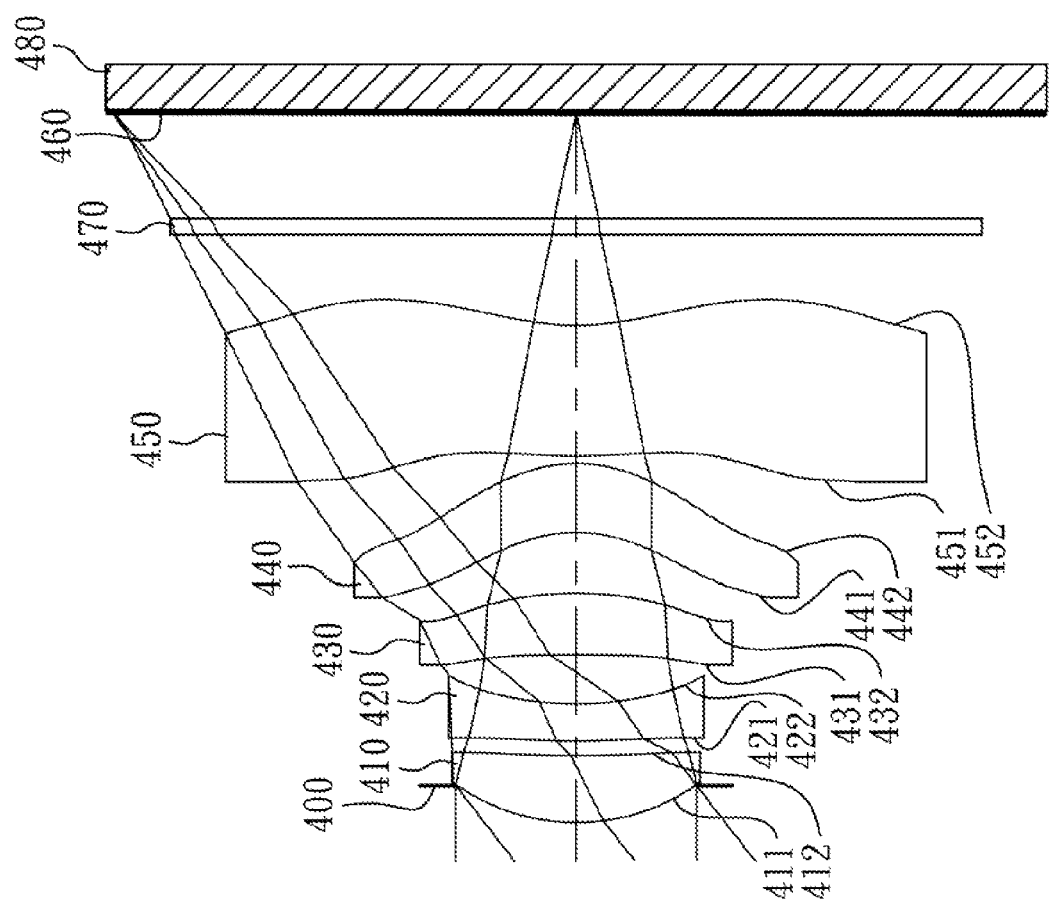

TVDi = 0.239%

TVDm = -0.516%

TVDm = -0.694%

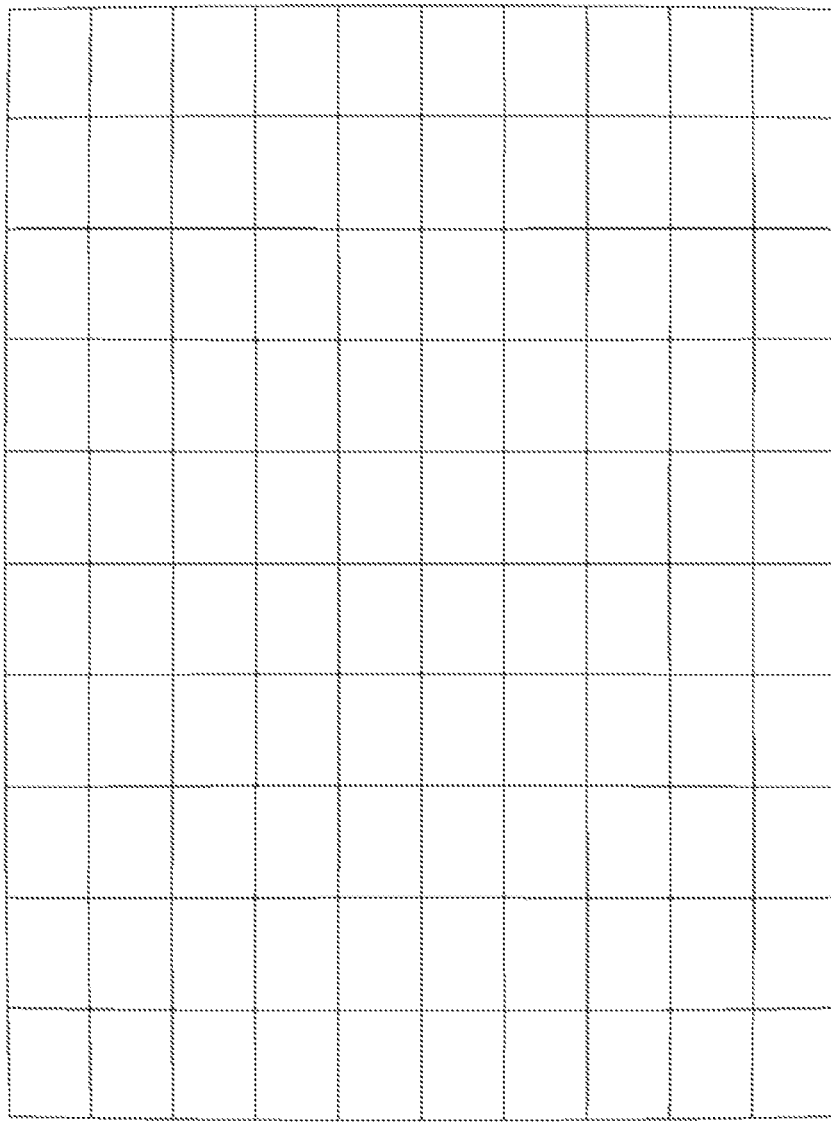
Fig. 6D  TVDm = -1.038%

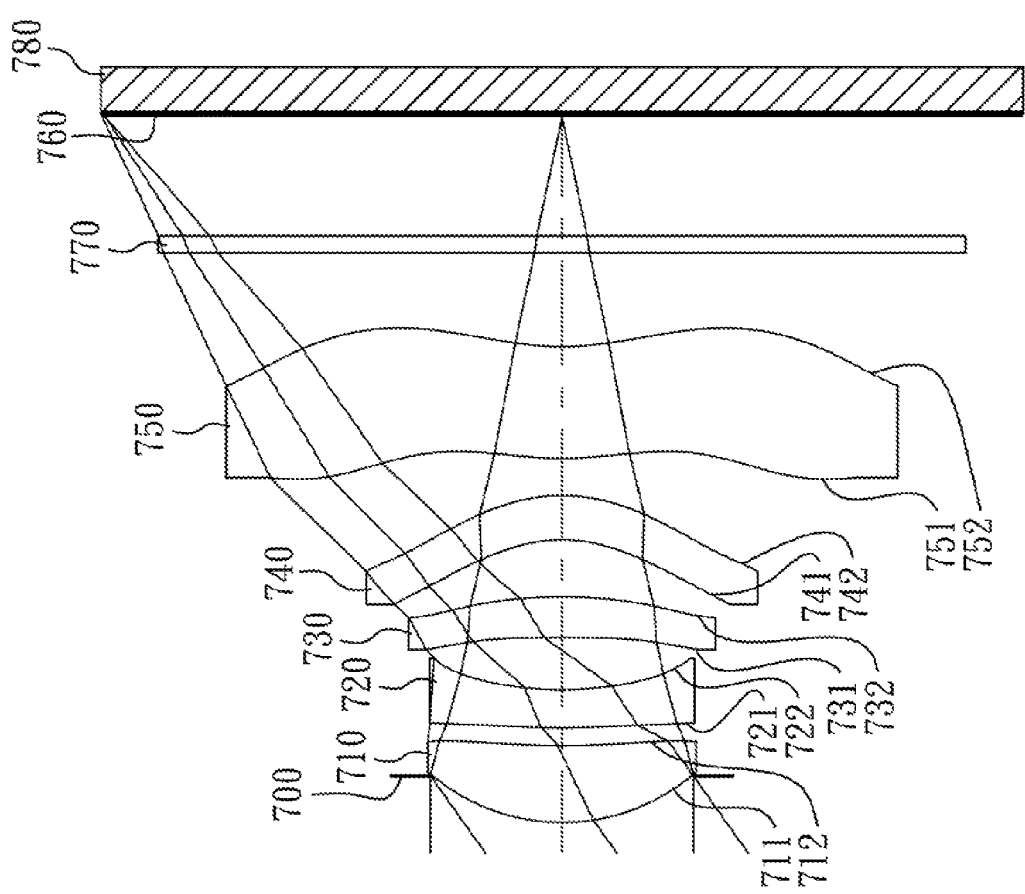

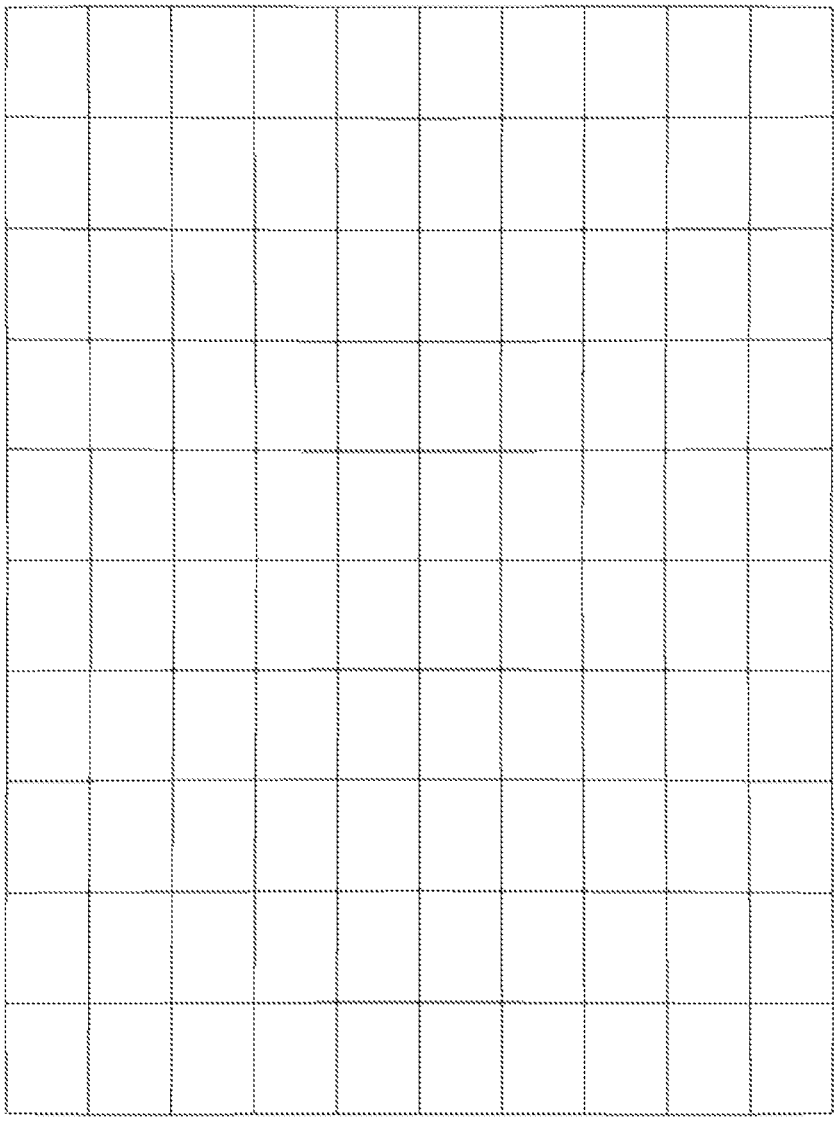
Fig. 7B  TVDi = 0.199%

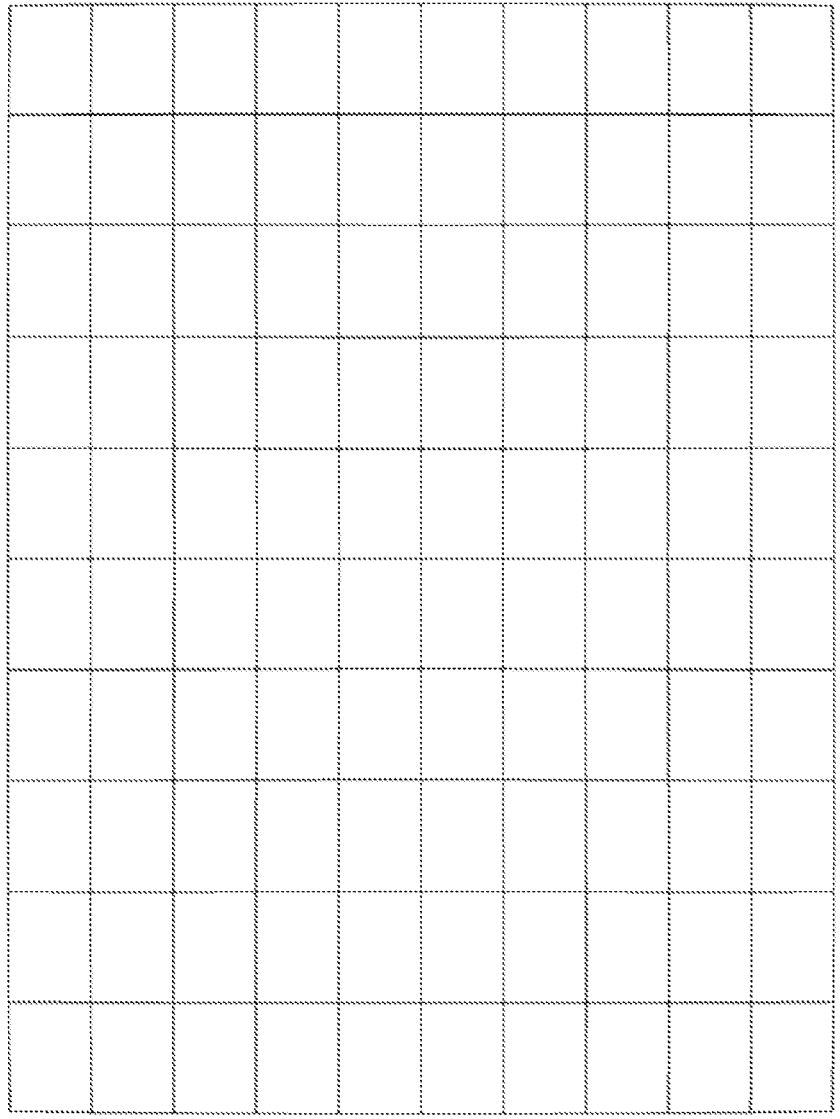
Fig. 7D  TVDm = -0.495%

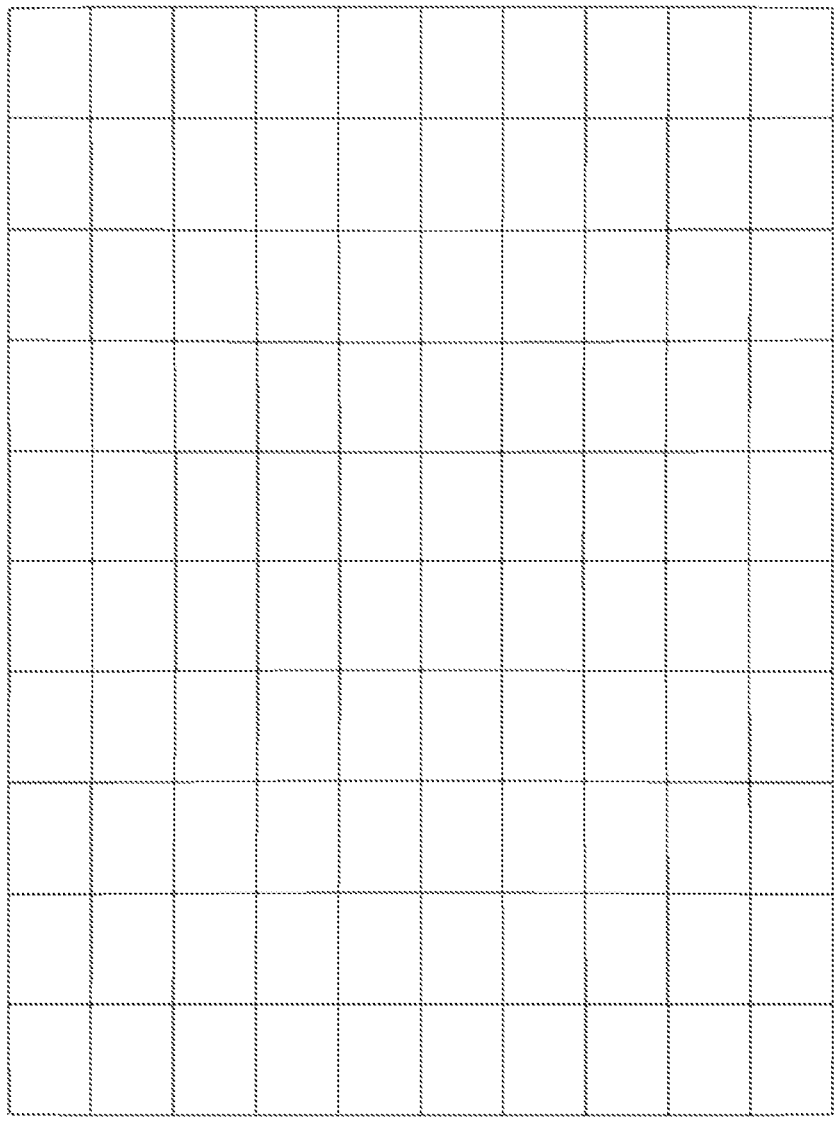
Fig. 8B  TVDi = -0.051%

TVDm = -1.042%

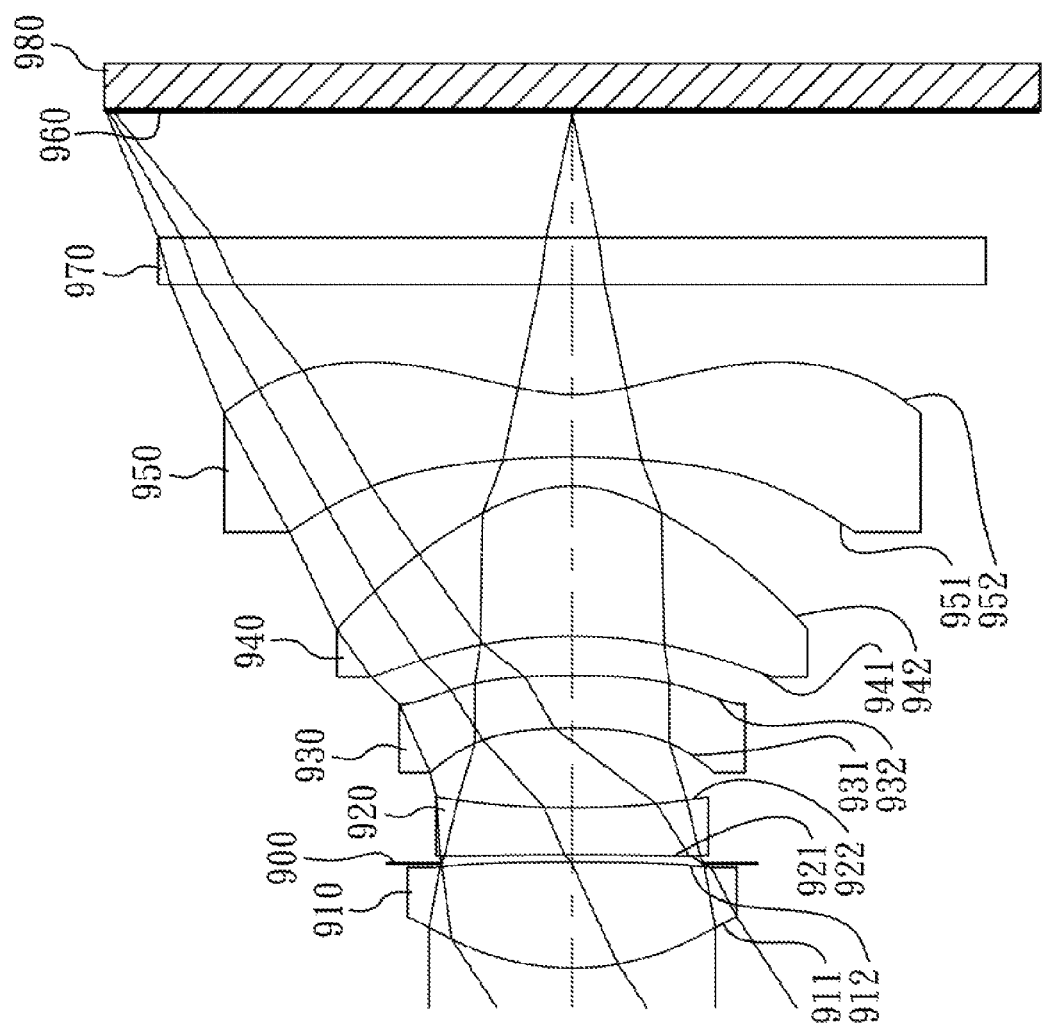

TVDi = 0.122%

TVDm = -0.921%

TVDm = -1.268%

SINGLE FOCUS OPTICAL IMAGE CAPTURING SYSTEM

RELATED APPLICATIONS

The application claims priority to Taiwan Application Serial Number 101122839, filed Jun. 26, 2012, which is herein incorporated by reference.

BACKGROUND

1. Technical Field

The present invention relates to a single focus optical image capturing system. More particularly, the present invention relates to a compact single focus optical image capturing system applicable to electronic products.

2. Description of Related Art

In recent years, with the popularity of mobile products with camera functionalities, the demand of optical lens systems is increasing. The sensor of a conventional photographing camera is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical lens systems have gradually evolved toward the field of higher megapixels, there is an increasing demand for compact optical lens systems featuring better image quality.

In an optical lens system, a TV distortion doesn't affect the image clarity but causes the image shape distortion. The TV distortion of a conventional fixed-focus camera is usually maintained within 3%. When the TV distortion is greater than 3%, it will be apparent to human eyes. However, the level of difficulty for maintaining the TV distortion increases with the size of the image. Furthermore, when a conventional fixed-focus camera is employed for both close-up photographing and long distance photographing, the conventional fixed-focus camera can not offer the desired TV distortion for both close-up photographing and long distance photographing.

The TV distortion condition of a conventional single focus camera is commonly designed for satisfying long distance photographing such as the one disclosed in U.S. Pat. No. 8,000,031, as a result, a high TV distortion is generated for close-up photographing. The demand for close-up photographing increases rapidly nowadays, the aforementioned single focus camera no longer satisfies consumers. The TV distortion condition should be designed for satisfying both close-up photographing and long distance photographing, thus high image quality can be obtained for both close-up photographing and long distance photographing.

SUMMARY

According to one aspect of the present disclosure, a single focus optical image capturing system includes, in order from an object side to an image side, a first lens element, a second lens element, a third lens element, a fourth lens element and a fifth lens element. The first lens element with positive refractive power has a convex object-side surface. The second lens element has negative refractive power. The third lens element has refractive power. The fourth lens element with refractive power has an object-side surface and an image-side surface being aspheric. The fifth lens element with refractive power has a concave image-side surface, wherein an object-side surface and the image-side surface of the fifth lens element are aspheric, and the fifth lens element has at least one inflection point on at least one of the object-side surface and the image-side surface thereof. When a TV distortion for close-up photographing of the single focus optical image capturing system is TVDm, and a TV distortion for long distance photographing of the single focus optical image capturing system is TVDi, the following relationships are satisfied:

$|TVDi-TVDm|<1.5\%;$ $|TVDi|<1.5\%;$ and $|TVDm|<1.5\%.$

According to another aspect of the present disclosure, a single focus optical image capturing system includes, in order from an object side to an image side, a first lens element, a second lens element, a third lens element, a fourth lens element and a fifth lens element. The first lens element with positive refractive power has a convex object-side surface. The second lens element has negative refractive power. The third lens element has refractive power. The fourth lens element with refractive power has a concave object-side surface and a convex image-side surface, wherein the object-side surface and the image-side surface of the fourth lens element are aspheric. The fifth lens element with refractive power has a concave image-side surface, wherein an object-side surface and the image-side surface of the fifth lens element are aspheric and the fifth lens element has at least one inflection point on at least one of the object-side surface and the image-side surface thereof. When a TV distortion for close-up photographing of the single focus optical image capturing system is TVDm, and a TV distortion for long distance photographing of the single focus optical image capturing system is TVDi, the following relationship is satisfied:

$|TVDi-TVDm|<1.0\%.$

BRIEF DESCRIPTION OF THE DRAWINGS

The disclosure can be more fully understood by reading the following detailed description of the embodiment, with reference made to the accompanying drawings as follows:

FIG. 1A is a schematic view of a single focus optical image capturing system according to the 1st embodiment of the present disclosure;

FIG. 1B shows a TV distortion for long distance photographing of the single focus optical image capturing system according to the 1st embodiment;

FIG. 1D shows a TV distortion for close-up photographing of the single focus optical image capturing system according to the 1st embodiment;

FIG. 2A is a schematic view of a single focus optical image capturing system according to the 2nd embodiment of the present disclosure;

FIG. 2D shows a TV distortion for close-up photographing of the single focus optical image capturing system according to the 2nd embodiment;

FIG. 3A is a schematic view of a single focus optical image capturing system according to the 3rd embodiment of the present disclosure;

FIG. 3B shows a TV distortion for long distance photographing of the single focus optical image capturing system according to the 3rd embodiment;

FIG. 4A is a schematic view of a single focus optical image capturing system according to the 4th embodiment of the present disclosure;

FIG. 6D shows a TV distortion for close-up photographing of the single focus optical image capturing system according to the 6th embodiment;

FIG. 7A is a schematic view of a single focus optical image capturing system according to the 7th embodiment of the present disclosure;

FIG. 7B shows a TV distortion for long distance photographing of the single focus optical image capturing system according to the 7th embodiment;

FIG. 7D shows a TV distortion for close-up photographing of the single focus optical image capturing system according to the 7th embodiment;

FIG. 8B shows a TV distortion for long distance photographing of the single focus optical image capturing system according to the 8th embodiment;

FIG. 9A is a schematic view of a single focus optical image capturing system according to the 9th embodiment of the present disclosure;

DETAILED DESCRIPTION

Figure 1C:
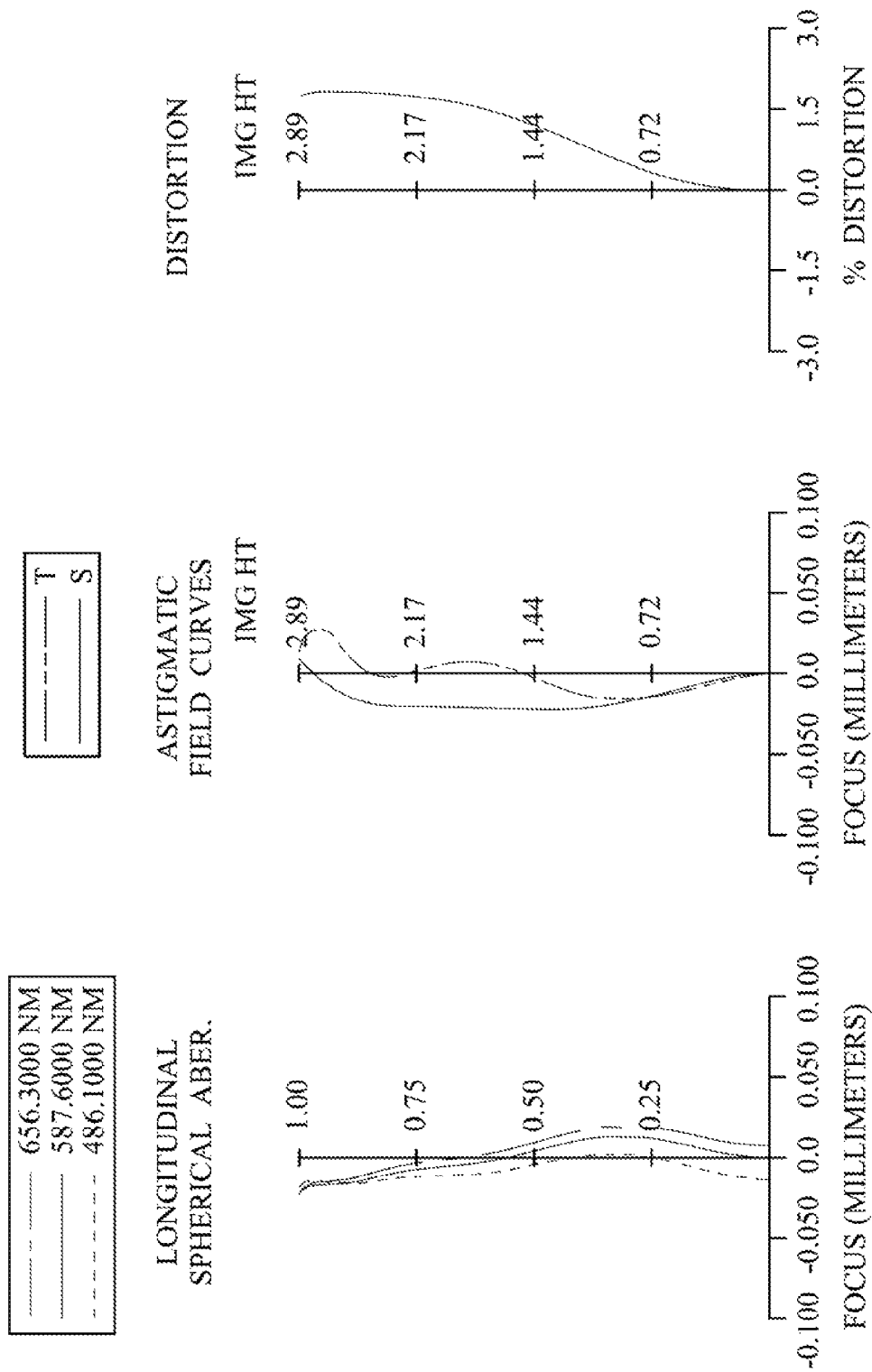
FIG. 1C shows spherical aberration curves, astigmatic field curves and a distortion curve for long distance photographing of the single focus optical image capturing system according to the 1st embodiment.

A single focus optical image capturing system includes, in order from an object side to an image side, a first lens element, a second lens element, a third lens element, a fourth lens element and a fifth lens element. The single focus optical image capturing system further includes an image sensor located on an image plane.

The first lens element with positive refractive power has a convex object-side surface and a concave image-side surface, so that the total track length of the single focus optical image capturing system can be reduced by adjusting the positive refractive power of the first lens element.

The second lens element has negative refractive power, so that the aberration generated from the first lens element with positive refractive power can be corrected effectively. The second lens element can have an image-side surface being convex or concave. When the second lens element has the convex image-side surface, the astigmatism of the single focus optical image capturing system can be corrected. When the second lens element has the concave image-side surface, the aberration generated from the first lens element can be further corrected.

The third lens element can have positive or negative refractive power. When the third lens element has positive refractive power, the distribution of the refractive power of the first lens element can be balanced, so that the sensitivity of the single focus optical image capturing system can be reduced. When the third lens element with negative refractive power has a convex image-side surface, the high order aberration of the single focus optical image capturing system can be reduced, and the astigmatism thereof can be corrected as well.

The fourth lens element can have negative refractive power, so that the high order aberration of the single focus optical image capturing system can be further reduced. The fourth lens element can have a concave object-side surface and a convex mage-side surface. Therefore, the astigmatism of the single focus optical image capturing system can be further corrected.

The fifth lens element can have negative refractive power, and can have a convex object-side surface and a concave image-side surface. Therefore, the principal point of the single focus optical image capturing system can be positioned away from the image plane, and the back focal length of the single focus optical image capturing system can be reduced so as to maintain the compact size of the single focus optical image capturing system. Furthermore, the fifth lens element can have at least one inflection point on at least one of the object-side surface and the image-side surface thereof, so that the incident angle of the off-axis field on the image plane can be effectively reduced, and the aberration of the off-axis field can be corrected.

When the single focus optical image capturing system is for close-up photographing, an object distance (i.e. an axial distance between an object and the object-side surface of the first lens element) can be 100 mm, and a TV distortion for close-up photographing of the single focus optical image capturing system is TVDm; when the single focus optical image capturing system is for long distance photographing, the object distance can be 10000 mm, and a TV distortion for long distance photographing of the single focus optical image capturing system is TVDi, the following relationship is satisfied:

$|TVDi-TVDm|<1.5\%$.

Therefore, high image quality can be obtained, and the difference between the image distortions resulted from different object distances thereof would not be excessive.

TVDm and TVDi can preferably satisfy the following relationship:

$|TVDi-TVDm|<1.0\%$.

Moreover, TVDm and TVDi may satisfy the following relationship:

$|TVDi-TVDm|<0.8\%$.

When the TV distortion for long distance photographing of the single focus optical image capturing system is TVDi, the following relationship is satisfied:

$|TVDi|<1.5\%$.

Therefore, the TV distortion for long distance photographing of the single focus optical image capturing system can be effectively controlled.

TVDi can preferably satisfy the following relationship:

$|TVDi|<1.0\%$.

Moreover, TVDi may satisfy the following relationship:

$|TVDi|<0.5\%$.

When the TV distortion for close-up photographing of the single focus optical image capturing system is TVDm, the following relationship is satisfied:

$|TVDm|<1.5\%$.

TVDm can preferably satisfy the following relationship:

$|TVDm|<1.0\%$.

When an axial distance between the object-side surface of the first lens element and the image plane is TTL, a maximum image height of the single focus optical image capturing system is ImgH, and a focal length of the single focus optical image capturing system is f, the following relationship is satisfied:

5.0 mm$<TTL \times f/ImgH<$7.0 mm.

Therefore, the compact size of the single focus optical image capturing system can be maintained for applying to the thin and portable electronic product.

TTL, ImgH and f can preferably satisfy the following relationship:

5.5 mm$<TTL \times f/ImgH<$6.5 mm.

When a height of an imaging area of the image sensor is V, and a width of the imaging area of the image sensor is H, the following relationships are satisfied:

$$3.0\ mm < V < 4.5\ mm;\ and$$

$$4.0\ mm < H < 6.0\ mm.$$

Therefore, the size of an image is maintained for obtaining the proper TV distortion for close-up photographing and long distance photographing. Consequently, the image quality can be well controlled.

When a curvature radius of the object-side surface of the fourth lens element is R7, and a curvature radius of the image-side surface of the fourth lens element is R8, the following relationship is satisfied:

$$-0.35 < (R7-R8)/(R7+R8) < 0.$$

Therefore, the astigmatism of the single focus optical image capturing system can be corrected by adjusting the curvatures of the surfaces of the fourth lens element.

When an Abbe number of the second lens element is V2, an Abbe number of the third lens element is V3, and an Abbe number of the fourth lens element is V4, the following relationship is satisfied:

$$0.7 < (V2+V4)/V3 < 1.0.$$

Therefore, the chromatic aberration of the single focus optical image capturing system can be corrected.

When a central thickness of the fourth lens element is CT4, and a central thickness of the fifth lens element is CT5, the following relationship is satisfied:

$$0.10 < CT4/CT5 < 0.60.$$

Therefore, the thickness of the fourth lens element and the fifth lens element are proper for the manufacture and the assembling of the single focus optical image capturing system.

When a curvature radius of an object-side surface of the second lens element is R3, and a curvature radius of the image-side surface of the second lens element is R4, the following relationship is satisfied:

$$0.3 < R4/R3 < 0.7$$

Therefore, the negative refractive power of the second lens element is proper by adjusting the curvatures of the surfaces of the second lens element, and the aberration generated from the first lens element with positive refractive power can be further corrected.

When the focal length of the single focus optical image capturing system is f, a focal length of the first lens element is f1, a focal length of the second lens element is f2, a focal length of the third lens element is f3, a focal length of the fourth lens element is f4, and a focal length of the fifth lens element is f5, the following relationship is satisfied:

$$0.1 < (|f/f4|+|f/f5|)/(|f/f1|+|f/f2|+|f/f3|) < 0.4.$$

Therefore, the refractive power of the fourth lens element and the fifth lens element are proper for correcting the high order aberration of the single focus optical image capturing system effectively.

According to the single focus optical image capturing system of the present disclosure, the lens elements thereof can be made of plastic or glass material. When the lens elements are made of glass material, the distribution of the refractive power of the single focus optical image capturing system may be more flexible to design. When the lens elements are made of plastic material, the costs of manufacture can be effectively reduced. Furthermore, the surfaces of each lens element can be aspheric, so that it is easier to make the surface into non-spherical shapes. As a result, more controllable variables are obtained, and the aberration is reduced, as well as the number of required lens elements can be reduced while constructing an optical system. Therefore, the total track length of the single focus optical image capturing system can also be reduced.

According to the single focus optical image capturing system of the present disclosure when a lens element has a convex surface, it indicates that the paraxial region of the surface is convex; when the lens element has a concave surface, it indicates that the paraxial region of the surface is concave.

According to the single focus optical image capturing system of the present disclosure, the single focus optical image capturing system can include at least one stop, such as an aperture stop, a glare stop, or a field stop, etc. Said glare stop or said field stop is allocated for reducing stray light while retaining high image quality. Furthermore, when the stop is an aperture stop, the position of the aperture stop within an optical system can be arbitrarily placed in front of the entire optical system, or in front of the image plane within the optical system in accordance with the preference of an optical designer, in order to achieve the desirable optical features or higher image quality produced from the optical system.

According to the single focus optical image capturing system of the present disclosure, the single focus optical image capturing system is featured with good correcting ability and high image quality, and can be applied to 3D (three-dimensional) image capturing field.

According to the above description of the present disclosure, the following 1st-10th specific embodiments are provided for further explanation.

1st Embodiment

Figure 1F:
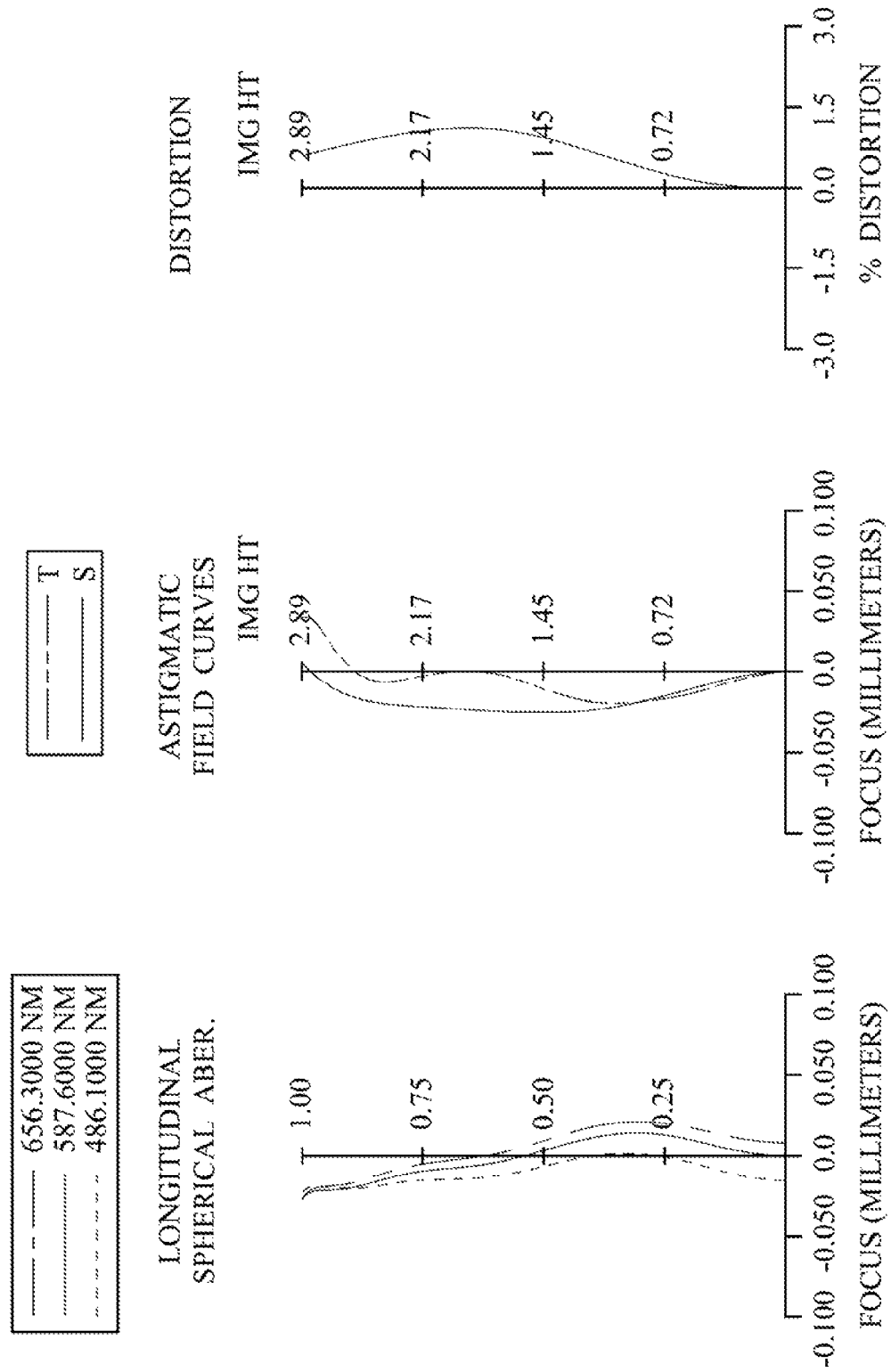
FIG. 1F shows spherical aberration curves, astigmatic field curves and a distortion curve for close-up photographing of the single focus optical image capturing system according to the 1st embodiment.

FIG. 1A is a schematic view of a single focus optical image capturing system according to the 1st embodiment of the present disclosure. FIG. 1B shows TV distortion for long distance photographing of the single focus optical image capturing system according to the 1st embodiment. FIG. 1C shows spherical aberration curves, astigmatic field curves and a distortion curve for long distance photographing of the single focus optical image capturing system according to the 1st embodiment. FIG. 1D shows a TV distortion for close-up photographing of the single focus optical image capturing system according to the 1st embodiment. FIG. 1F shows spherical aberration curves, astigmatic field curves and a distortion curve for close-up photographing of the single focus optical image capturing system according to the 1st embodiment. In FIG. 1A, the single focus optical image capturing system includes, in order from an object side to an image side, an aperture stop 100, a first lens element 110, a second lens element 120, a third lens element 130, a fourth lens element 140, a fifth lens element 150 an IR-cut filter 170, an image plane 160, and an image sensor 180.

The first lens element 110 with positive refractive power has a convex object-side surface 111 and a concave image-side surface 112. The first lens element 110 is made of plastic material and has the object-side surface 111 and the image-side surface 112 being aspheric.

The second lens element 120 with negative refractive power has a convex object-side surface 121 and a concave image-side surface 122. The second lens element 120 is made of plastic material and has the object-side surface 121 and the image-side surface 122 being aspheric.

The third lens element 130 with positive refractive power has a convex object-side surface 131 and a convex image-side surface 132. The third lens element 130 is made of plastic material and has the object-side surface 131 and the image-side surface 132 being aspheric.

The fourth lens element 140 with negative refractive power has a concave object-side surface 141 and a convex image-side surface 142. The fourth lens element 140 is made of plastic material and has the object-side surface 141 and the image-side surface 142 being aspheric.

The fifth lens element 150 with negative refractive power has a convex object-side surface 151 and a concave image-side surface 152. The fifth lens element 150 is made of plastic material and has the object-side surface 151 and the image-side surface 152 being aspheric. Furthermore, the fifth lens element 150 has at least one inflection point on the object-side surface 151 and the image-side surface 152 thereof.

The IR-cut filter 170 made of plastic material is located between the fifth lens element 150 and the image plane 160, and will not affect a focal length of the single focus optical image capturing system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

wherein,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the single focus optical image capturing system according to the 1st embodiment, when the focal length of the single focus optical image capturing system is f, an f-number of the single focus optical image capturing system is Fno, and half of the maximal field of view of the single focus optical image capturing system is HFOV, these parameters have the following values:

$f$=3.96 mm;

$Fno$=2.43; and $HFOV$=35.7 degrees.

In the single focus optical image capturing system according to the 1st embodiment, when an Abbe number of the second lens element 120 is V2, an Abbe number of the third lens element 130 is V3, and an Abbe number of the fourth lens element 140 is V4, the following relationship is satisfied:

$(V2+V4)/V3$=0.83.

In the single focus optical image capturing system according to the 1st embodiment, when a central thickness of the fourth lens element 140 is CT4, and a central thickness of the fifth lens element 150 is CT5, the following relationship is satisfied:

$CT4/CT5$=0.32.

In the single focus optical image capturing system according to the 1st embodiment, when a curvature radius of the object-side surface 121 of the second lens element 120 is R3, and a curvature radius of the image-side surface 122 of the second lens element 120 is R4, the following relationship is satisfied:

$R4/R3$=0.49.

In the single focus optical image capturing system according to the 1st embodiment, when a curvature radius of the object-side surface 141 of the fourth lens element 140 is R7, and a curvature radius of the image-side surface 142 of the fourth lens element 140 is R8, the following relationship is satisfied:

$(R7-R8)/(R7+R8)$=−0.11.

In the single focus optical image capturing system according to the 1st embodiment, when the focal length of the single focus optical image capturing system is f, a focal length of the first lens element 110 is f1, a focal length of the second lens element 120 is f2, a focal length of the third lens element 130 is f3, a focal length of the fourth lens element 140 is f4, and a focal length of the fifth lens element 150 is f5, the following relationship is satisfied:

$(|f/f4|+|f/f5|)/(|f/f1|+|f/f2|+|f/f3|)$=0.16.

Figure 11A:
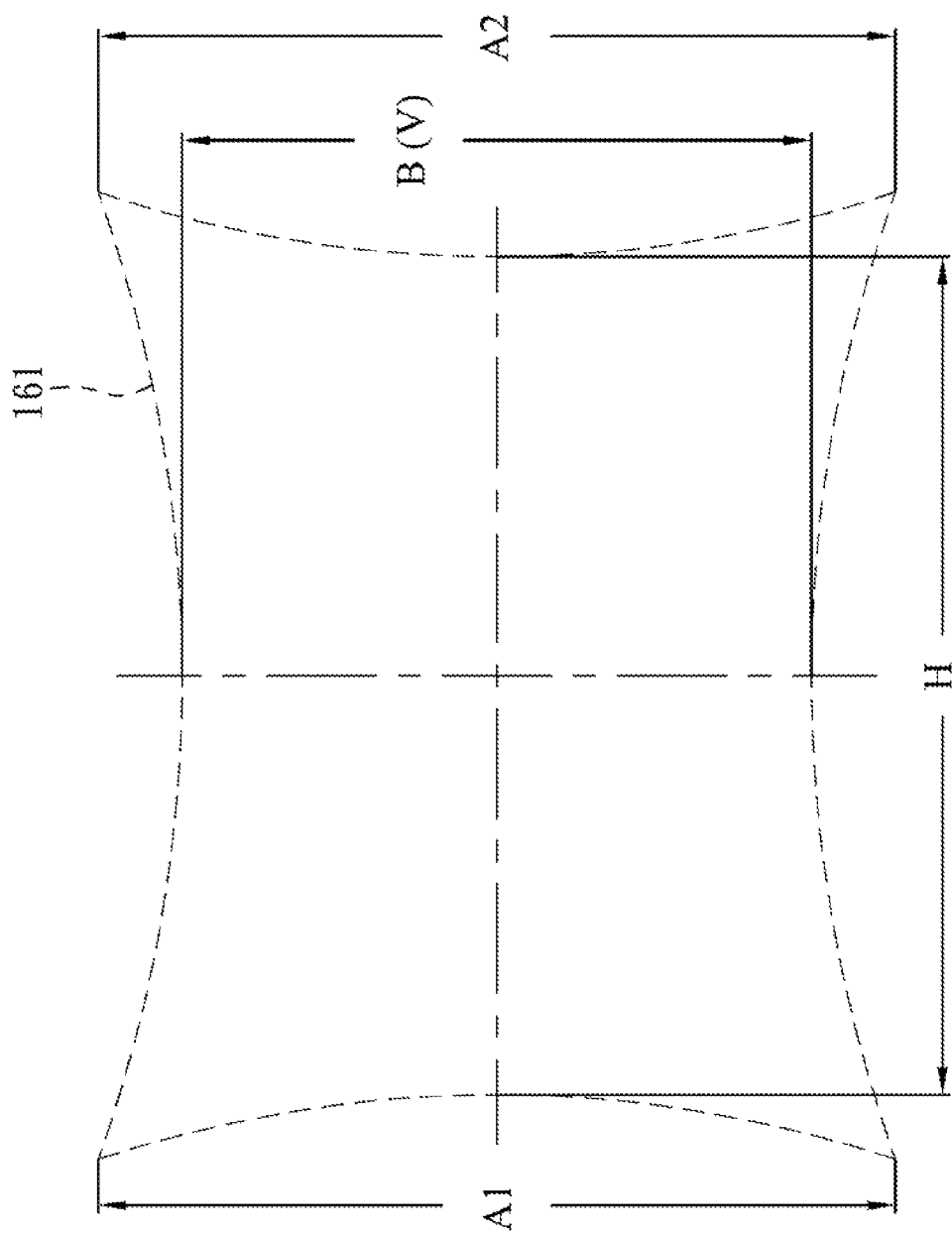
FIG. 11A is a schematic view of a pincushion type image distortion formed on an image plane of the single focus optical image capturing system according to the 1st embodiment of the present disclosure.
Figure 11B:
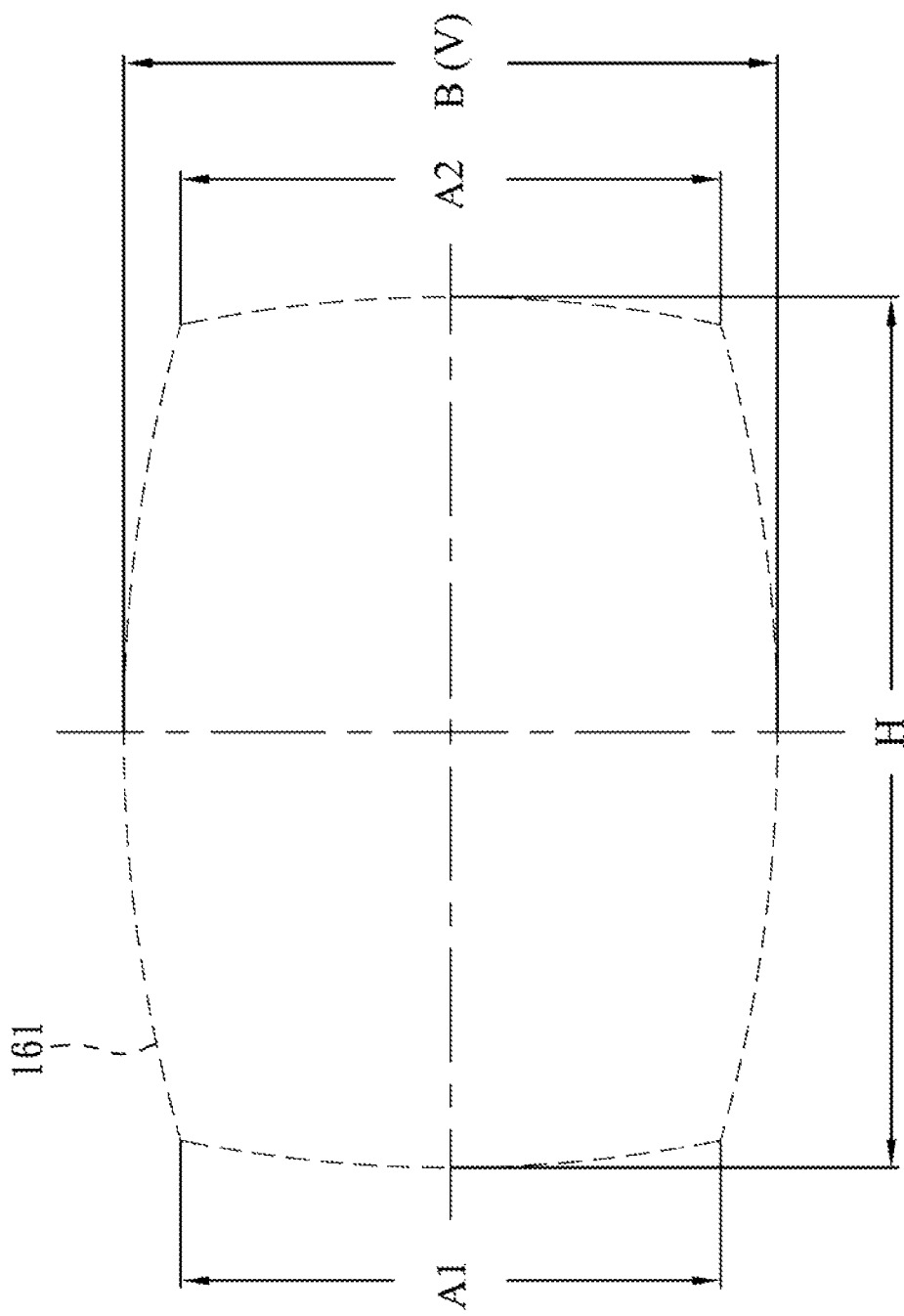
FIG. 11B is a schematic view of a barrel type image distortion formed on the image plane of the single focus optical image capturing system according to the 1st embodiment of the present disclosure.

FIG. 11A is a schematic view of an image 161 with a pincushion distortion on an image plane 160 of the single focus optical image capturing system according to the 1st embodiment. FIG. 11B is a schematic view of another image 161 with a barrel distortion formed on the image plane 160 of the single focus optical image capturing system according to the 1st embodiment. In FIG. 11A and FIG. 11B, when vertical distances of the two sides of the image 161 are A1 and A2, a vertical distance of the center of the image 161 is B, and a TV distortion of the single focus optical image capturing system is TVD, the following relationship is satisfied:

$TVD=((A-B)/B) \times 100\%$ wherein, $A=(A1+A2)/2.$

In FIG. 1B and FIG. 1D, when an object distance between an object and the object-side surface 111 of the first lens element 110 is 10000 mm (i.e. the single focus optical image capturing system is for long distance photographing), a TV distortion for long distance photographing of the single focus optical image capturing system is TVDi; when the object distance is 100 mm, (i.e. the single focus optical image capturing system is for close-up photographing), a TV distortion for close-up photographing of the single focus optical image capturing system is TVDm, the following relationships are satisfied:

$|TVDi|$=0.293%;

$|TVDm|$=0.438%; and $|TVDi-TVDm|$=0.731%.

In FIG. 11A and FIG. 11B, when a height of an imaging area of the image sensor is V (i.e. the shorter length of the imaging area), and a width of the imaging area of the image sensor is H (i.e. the longer length of the imaging area), the following relationships are satisfied:

$V$=3.468 mm; and $H$=4.623 mm.

In the single focus optical image capturing system according to the 1st embodiment, when an axial distance between the object-side surface 111 of the first lens element 110 and the image plane 160 is TTL, a maximum image height of the single focus optical image capturing system is ImgH which here is a half of the diagonal length of the photosensitive area of the image sensor 180 on the image plane 160, and the focal length of the single focus optical image capturing system is f, the following relationship is satisfied:

$$TTL \times f/ImgH = 6.172 \text{ mm}.$$

The detailed optical data of the 1st embodiment are shown in Table 1, and the aspheric surface data are shown in Table 2 below.

TABLE 1

1st Embodiment
f = 3.96 mm, Fno = 2.43, HFOV = 35.7 deg,
H = 4.623 mm, V = 3.468 mm, Resolution = 4128 × 3096, Pixel size = 1.12 × 1.12 μm × μm

| Surface # | | Curvature Radius | | Thickness | | Material | Index | Abbe # | Focal length |
|---|---|---|---|---|---|---|---|---|---|
| 0 | Object | Plano | | Long distance | Close-up | | | | |
| | | | | 10000.000 | 100.000 | | | | |
| 1 | Ape. Stop | Plano | | −0.273 | | | | | |
| 2 | Lens 1 | 1.321 | (ASP) | 0.446 | | Plastic | 1.544 | 55.9 | 3.30 |
| 3 | | 4.397 | (ASP) | 0.144 | | | | | |
| 4 | Lens 2 | 3.939 | (ASP) | 0.240 | | Plastic | 1.640 | 23.3 | −6.28 |
| 5 | | 1.942 | (ASP) | 0.304 | | | | | |
| 6 | Lens 3 | 55.794 | (ASP) | 0.283 | | Plastic | 1.544 | 55.9 | 5.79 |
| 7 | | −3.336 | (ASP) | 0.387 | | | | | |
| 8 | Lens 4 | −0.841 | (ASP) | 0.286 | | Plastic | 1.640 | 23.3 | −13.35 |
| 9 | | −1.057 | (ASP) | 0.181 | | | | | |
| 10 | Lens 5 | 2.374 | (ASP) | 0.882 | | Plastic | 1.544 | 55.9 | −40.20 |
| 11 | | 1.861 | (ASP) | 0.600 | | | | | |
| 12 | IR-cut filter | Plano | | 0.110 | | Plastic | 1.514 | 56.8 | — |
| 13 | | Plano | | Long distance | Close-up | | | | |
| | | | | 0.683 | 0.842 | | | | |
| 14 | Image | Plano | | — | | | | | |

Note:
Reference wavelength (d-line) is 587.6 nm.
V (mm) is the height of the imaging area of the image sensor (i.e. the shorter length of the imaging area).
H (mm) is the width of the imaging area of the image sensor (i.e. the longer length of the imaging area).
Pixel size (μm × μm) is the size of a single pixel on the imaging area of the image sensor.

TABLE 2

Aspheric Coefficients

| | Surface # | | | | |
|---|---|---|---|---|---|
| | 2 | 3 | 4 | 5 | 6 |
| k = | −5.9587E−02 | −1.9242E+01 | −8.9903E+01 | −6.3514E+00 | −9.0000E+01 |
| A4 = | 6.3738E−04 | −9.8286E−02 | −1.6142E−01 | −1.3546E−01 | −1.2075E−01 |
| A6 = | 4.5131E−02 | 1.2484E−01 | 1.7968E−01 | 4.1884E−01 | −1.6166E−01 |
| A8 = | −7.8708E−02 | −6.8277E−02 | 1.0007E−01 | −2.0883E−01 | 7.5627E−01 |
| A10 = | 1.2232E−02 | −4.6821E−02 | −2.0312E−01 | 1.3324E−01 | −1.8234E+00 |
| A12 = | 1.9541E−01 | 2.0218E−02 | −9.5982E−02 | −3.3968E−02 | 2.8174E+00 |
| A14 = | −2.3656E−01 | −7.8151E−02 | 1.1966E−01 | 3.9534E−02 | −1.9346E+00 |
| A16 = | | | | | 3.7936E−01 |

| | Surface # | | | | |
|---|---|---|---|---|---|
| | 7 | 8 | 9 | 10 | 11 |
| k = | 1.3289E+00 | −3.4479E+00 | −7.3393E−01 | −1.6998E+01 | −8.6191E+00 |
| A4 = | −2.5784E−02 | −6.3089E−02 | 1.1322E−01 | −2.1658E−01 | −9.7257E−02 |
| A6 = | −2.4738E−02 | −1.0293E−02 | −3.9041E−02 | 1.5828E−01 | 4.7282E−02 |
| A8 = | 2.9502E−02 | 1.5762E−01 | 3.8501E−02 | −1.2242E−01 | −2.2582E−02 |
| A10 = | 7.9929E−02 | −8.1939E−02 | 1.8377E−02 | 7.5987E−02 | 7.8497E−03 |
| A12 = | −3.7818E−03 | −1.4961E−02 | −5.6609E−03 | −2.6480E−02 | −1.7547E−03 |
| A14 = | −2.5260E−02 | 2.9551E−03 | −5.9511E−03 | 4.6451E−03 | 2.2485E−04 |
| A16 = | | 4.6279E−03 | 4.1527E−04 | −3.2409E−04 | −1.2251E−05 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 2B:
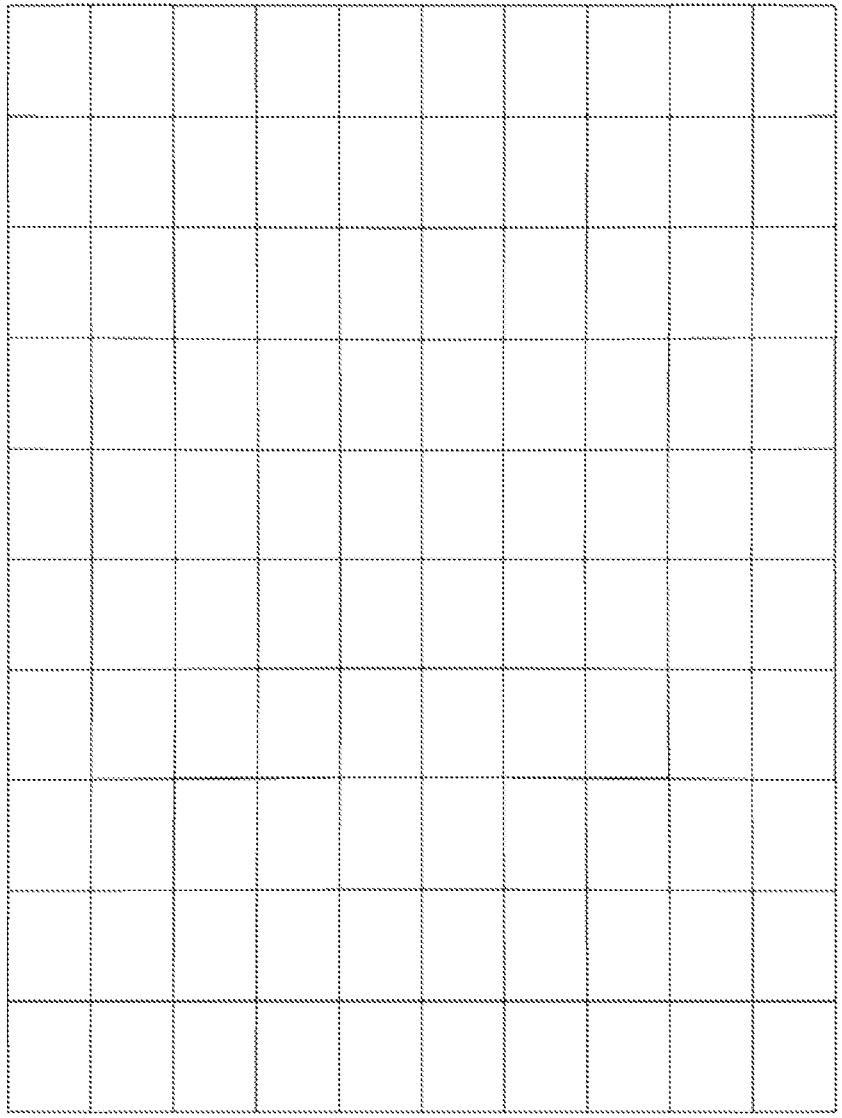
FIG. 2B shows a TV distortion for long distance photographing of the single focus optical image capturing system according to the 2nd embodiment.
Figure 2C:
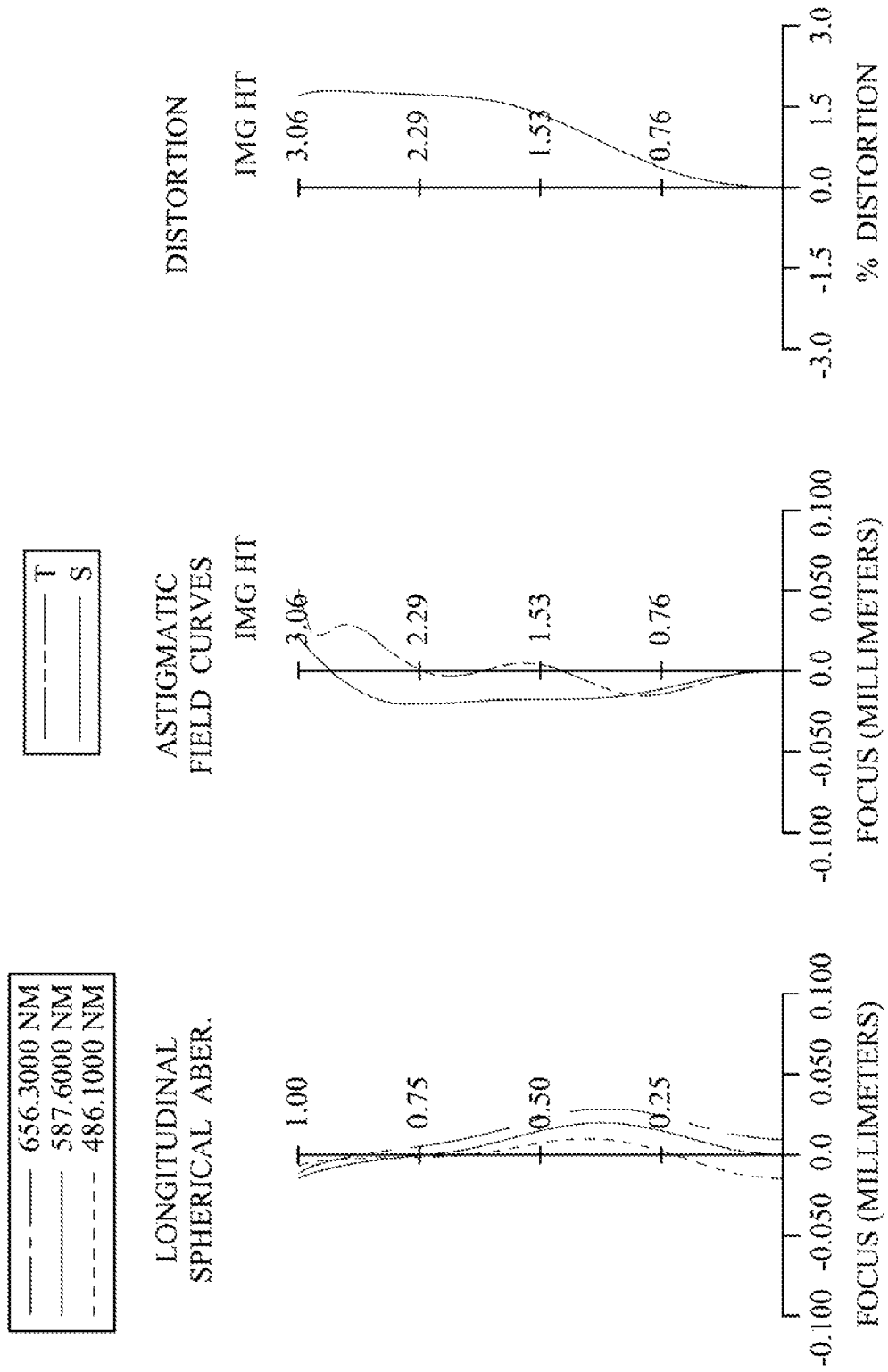
FIG. 2C shows spherical aberration curves, astigmatic field curves and a distortion curve for long distance photographing of the single focus optical image capturing system according to the 2nd embodiment.
Figure 2F:
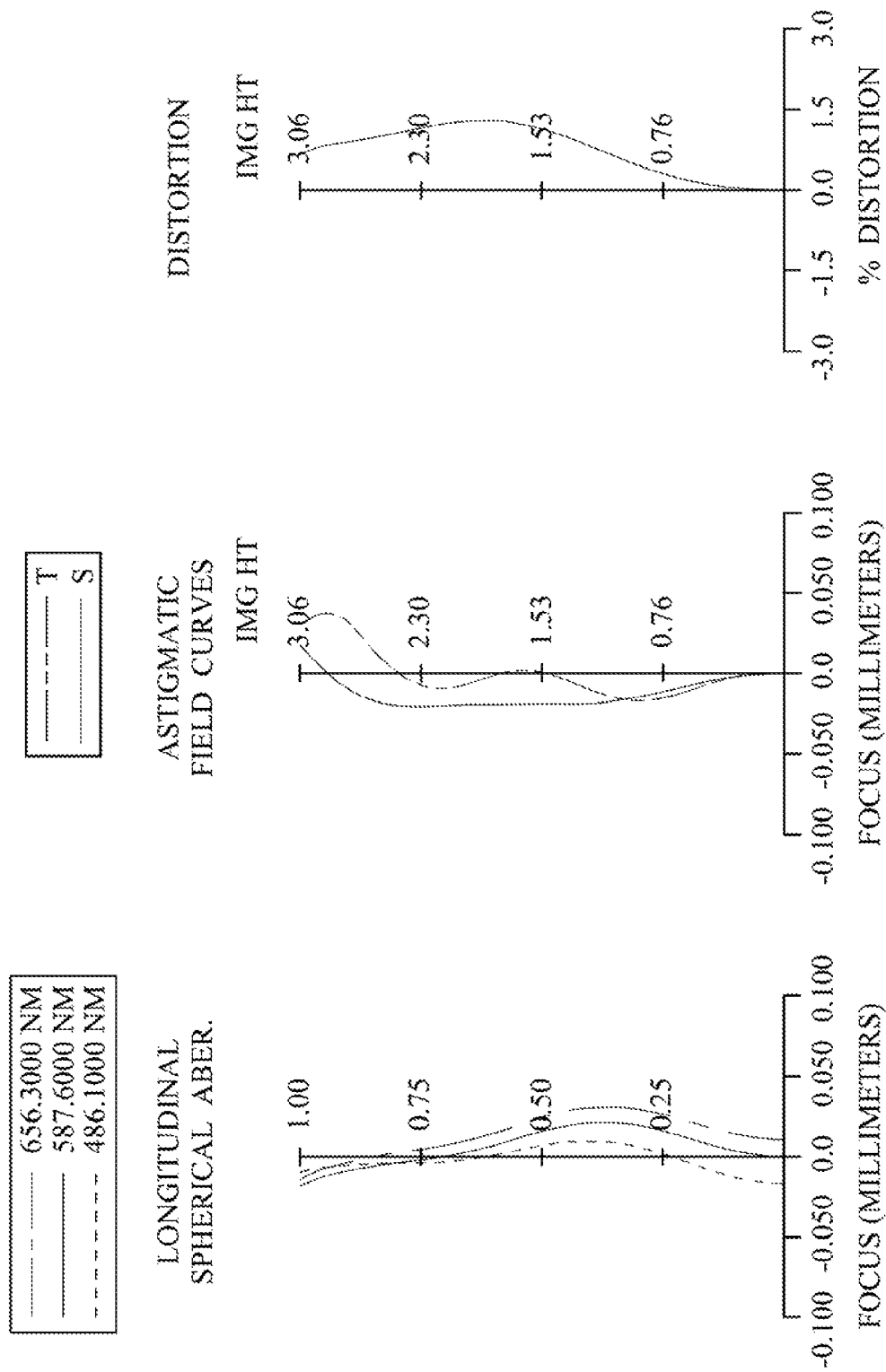
FIG. 2F shows spherical aberration curves, astigmatic field curves and a distortion curve for close-up photographing of the single focus optical image capturing system according to the 2nd embodiment.

FIG. 2A is a schematic view of a single focus optical image capturing system according to the 2nd embodiment of the present disclosure. FIG. 2B shows a TV distortion for long distance photographing of the single focus optical image capturing system according to the 2nd embodiment. FIG. 2C shows spherical aberration curves, astigmatic field curves and a distortion curve for long distance photographing of the single focus optical image capturing system according to the 2nd embodiment. FIG. 2D shows a TV distortion for close-up photographing of the single focus optical image capturing system according to the 2nd embodiment. FIG. 2F shows spherical aberration curves, astigmatic field curves and a distortion curve for close-up photographing of the single focus optical image capturing system according to the 2nd embodiment. In FIG. 2A, the single focus optical image capturing system includes, in order from an object side to an image side, an aperture stop 200, a first lens element 210, a second lens element 220, a third lens element 230, a fourth lens element 240, a fifth lens element 250, an IR-cut filter 270, an image plane 260, and an image sensor 280.

The first lens element 210 with positive refractive power has a convex object-side surface 211 and a concave image-side surface 212. The first lens element 210 is made of plastic material and has the object-side surface 211 and the image-side surface 212 being aspheric.

The second lens element 220 with negative refractive power has a convex object-side surface 221 and a concave image-side surface 222. The second lens element 220 is made of plastic material and has the object-side surface 221 and the image-side surface 222 being aspheric.

The third lens element 230 with positive refractive power has a concave object-side surface 231 and a convex image-side surface 232. The third lens element 230 is made of plastic material and has the object-side surface 231 and the image-side surface 232 being aspheric.

The fourth lens element 240 with negative refractive power has a concave object-side surface 241 and a convex image-side surface 242. The fourth lens element 240 is made of plastic material and has the object-side surface 241 and the image-side surface 242 being aspheric.

The fifth lens element 250 with negative refractive power has a convex object-side surface 251 and a concave image-side surface 252. The fifth lens element 250 is made of plastic material and has the object-side surface 251 and the image-side surface 252 being aspheric. Furthermore, the fifth lens element 250 has at least one inflection point on the object-side surface 251 and the image-side surface 252 thereof.

The IR-cut filter 270 made of glass material is located between the fifth lens element 250 and the image plane 260, and will not affect a focal length of the single focus optical image capturing system.

The detailed optical data of the 2nd embodiment are shown in Table 3, and the aspheric surface data are shown in Table 4 below.

TABLE 3

2nd Embodiment
f = 3.88 mm, Fno = 2.43, HFOV = 37.8 deg,
H = 4.896 mm, V = 3.672 mm, Resolution = 3264 × 2448, Pixel size = 1.5 × 1.5 μm × μm

| Surface # | | Curvature Radius | | Thickness | | Material | Index | Abbe # | Focal length |
|---|---|---|---|---|---|---|---|---|---|
| 0 | Object | Plano | | Long distance 10000.000 | Close-up 100.000 | | | | |
| 1 | Ape. Stop | Plano | | −0.257 | | | | | |
| 2 | Lens 1 | 1.325 | (ASP) | 0.440 | | Plastic | 1.530 | 55.8 | 3.52 |
| 3 | | 4.035 | (ASP) | 0.150 | | | | | |
| 4 | Lens 2 | 3.547 | (ASP) | 0.220 | | Plastic | 1.650 | 21.4 | −8.30 |
| 5 | | 2.088 | (ASP) | 0.351 | | | | | |
| 6 | Lens 3 | −14.711 | (ASP) | 0.341 | | Plastic | 1.530 | 55.8 | 5.31 |
| 7 | | −2.380 | (ASP) | 0.336 | | | | | |
| 8 | Lens 4 | −0.775 | (ASP) | 0.320 | | Plastic | 1.634 | 23.8 | −10.76 |
| 9 | | −1.014 | (ASP) | 0.137 | | | | | |
| 10 | Lens 5 | 1.798 | (ASP) | 0.750 | | Plastic | 1.530 | 55.8 | −56.81 |
| 11 | | 1.451 | (ASP) | 0.600 | | | | | |
| 12 | IR-cut filter | Plano | | 0.200 | | Glass | 1.517 | 64.2 | — |
| 13 | | Plano | | Long distance 0.727 | Close-up 0.883 | | | | |
| 14 | Image | Plano | | — | | | | | |

Note:
Reference wavelength (d-line) is 587.6 nm.
V (mm) is the height of the imaging area of the image sensor (i.e. the shorter length of the imaging area).
H (mm) is the width of the imaging area of the image sensor (i.e. the longer length of the imaging area).
Pixel size (μm × μm) is the size of a single pixel on the imaging area of the image sensor.

TABLE 4

Aspheric Coefficients

| | Surface # | | | | |
|---|---|---|---|---|---|
| | 2 | 3 | 4 | 5 | 6 |
| k = | −9.0618E−02 | −1.8994E+01 | −5.4931E+01 | −5.8532E+00 | 2.0000E+01 |
| A4 = | −5.4770E−03 | −1.0611E−01 | −1.9305E−01 | −1.5639E−01 | −1.4372E−01 |
| A6 = | 6.2562E−02 | 9.4004E−02 | 2.0225E−01 | 3.9267E−01 | −1.8140E−01 |
| A8 = | −1.0468E−01 | −3.6820E−02 | 1.1215E−01 | −1.2422E−01 | 7.4513E−01 |
| A10 = | −4.4982E−03 | −3.5998E−02 | −1.7022E−01 | 5.9702E−02 | −1.8383E+00 |
| A12 = | 2.1804E−01 | 1.4877E−02 | −1.0814E−01 | 2.5292E−03 | 2.8644E+00 |
| A14 = | −2.2589E−01 | −5.3215E−02 | 1.5134E−01 | 3.9534E−02 | −1.9346E+00 |
| A16 = | | | | | 3.7936E−01 |

| | Surface # | | | | |
|---|---|---|---|---|---|
| | 7 | 8 | 9 | 10 | 11 |
| k = | 2.0929E+00 | −3.6177E+00 | −7.6011E−01 | −1.4084E+01 | −7.5737E+00 |
| A4 = | −4.7035E−02 | −1.4908E−01 | 1.0879E−01 | −2.2137E−01 | −1.0162E−01 |
| A6 = | −4.6313E−02 | 4.5271E−02 | −3.4900E−02 | 1.5633E−01 | 4.8426E−02 |
| A8 = | 6.8140E−02 | 1.7914E−01 | 3.4395E−02 | −1.2221E−01 | −2.2633E−02 |
| A10 = | 9.0268E−02 | −9.3441E−02 | 1.7041E−02 | 7.6115E−02 | 7.8348E−03 |
| A12 = | −6.2663E−03 | −1.7135E−02 | −5.1615E−03 | −2.6469E−02 | −1.7480E−03 |
| A14 = | −2.8534E−02 | 2.8760E−03 | −5.8079E−03 | 4.6455E−03 | 2.2427E−04 |
| A16 = | | 3.7245E−03 | 8.5009E−04 | −3.2607E−04 | −1.2325E−05 |

In the single focus optical image capturing system according to the 2nd embodiment, the definitions of f, Fno, HFOV, V2, V3, V4, CT4, CT5, R3, R4, R7, R8, f1, f2, f3, f4, f5, TVDi, TVDm, V, H, TTL, and ImgH are the same as those stated in the 1st embodiment with corresponding values for the 2nd embodiment. Moreover, these parameters can be calculated from Table 3 and Table 4 as the following values and satisfy the following relationships:

| | | | |
|---|---|---|---|
| f (mm) | 3.88 | (|f/f4| + |f/f5|)/(|f/f1| + |f/f2| + |f/f3|) | 0.19 |
| Fno | 2.43 | |TVDi| (%) | 0.070 |
| HFOV (deg.) | 37.8 | |TVDm| (%) | 0.627 |
| (V2 + V4)/V3 | 0.81 | |TVDi − TVDm| (%) | 0.697 |
| CT4/CT5 | 0.43 | V (mm) | 3.672 |
| R4/R3 | 0.59 | H (mm) | 4896 |
| (R7 − R8)/(R7 + R8) | −0.13 | TTL × f/ImgH (mm) | 5.709 |

3rd Embodiment

Figure 3C:
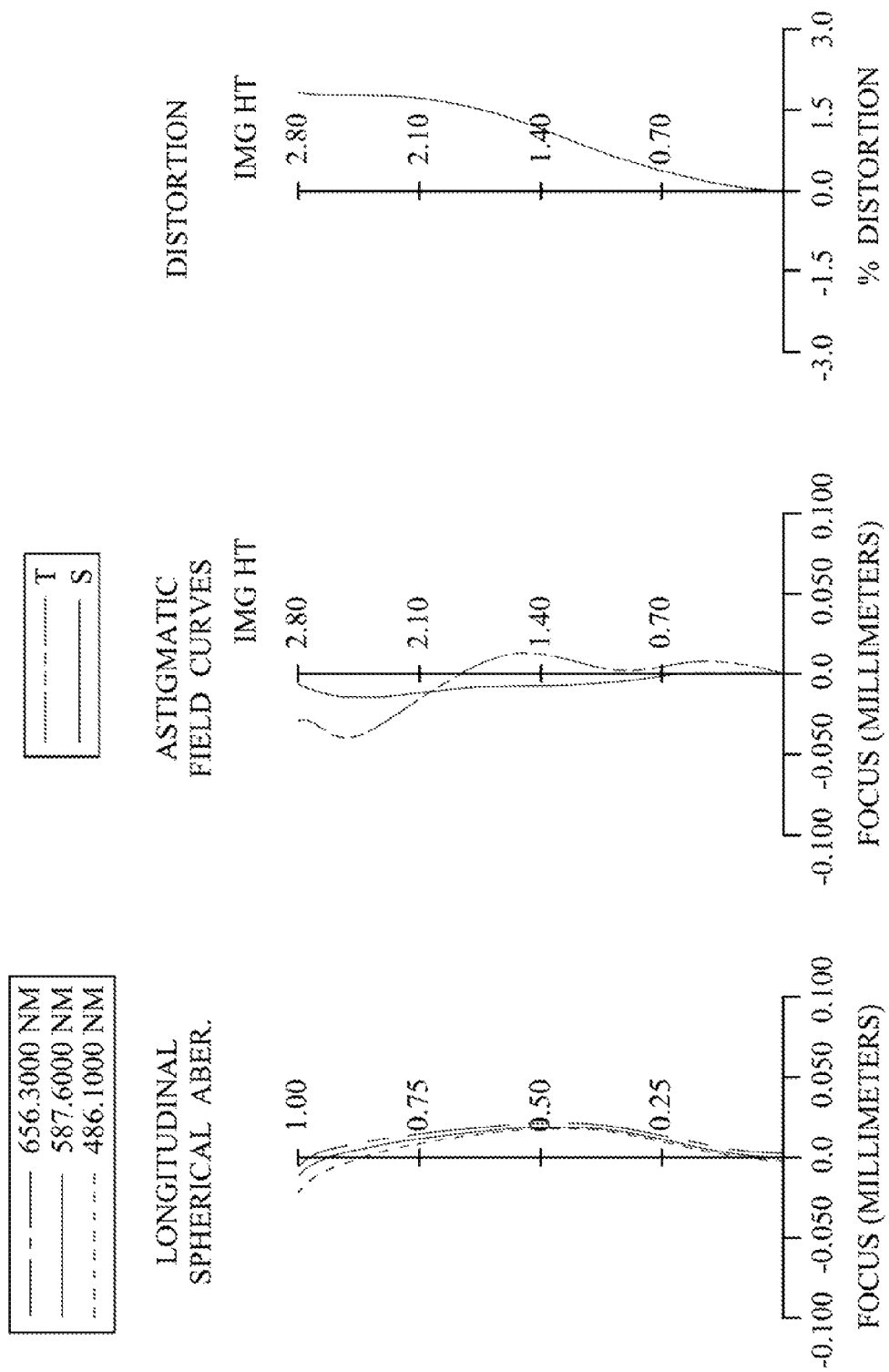
FIG. 3C shows spherical aberration curves, astigmatic field curves and a distortion curve for long distance photographing of the single focus optical image capturing system according to the 3rd embodiment.
Figure 3D:
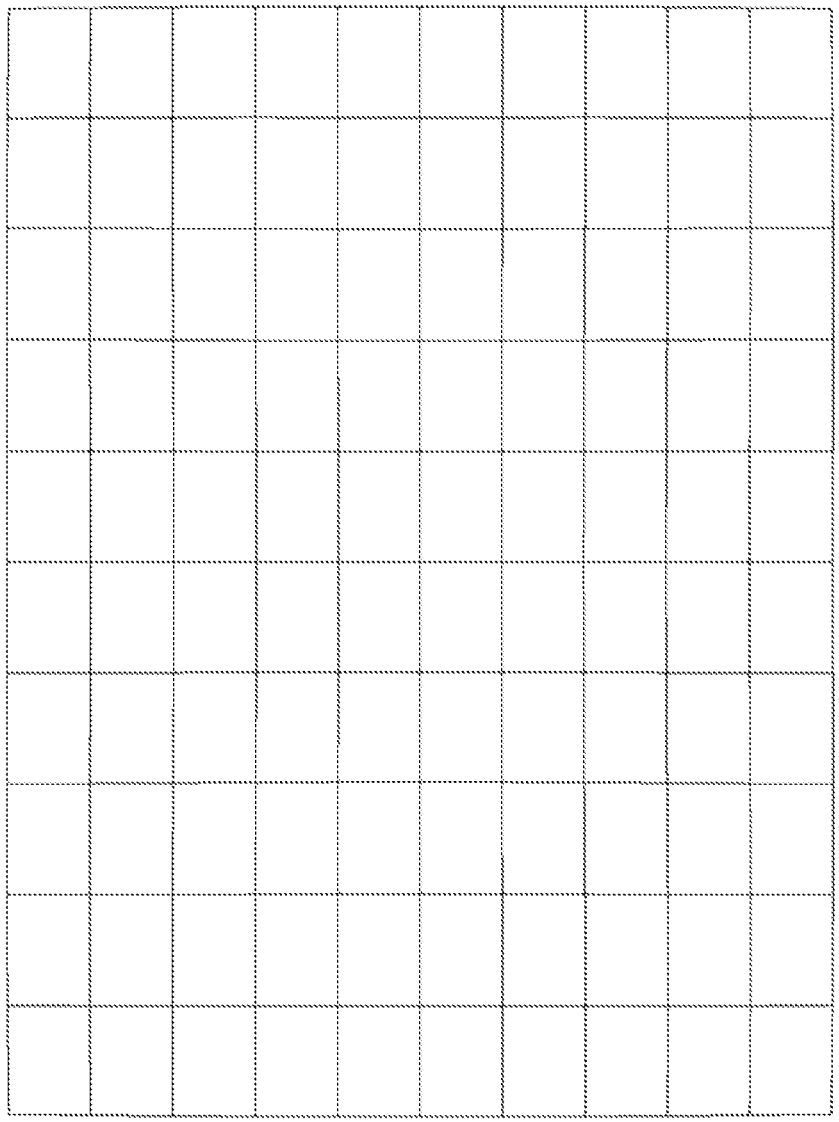
FIG. 3D shows a TV distortion for close-up photographing of the single focus optical image capturing system according to the 3rd embodiment.
Figure 3F:
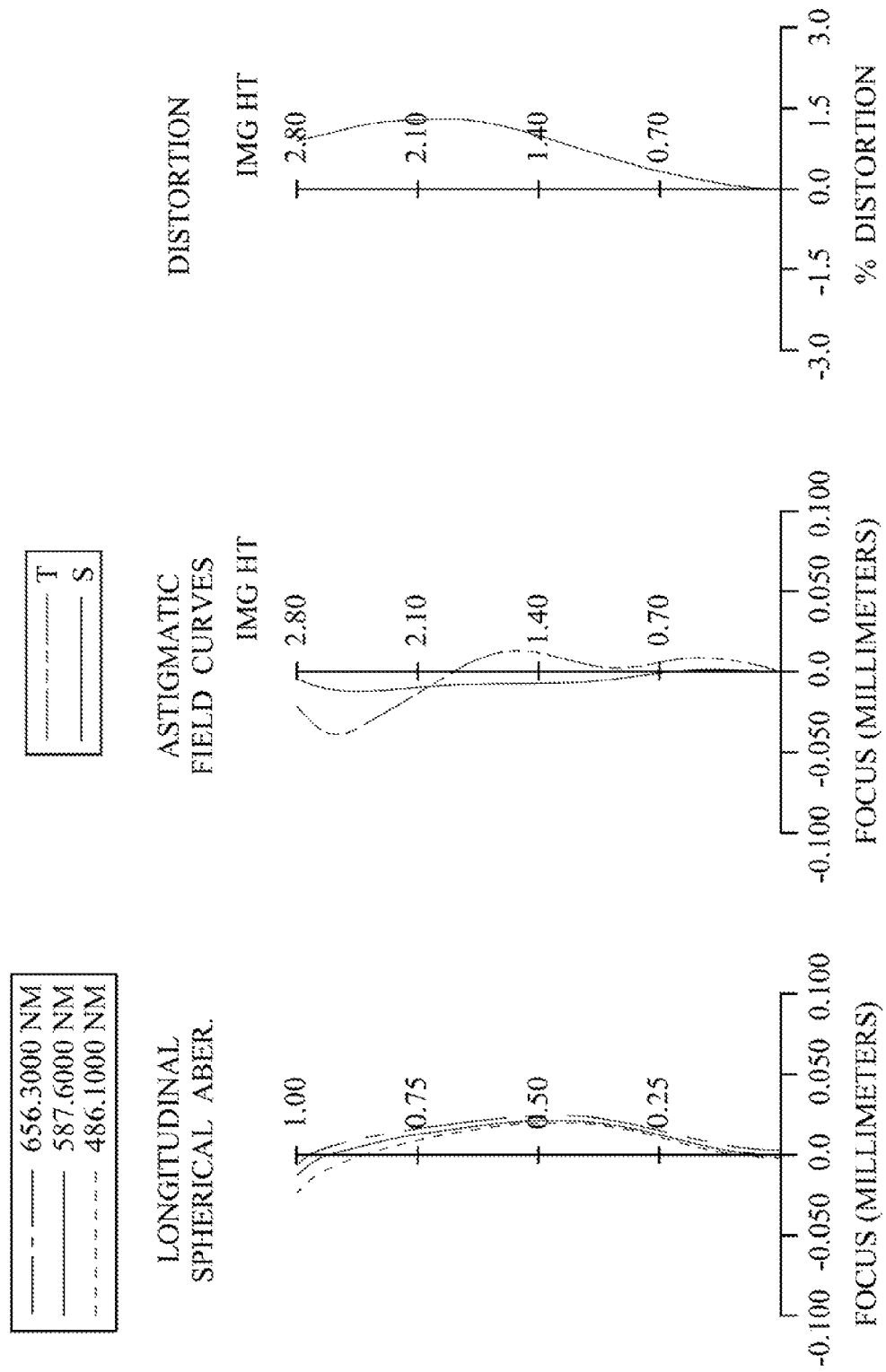
FIG. 3F shows spherical aberration curves, astigmatic field curves and a distortion curve for close-up photographing of the single focus optical image capturing system according to the 3rd embodiment.

FIG. 3A is a schematic view of a single focus optical image capturing system according to the 3rd embodiment of the present disclosure. FIG. 3B shows a TV distortion for long distance photographing of the single focus optical image capturing system according to the 3rd embodiment. FIG. 3C shows spherical aberration curves, astigmatic field curves and a distortion curve for long distance photographing of the single focus optical image capturing system according to the 3rd embodiment. FIG. 3D shows a TV distortion for close-up photographing of the single focus optical image capturing system according to the 3rd embodiment. FIG. 3F shows spherical aberration curves, astigmatic field curves and a distortion curve for close-up photographing of the single focus optical image capturing system according to the 3rd embodiment. In FIG. 3A, the single focus optical image capturing system includes, in order from an object side to an image side, an aperture stop 300, a first lens element 310, a second lens element 320, a third lens element 330, a fourth lens element 340, a fifth lens element 350, an IR-cut filter 370, an image plane 360, and an image sensor 380.

The first lens element 310 with positive refractive power has a convex object-side surface 311 and a convex image-side surface 312. The first lens element 310 is made of plastic material and has the object-side surface 311 and the image-side surface 312 being aspheric.

The second lens element 320 with negative refractive power has a convex object-side surface 321 and a concave image-side surface 322. The second lens element 320 is made of plastic material and has the object-side surface 321 and the image-side surface 322 being aspheric.

The third lens element 330 with positive refractive power has a concave object-side surface 331 and a convex image-side surface 332. The third lens element 330 is made of plastic material and has the object-side surface 331 and the image-side surface 332 being aspheric.

The fourth lens element 340 with negative refractive power has a concave object-side surface 341 and a convex image-side surface 342. The fourth lens element 340 is made of plastic material and has the object-side surface 341 and the image-side surface 342 being aspheric.

The fifth lens element 350 with positive refractive power has a convex object-side surface 351 and a concave image-side surface 352. The fifth lens element 350 is made of plastic material and has the object-side surface 351 and the image-side surface 352 being aspheric. Furthermore, the fifth lens element 350 has at least one inflection point on the object-side surface 351 and the image-side surface 352 thereof.

The IR-cut filter 370 made of plastic material is located between the fifth lens element 350 and the image plane 360, and will not affect a focal length of the single focus optical image capturing system.

The detailed optical data of the 3rd embodiment are shown in Table 5, and the aspheric surface data are shown in Table 6 below

TABLE 5

3rd Embodiment
f = 3.76 mm, Fno = 2.43, HFOV = 36.1 deg,
H = 4.480 mm, V = 3.360 mm, Resolution = 2560 × 1920, Pixel size = 1.75 × 1.75 μm × μm

| Surface # | | Curvature Radius | | Thickness | | Material | Index | Abbe # | Focal length |
|---|---|---|---|---|---|---|---|---|---|
| 0 | Object | Plano | | Long distance 10000.000 | Close-up 100.000 | | | | |
| 1 | Ape. Stop | Plano | | −0.139 | | | | | |
| 2 | Lens 1 | 1.720 | (ASP) | 0.471 | | Plastic | 1.544 | 55.9 | 3.10 |
| 3 | | −74.074 | (ASP) | 0.136 | | | | | |
| 4 | Lens 2 | 5.045 | (ASP) | 0.220 | | Plastic | 1.640 | 23.3 | −5.45 |
| 5 | | 2.026 | (ASP) | 0.318 | | | | | |
| 6 | Lens 3 | −41.520 | (ASP) | 0.329 | | Plastic | 1.544 | 55.9 | 5.39 |
| 7 | | −2.749 | (ASP) | 0.358 | | | | | |
| 8 | Lens 4 | −0.761 | (ASP) | 0.266 | | Plastic | 1.634 | 23.8 | −7.09 |
| 9 | | −1.040 | (ASP) | 0.120 | | | | | |
| 10 | Lens 5 | 1.622 | (ASP) | 0.927 | | Plastic | 1.530 | 55.8 | 19.33 |
| 11 | | 1.545 | (ASP) | 0.600 | | | | | |
| 12 | IR-cut filter | Plano | | 0.110 | | Plastic | 1.514 | 56.8 | — |
| 13 | | Plano | | Long distance 0.722 | Close-up 0.869 | | | | |
| 14 | Image | Plano | | — | | | | | |

Note:
Reference wavelength (d-line) is 587.6 nm.
V (mm) is the height of the imaging area of the image sensor (i.e. the shorter length of the imaging area).
H (mm) is the width of the imaging area of the image sensor (i.e. the longer length of the imaging area).
Pixel size (μm × μm) is the size of a single pixel on the imaging area of the image sensor.

TABLE 6

Aspheric Coefficients

| Surface # | 2 | 3 | 4 | 5 | 6 |
|---|---|---|---|---|---|
| k = | −6.6120E−01 | 2.0000E+01 | −9.0000E+01 | −4.3182E+00 | 2.0000E+01 |
| A4 = | −2.3782E−02 | −1.3432E−01 | −1.6818E−01 | −1.5689E−01 | −1.4393E−01 |
| A6 = | 4.4425E−03 | 4.7175E−02 | 2.6265E−01 | 3.4864E−01 | −1.5927E−01 |
| A8 = | −1.4465E−01 | −3.3841E−02 | 8.0013E−02 | −1.5802E−01 | 7.8238E−01 |
| A10 = | 6.2409E−03 | −2.6105E−02 | −2.1387E−01 | 8.6585E−02 | −1.8006E+00 |
| A12 = | 1.8464E−01 | −4.9061E−03 | −9.2526E−02 | −1.2616E−01 | 2.8330E+00 |
| A14 = | −2.2589E−01 | −5.3215E−02 | 1.5134E−01 | 2.4479E−02 | −1.9326E+00 |
| A16 = | | | | | 3.7936E−01 |

| Surface # | 7 | 8 | 9 | 10 | 11 |
|---|---|---|---|---|---|
| k = | 1.7734E+00 | −3.9354E+00 | −7.7155E−01 | −1.4727E+01 | −6.9782E+00 |
| A4 = | −4.4060E−02 | −1.1184E−01 | 1.0195E−01 | −2.1297E−01 | −9.1627E−02 |
| A6 = | −3.7431E−02 | 4.2497E−02 | −1.9670E−02 | 1.5720E−01 | 4.6208E−02 |
| A8 = | 7.0496E−02 | 1.7356E−01 | 4.1763E−02 | −1.2243E−01 | −2.2337E−02 |
| A10 = | 1.0857E−01 | −9.2556E−02 | 1.7100E−02 | 7.6052E−02 | 7.8448E−03 |
| A12 = | −3.3551E−03 | −1.8278E−02 | −6.5421E−03 | −2.6480E−02 | −1.7610E−03 |
| A14 = | −2.8534E−02 | 2.3662E−03 | −6.5733E−03 | 4.6435E−03 | 2.2277E−04 |
| A16 = | | 3.7245E−03 | 4.7164E−04 | −3.2436E−04 | −1.1815E−05 |

In the single focus optical image capturing system according to the 3rd embodiment, the definitions of f, Fno, HFOV, V2, V3, V4, CT4, CT5, R3, R4, R7, R8, f1, f2, f3, f4, f5, TVDi, TVDm, V, H, TTL, and ImgH are the same as those stated in the 1st embodiment with corresponding values for the 3rd embodiment. Moreover, these parameters can be calculated from Table 5 and Table 6 as the following values and satisfy the following relationships:

| | | | |
|---|---|---|---|
| f (mm) | 3.76 | (|f/f4| + |f/f5|)/(|f/f1| + |f/f2| + |f/f3|) | 0.28 |
| Fno | 2.43 | |TVDi| (%) | 0.304 |
| HFOV (deg.) | 36.1 | |TVDm| (%) | 0.379 |
| (V2 + V4)/V3 | 0.84 | |TVDi − TVDm| (%) | 0.683 |
| CT4/CT5 | 0.29 | V (mm) | 3.360 |
| R4/R3 | 0.40 | H (mm) | 4.480 |
| (R7 − R8)/(R7 + R8) | −0.16 | TTL × f/ImgH (mm) | 6.095 |

4th Embodiment

Figure 4B:
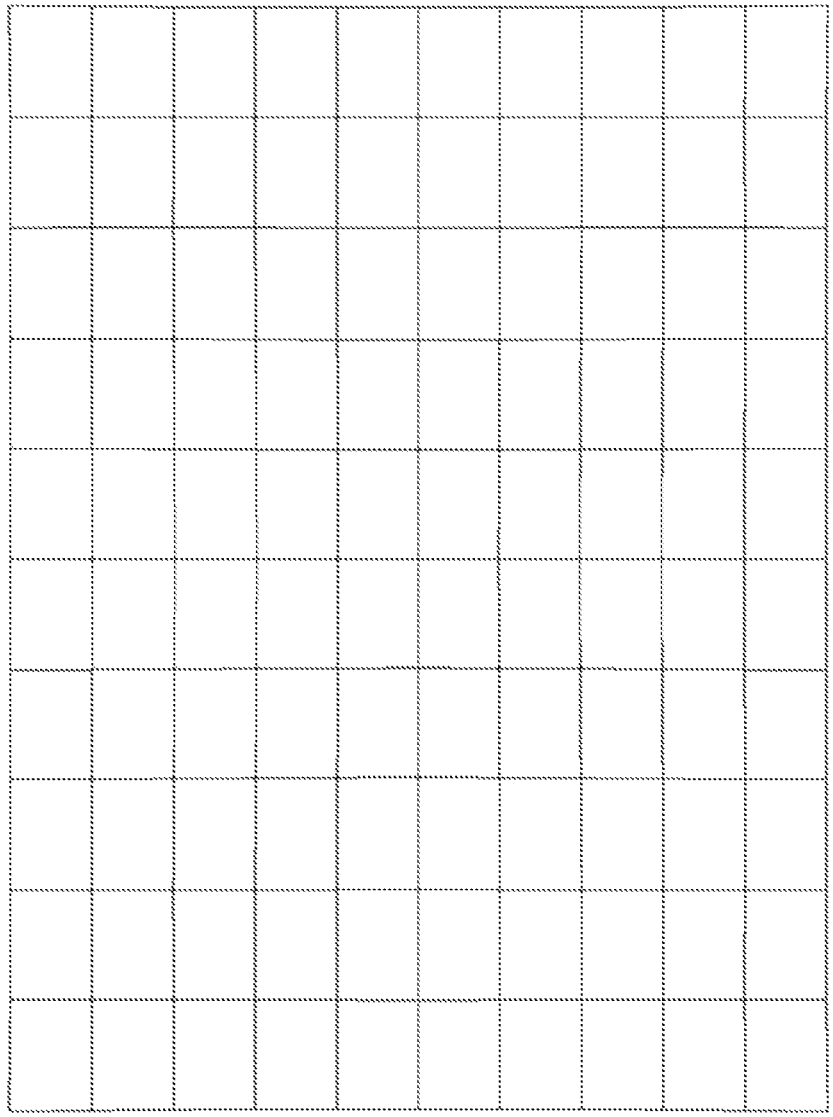
FIG. 4B shows a TV distortion for long distance photographing of the single focus optical image capturing system according to the 4th embodiment.
Figure 4C:
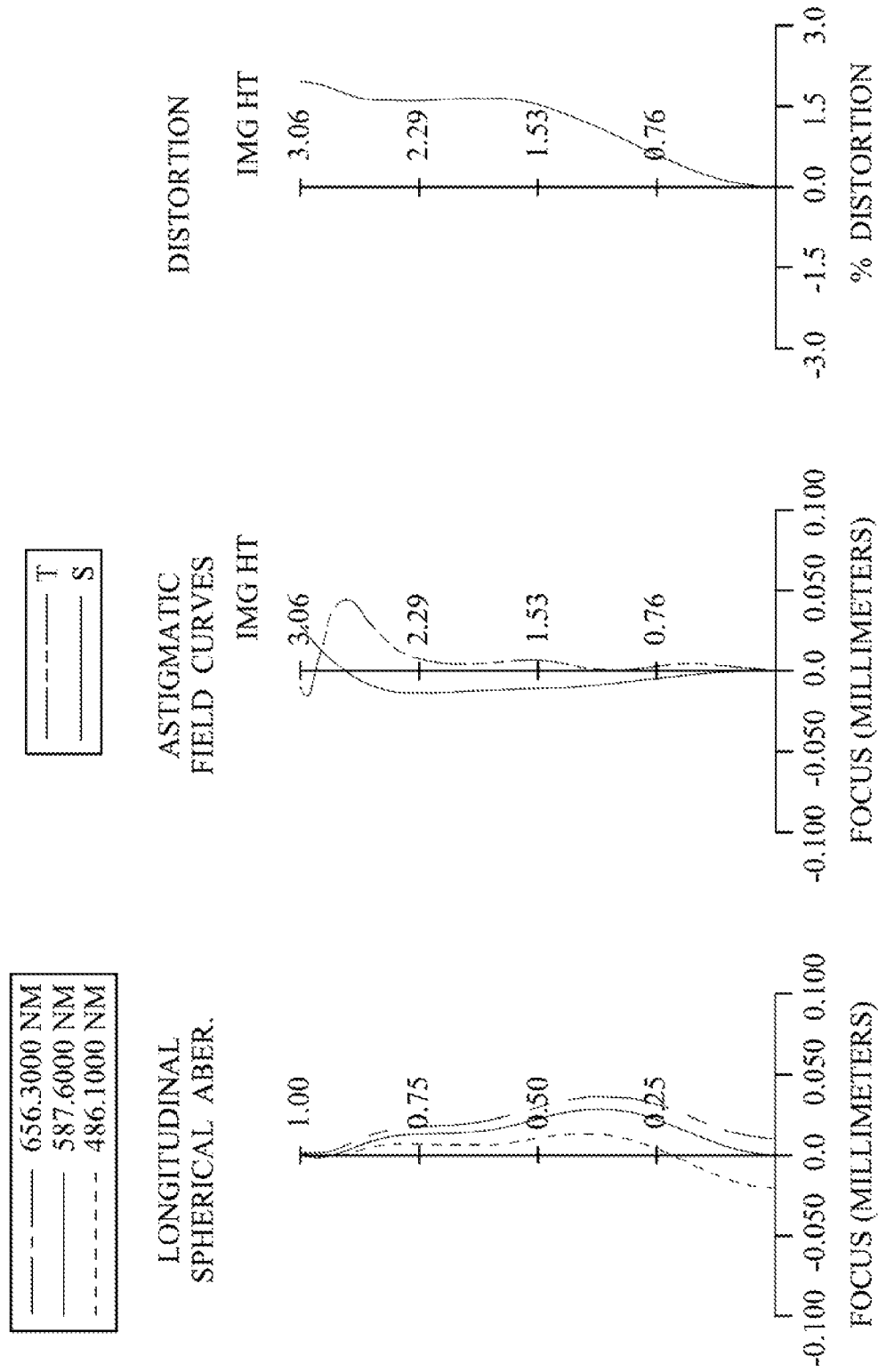
FIG. 4C shows spherical aberration curves, astigmatic field curves and a distortion curve for long distance photographing of the single focus optical image capturing system according to the 4th embodiment.
Figure 4D:
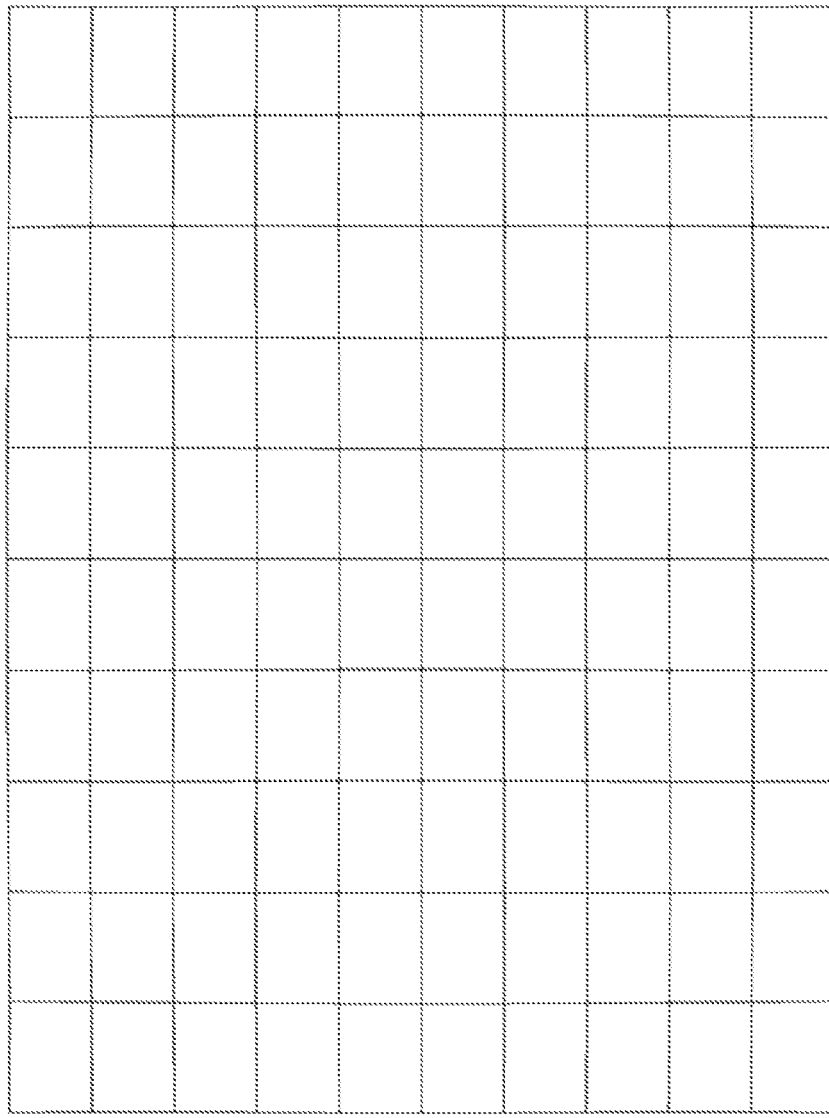
FIG. 4D shows a TV distortion for close-up photographing of the single focus optical image capturing system according to the 4th embodiment.
Figure 4F:
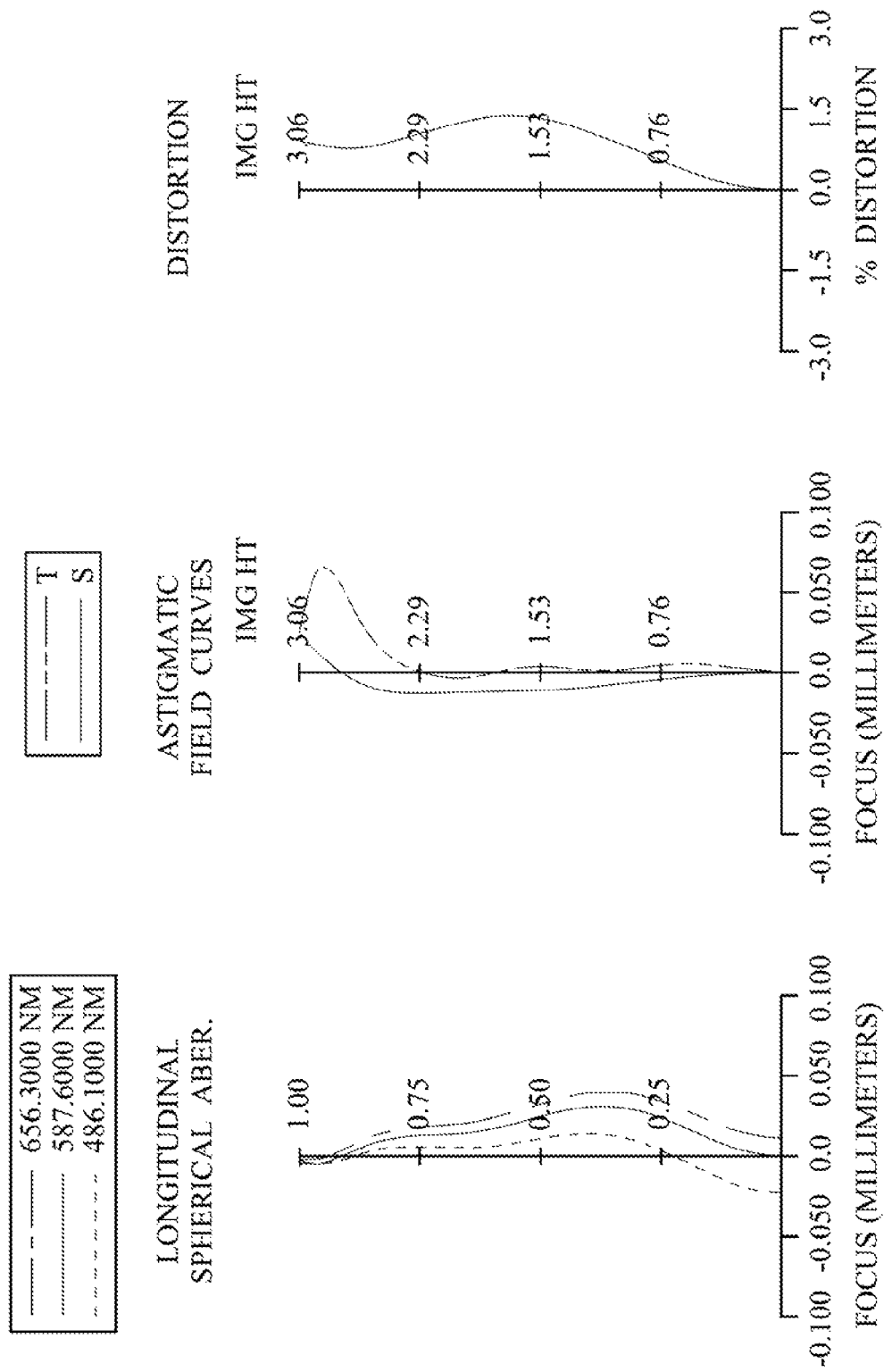
FIG. 4F shows spherical aberration curves, astigmatic field curves and a distortion curve for close-up photographing of the single focus optical image capturing system according to the 4th embodiment.

FIG. 4A is a schematic view of a single focus optical image capturing system according to the 4th embodiment of the present disclosure. FIG. 4B shows a TV distortion for long distance photographing of the single focus optical image capturing system according to the 4th embodiment. FIG. 4C shows spherical aberration curves, astigmatic field curves and a distortion curve for long distance photographing of the single focus optical image capturing system according to the 4th embodiment. FIG. 4D shows a TV distortion for close-up photographing of the single focus optical image capturing system according to the 4th embodiment. FIG. 4F shows spherical aberration curves, astigmatic field curves and a distortion curve for close-up photographing of the single focus optical image capturing system according to the 4th embodiment. In FIG. 4A, the single focus optical image capturing system includes, in order from an object side to an image side, an aperture stop 400, a first lens element 410, a second lens element 420, a third lens element 430, a fourth lens element 440, a fifth lens element 450, an IR-cut filter 470, an image plane 460, and an image sensor 480.

The first lens element 410 with positive refractive power has a convex object-side surface 411 and a concave image-side surface 412. The first lens element 410 is made of plastic material and has the object-side surface 411 and the image-side surface 412 being aspheric.

The second lens element 420 with negative refractive power has a convex object-side surface 421 and a concave image-side surface 422. The second lens element 420 is made of plastic material and has the object-side surface 421 and the image-side surface 422 being aspheric.

The third lens element 430 with positive refractive power has a concave object-side surface 431 and a convex image-side surface 432. The third lens element 430 is made of plastic material and has the object-side surface 431 and the image-side surface 432 being aspheric.

The fourth lens element 440 with positive refractive power has a concave object-side surface 441 and a convex image-side surface 442. The fourth lens element 440 is made of plastic material and has the object-side surface 441 and the image-side surface 442 being aspheric.

The fifth lens element 450 with negative refractive power has a convex object-side surface 451 and a concave image-side surface 452. The fifth lens element 450 is made of plastic material and has the object-side surface 451 and the image-side surface 452 being aspheric. Furthermore, the fifth lens element 450 has at least one inflection point on the object-side surface 451 and the image-side surface 452 thereof.

The IR-cut filter 470 made of plastic material is located between the fifth lens element 450 and the image plane 460, and will not affect a focal length of the single focus optical image capturing system.

The detailed optical data of the 4th embodiment are shown in Table 7, and the aspheric surface data are shown in Table 8 below.

TABLE 7

4th Embodiment
f = 3.85 mm, Fno = 2.43, HFOV = 37.8 deg,
H = 4.896 mm, V = 3.672 mm, Resolution = 3264 × 2448, Pixel size = 1.5 × 1.5 μm × μm

| Surface # | | Curvature Radius | | Thickness | Material | Abbe index | # | Focal length |
|---|---|---|---|---|---|---|---|---|
| 0 | Object | Plano | | Long distance 10000.000 | Close-up 100.000 | | | |
| 1 | Ape. Stop | Plano | | −0.242 | | | | |
| 2 | Lens 1 | 1.399 | (ASP) | 0.440 | Plastic | 1.544 | 55.9 | 3.31 |
| 3 | | 5.603 | (ASP) | 0.096 | | | | |
| 4 | Lens 2 | 3.870 | (ASP) | 0.240 | Plastic | 1.634 | 23.8 | −6.00 |
| 5 | | 1.872 | (ASP) | 0.329 | | | | |
| 6 | Lens 3 | −21.183 | (ASP) | 0.405 | Plastic | 1.544 | 55.9 | 4.99 |
| 7 | | −2.421 | (ASP) | 0.401 | | | | |
| 8 | Lens 4 | −0.909 | (ASP) | 0.455 | Plastic | 1.544 | 55.9 | 15.82 |
| 9 | | −0.967 | (ASP) | 0.045 | | | | |
| 10 | Lens 5 | 3.572 | (ASP) | 0.860 | Plastic | 1.530 | 55.8 | −6.06 |
| 11 | | 1.550 | (ASP) | 0.600 | | | | |
| 12 | IR-cut filter | Plano | | 0.110 | Plastic | 1.514 | 56.8 | — |
| 13 | | Plano | | Long distance 0.702 | Close-up 0.857 | | | |
| 14 | Image | Plano | | — | | | | |

Note:
Reference wavelength (d-line) is 587.6 nm.
V (mm) is the height of the imaging area of the image sensor (i.e. the shorter length of the imaging area).
H (mm) is the width of the imaging area of the image sensor (i.e. the longer length of the imaging area).
Pixel size (μm × μm) is the size of a single pixel on the imaging area of the image sensor.

TABLE 8

Aspheric Coefficients

| | Surface # | | | | |
|---|---|---|---|---|---|
| | 2 | 3 | 4 | 5 | 6 |
| k = | −6.0429E−02 | −9.0000E+01 | −9.0000E+01 | −4.6207E+00 | −9.0000E+01 |
| A4 = | −2.8749E−05 | −1.311E−01 | −2.0114E−01 | −1.5057E−01 | −1.2013E−01 |
| A6 = | 7.2100E−02 | 1.6457E−01 | 2.6025E−01 | 4.0848E−01 | −1.7956E−01 |
| A8 = | −1.4608E−01 | −1.7354E−02 | 1.0151E−01 | −1.8319E−01 | 7.3989E−01 |
| A10 = | 7.7771E−02 | −1.0176E−01 | −2.8514E−01 | 1.0930E−02 | −1.7866E+00 |
| A12 = | 2.0923E−01 | 1.3058E−02 | −1.2041E−01 | −1.6086E−02 | 2.8294E+00 |
| A14 = | −2.4037E−01 | −6.5971E−02 | 1.4243E−01 | 3.9534E−02 | −1.9346E+00 |
| A16 = | | | | | 3.7936E−01 |

| | Surface # | | | | |
|---|---|---|---|---|---|
| | 7 | 8 | 9 | 10 | 11 |
| k = | 1.5410E+00 | −3.1329E+00 | −7.8621E−01 | −1.4706E+01 | −8.0898E+00 |
| A4 = | −4.1426E−02 | −6.9539E−02 | 1.2418E−01 | −2.2287E−01 | −9.0550E−02 |
| A6 = | −1.2940E−02 | 1.6426E−02 | −3.4486E−02 | 1.5828E−01 | 4.5195E−02 |
| A8 = | 3.4120E−02 | 1.7161E−01 | 3.8160E−02 | −1.2211E−01 | −2.2233E−02 |
| A10 = | 9.2021E−02 | −8.5924E−02 | 1.5372E−02 | 7.6051E−02 | 7.8853E−03 |
| A12 = | 4.8853E−03 | −1.7331E−02 | −7.8367E−03 | −2.6461E−02 | −1.7613E−03 |
| A14 = | −2.5783E−02 | 5.3612E−03 | −5.5363E−03 | 4.6405E−03 | 2.2174E−04 |
| A16 = | | 3.3279E−03 | 1.8207E−03 | −3.2739E−04 | −1.1811E−05 |

In the single focus optical image capturing system according to the 4th embodiment, the definitions of f, Fno, HFOV, V2, V3, V4, CT4, CT5, R3, R4, R7, R8, f1, f2, f3, f4, f5, TVDi, TVDm, V, H, TTL, and ImgH are the same as those stated in the 1st embodiment with corresponding values for the 4th embodiment. Moreover, these parameters can be calculated from Table 7 and Table 8 as the following values and satisfy the following relationships:

| f (mm) | 3.85 | $(|f/f4| + |f/f5|)/(|f/f1| + |f/f2| + |f/f3|)$ | 0.34 |
|---|---|---|---|
| Fno | 2.43 | |TVDi| (%) | 0.239 |
| HFOV (deg.) | 37.8 | |TVDm| (%) | 0.516 |
| (V2 + V4)/V3 | 1.43 | |TVDi − TVDm| (%) | 0.755 |
| CT4/CT5 | 0.53 | V (mm) | 3.672 |
| R4/R3 | 0.48 | H (mm) | 4.896 |
| (R7 − R8)/(R7 + R8) | −0.03 | TTL × f/ImgH (mm) | 5.848 |

5th Embodiment

Figure 5A:
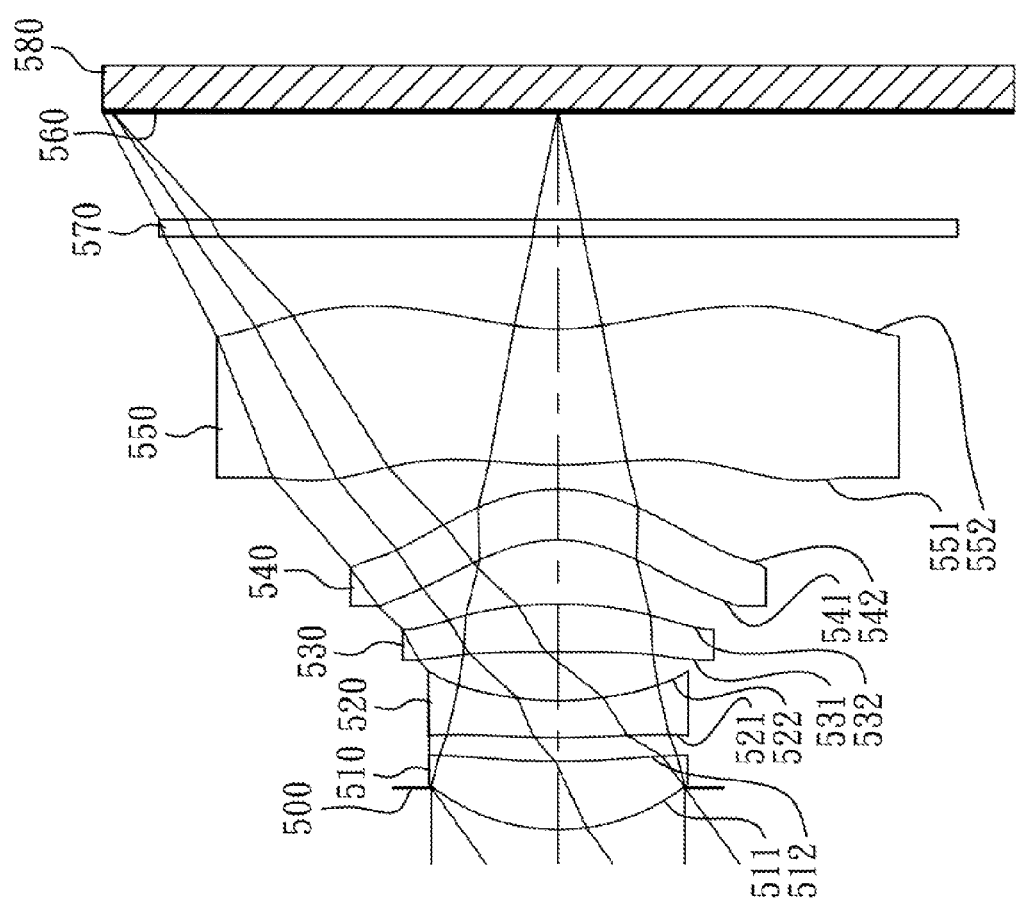
FIG. 5A is a schematic view of a single focus optical image capturing system according to the 5th embodiment of the present disclosure.
Figure 5B:
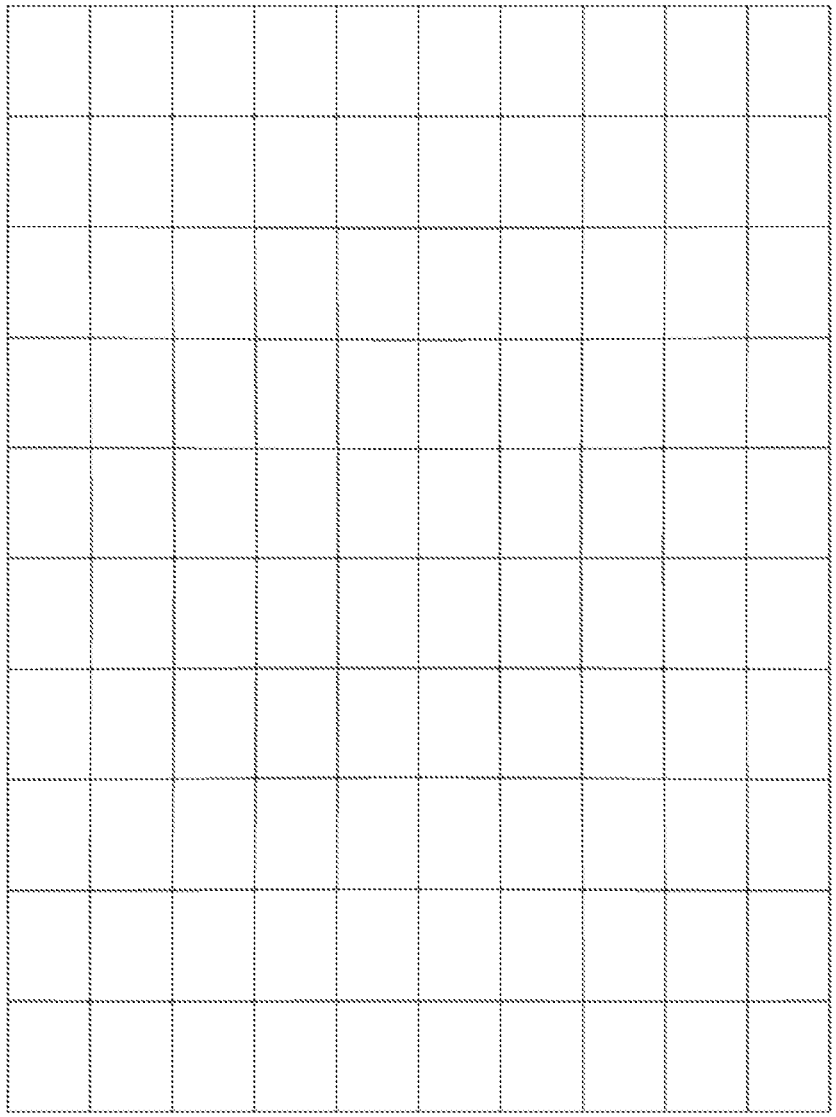
FIG. 5B shows a TV distortion for long distance photographing of the single focus optical image capturing system according to the 5th embodiment.
Figure 5C:
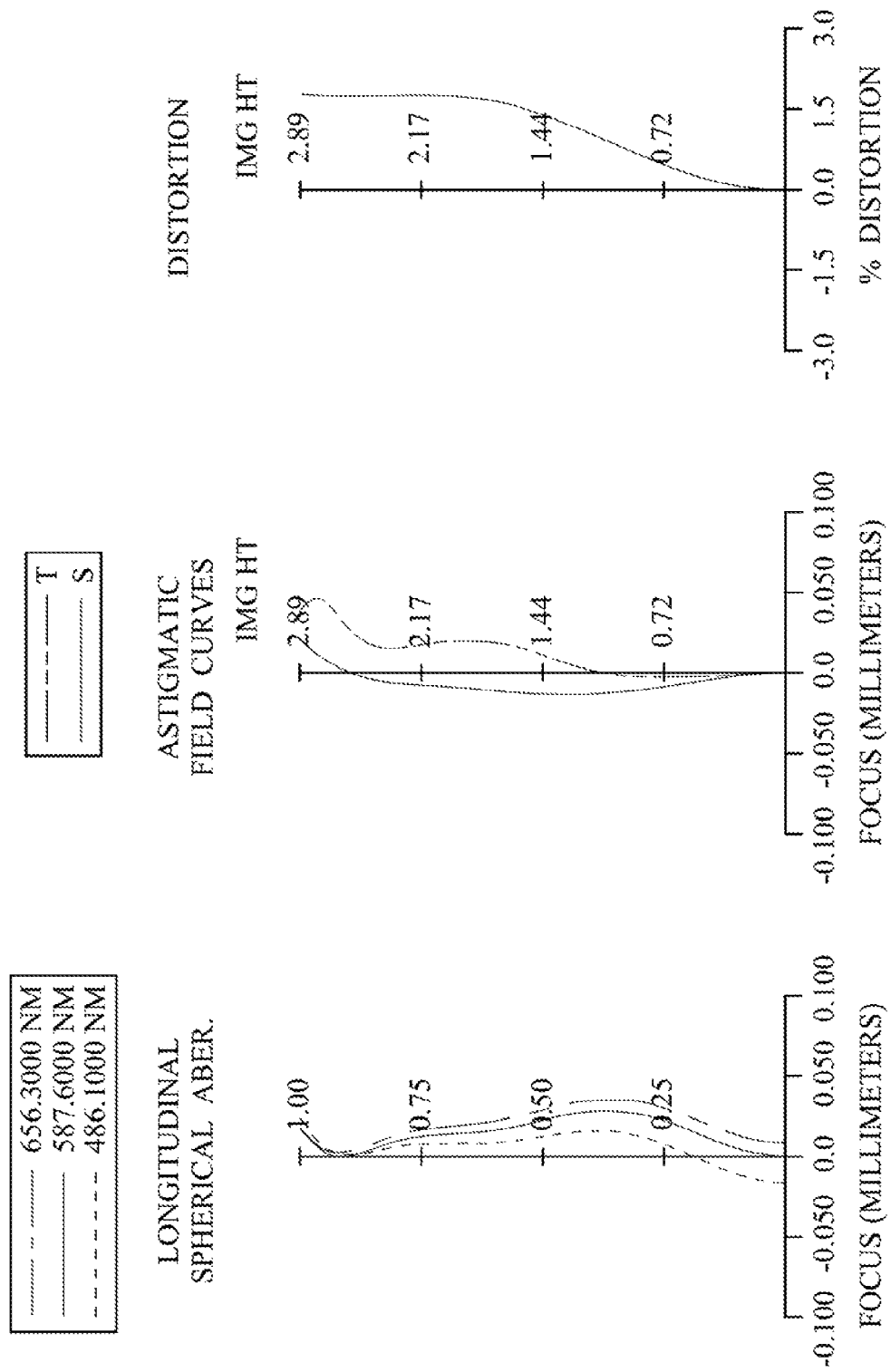
FIG. 5C shows spherical aberration curves, astigmatic field curves and a distortion curve for long distance photographing of the single focus optical image capturing system according to the 5th embodiment.
Figure 5D:
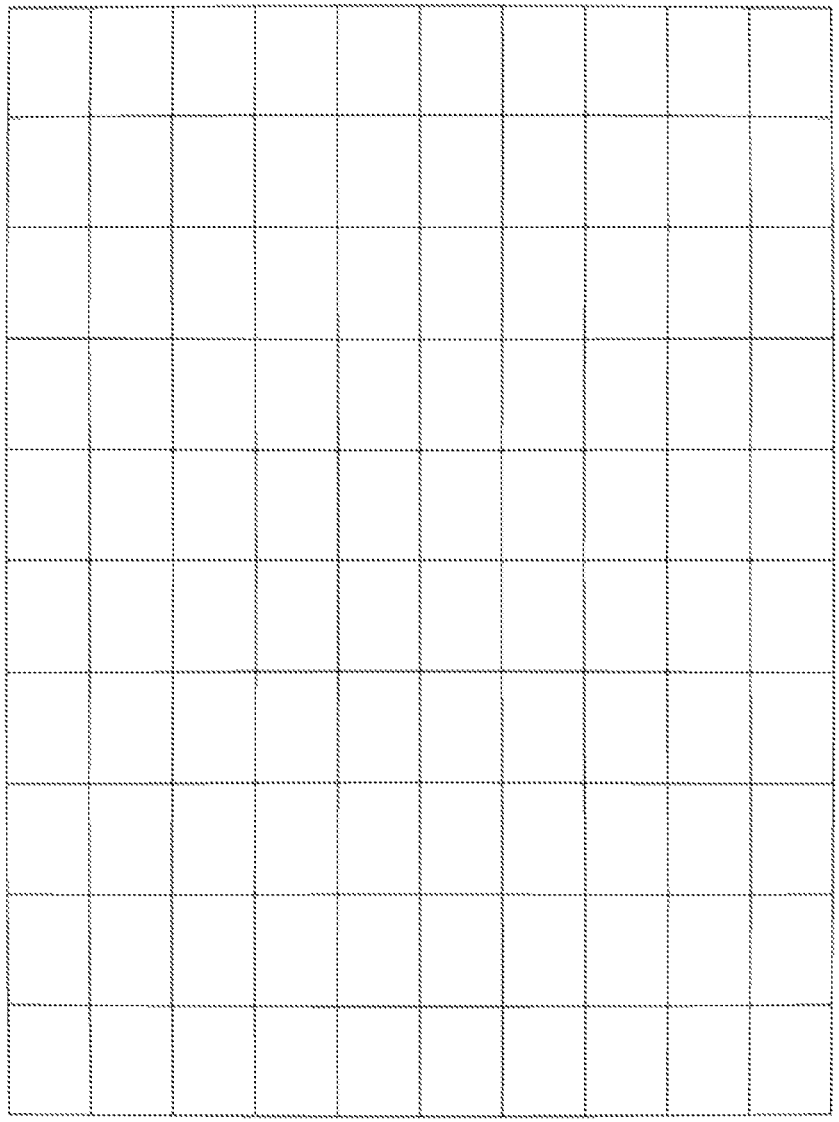
FIG. 5D shows a TV distortion for close-up photographing of the single focus optical image capturing system according to the 5th embodiment.
Figure 5F:
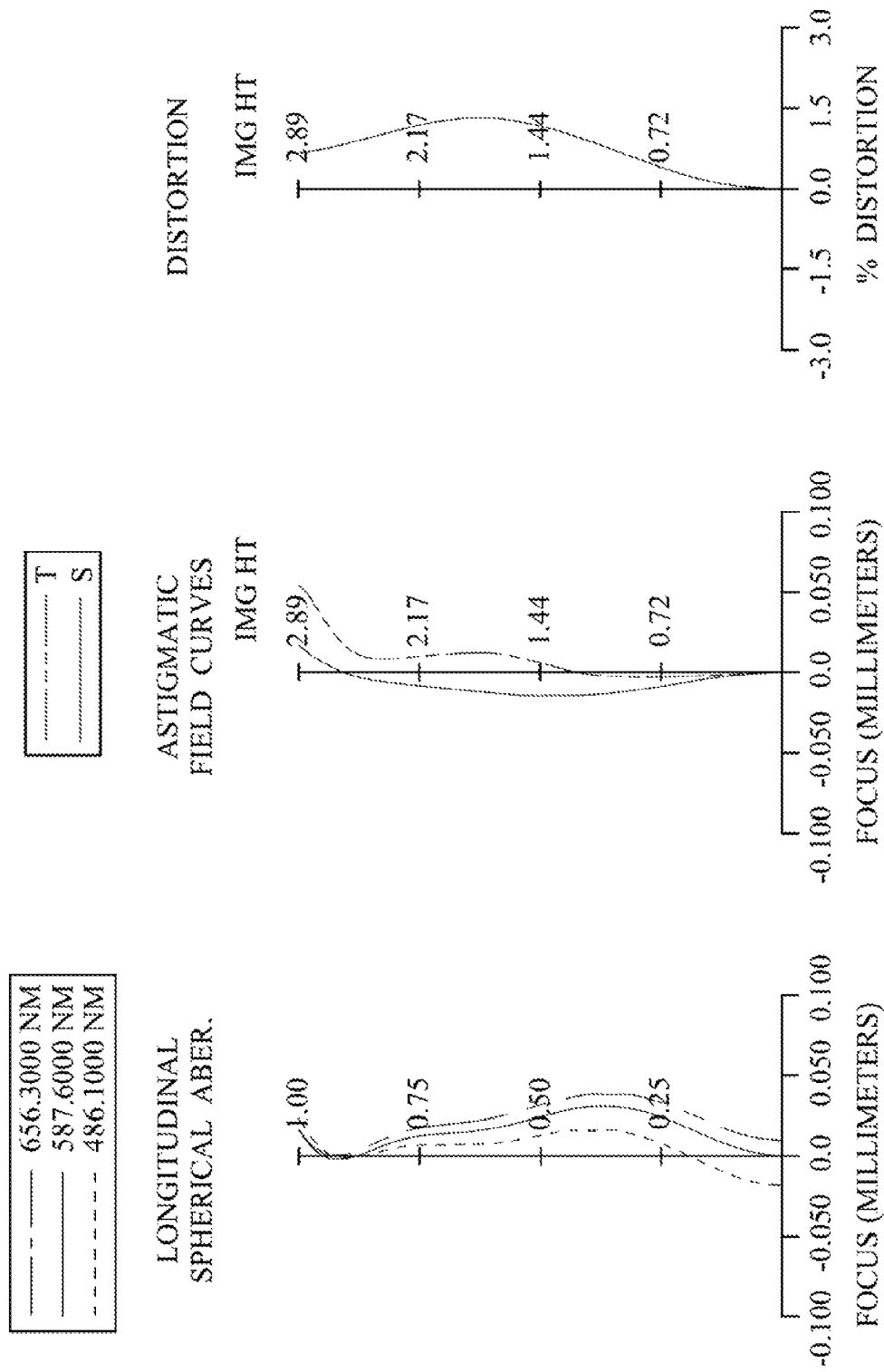
FIG. 5F shows spherical aberration curves, astigmatic field curves and a distortion curve for close-up photographing of the single focus optical image capturing system according to the 5th embodiment.

FIG. 5A is a schematic view of a single focus optical image capturing system according to the 5th embodiment of the present disclosure. FIG. 5B shows a TV distortion for long distance photographing of the single focus optical image capturing system according to the 5th embodiment. FIG. 5C shows spherical aberration curves, astigmatic field curves and a distortion curve for long distance photographing of the single focus optical image capturing system according to the 5th embodiment. FIG. 5D shows a TV distortion for close-up photographing of the single focus optical image capturing system according to the 5th embodiment. FIG. 5F shows spherical aberration curves, astigmatic field curves and a distortion curve for close-up photographing of the single focus optical image capturing system according to the 5th embodiment. In FIG. 5A, the single focus optical image capturing system includes, in order from an object side to an image side, an aperture stop 500, a first lens element 510, a second lens element 520, a third lens element 530, a fourth lens element 540, a fifth lens element 550, an IR-cut filter 570, an image plane 560, and an image sensor 580.

The first lens element 510 with positive refractive power has a convex object-side surface 511 and a concave image-side surface 512. The first lens element 510 is made of plastic material and has the object-side surface 511 and the image-side surface 512 being aspheric.

The second lens element 520 with negative refractive power has a convex object-side surface 521 and a concave image-side surface 522. The second lens element 520 is made of plastic material and has the object-side surface 521 and the image-side surface 522 being aspheric.

The third lens element 530 with positive refractive power has a concave object-side surface 531 and a convex image-side surface 532. The third lens element 530 is made of plastic material and has the object-side surface 531 and the image-side surface 532 being aspheric.

The fourth lens element 540 with negative refractive power has a concave object-side surface 541 and a convex image-side surface 542. The fourth lens element 540 is made of plastic material and has the object-side surface 541 and the image-side surface 542 being aspheric.

The fifth lens element 550 with negative refractive power has a convex object-side surface 551 and a concave image-side surface 552. The fifth lens element 550 is made of plastic material and has the object-side surface 551 and the image-side surface 552 being aspheric. Furthermore, the fifth lens element 550 has at least one inflection point on the object-side surface 551 and the image-side surface 552 thereof.

The IR-cut filter 570 made of plastic material is located between the fifth lens element 550 and the image plane 560, and will not affect a focal length of the single focus optical image capturing system.

The detailed optical data of the 5th embodiment are shown in Table 9, and the aspheric surface data are shown in Table 10 below.

TABLE 9

5th Embodiment
f = 3.98 mm, Fno = 2.43, HFOV = 35.4 deg,
H = 4.623 mm, V = 3.468 mm, Resolution = 4128 × 3096, Pixel size = 1.12 × 1.12 μm × μm

| Surface # | | Curvature Radius | | Thickness | | Material | Index | Abbe # | Focal length |
|---|---|---|---|---|---|---|---|---|---|
| 0 | Object | Plano | | Long distance | Close-up | | | | |
| | | | | 10000.000 | 100.000 | | | | |
| 1 | Ape. Stop | Plano | | −0.272 | | | | | |
| 2 | Lens 1 | 1.347 | (ASP) | 0.442 | | Plastic | 1.544 | 55.9 | 3.40 |
| 3 | | 4.390 | (ASP) | 0.153 | | | | | |
| 4 | Lens 2 | 3.908 | (ASP) | 0.240 | | Plastic | 1.834 | 23.8 | −6.00 |
| 5 | | 1.881 | (ASP) | 0.312 | | | | | |
| 6 | Lens 3 | −1525.319 | (ASP) | 0.313 | | Plastic | 1.544 | 55.9 | 5.04 |
| 7 | | −2.738 | (ASP) | 0.412 | | | | | |
| 8 | Lens 4 | −0.881 | (ASP) | 0.333 | | Plastic | 1.614 | 25.6 | −26.48 |
| 9 | | −1.066 | (ASP) | 0.157 | | | | | |
| 10 | Lens 5 | 2.829 | (ASP) | 0.880 | | Plastic | 1.543 | 56.5 | −13.93 |
| 11 | | 1.834 | (ASP) | 0.600 | | | | | |
| 12 | IR-cut filter | Plano | | 0.110 | | Plastic | 1.514 | 56.8 | — |
| 13 | | Plano | | Long distance | Close-up | | | | |
| | | | | 0.699 | 0.863 | | | | |
| 14 | Image | Plano | | — | | | | | |

Note:
Reference wavelength (d-line) is 587.6 nm.
V (mm) is the height of the imaging area of the image sensor (i.e. the shorter length of the imaging area).
H (mm) is the width of the imaging area of the image sensor (i.e. the longer length of the imaging area).
Pixel size (μm × μm) is the size of a single pixel on the imaging area of the image sensor.

TABLE 10

Aspheric Coefficients

| | Surface # | | | | |
|---|---|---|---|---|---|
| | 2 | 3 | 4 | 5 | 6 |
| k = | −4.6024E−02 | −1.7793E+01 | −9.0000E+01 | −6.3752E+00 | 2.0000E+01 |
| A4 = | −3.5951E−03 | −1.0046E−01 | −1.8856E−01 | −1.5291E−01 | −1.3099E−01 |
| A6 = | 6.9588E−02 | 1.2824E−01 | 1.8678E−01 | 4.0990E−01 | −1.4423E−01 |
| A8 = | −1.2828E−01 | −6.5492E−02 | 1.2033E−01 | −1.6023E−01 | 7.5239E−01 |
| A10 = | 5.3523E−02 | −3.4850E−02 | −2.3108E−01 | 3.8140E−02 | −1.8313E+00 |
| A12 = | 2.0923E−01 | 1.3058E−02 | −1.2041E−01 | −1.6086E−02 | 2.8294E+00 |
| A14 = | −2.4037E−01 | −6.5971E−02 | 1.4243E−01 | 3.9534E−02 | −1.9346E+00 |
| A16 = | | | | | 3.7936E−01 |

| | Surface # | | | | |
|---|---|---|---|---|---|
| | 7 | 8 | 9 | 10 | 11 |
| k = | 2.0212E+00 | −3.2231E+00 | −7.5675E−01 | −1.3863E+01 | −7.9421E+00 |
| A4 = | −3.6989E−02 | −3.9678E−02 | 1.1717E−01 | −2.1895E−01 | −9.3614E−02 |
| A6 = | −1.0285E−02 | −2.9455E−03 | −3.4666E−02 | 1.5826E−01 | 4.6239E−02 |
| A8 = | 4.9467E−02 | 1.5564E−01 | 3.7696E−02 | −1.2226E−01 | −2.2358E−02 |
| A10 = | 7.0234E−02 | −8.4540E−02 | 1.3878E−02 | 7.6007E−02 | 7.8588E−03 |
| A12 = | −5.2449E−03 | −1.7099E−02 | −7.9985E−03 | −2.6476E−02 | −1.7584E−03 |
| A14 = | −2.5783E−02 | 5.5877E−03 | −5.4368E−03 | 4.6425E−03 | 2.2403E−04 |
| A16 = | | 4.7344E−03 | 1.8377E−03 | −3.2421E−04 | −1.2109E−05 |

In the single focus optical image capturing system according to the 5th embodiment, the definitions of f, Fno, HFOV, V2, V3, V4, CT4, CT5, R3, R4, R7, R8, f1, f2, f3, f4, f5, TVDi, TVDm, V, H, TTL, and ImgH are the same as those stated in the 1st embodiment with corresponding values for the 5th embodiment. Moreover, these parameters can be calculated from Table 9 and Table 10 as the following values and satisfy the following relationships:

| | | | |
|---|---|---|---|
| f (mm) | 3.98 | $(|f/f4| + |f/f5|)/(|f/f1| + |f/f2| + |f/f3|)$ | 0.17 |
| Fno | 2.43 | $|TVDi|$ (%) | 0.074 |
| HFOV (deg.) | 35.4 | $|TVDm|$ (%) | 0.694 |
| (V2 + V4)/V3 | 0.88 | $|TVDi - TVDm|$ (%) | 0.768 |
| CT4/CT5 | 0.38 | V (mm) | 3.468 |
| R4/R3 | 0.48 | H (mm) | 4.623 |
| (R7 − R8)/(R7 + R8) | −0.09 | TTL × f/ImgH (mm) | 6.359 |

6th Embodiment

Figure 6A:
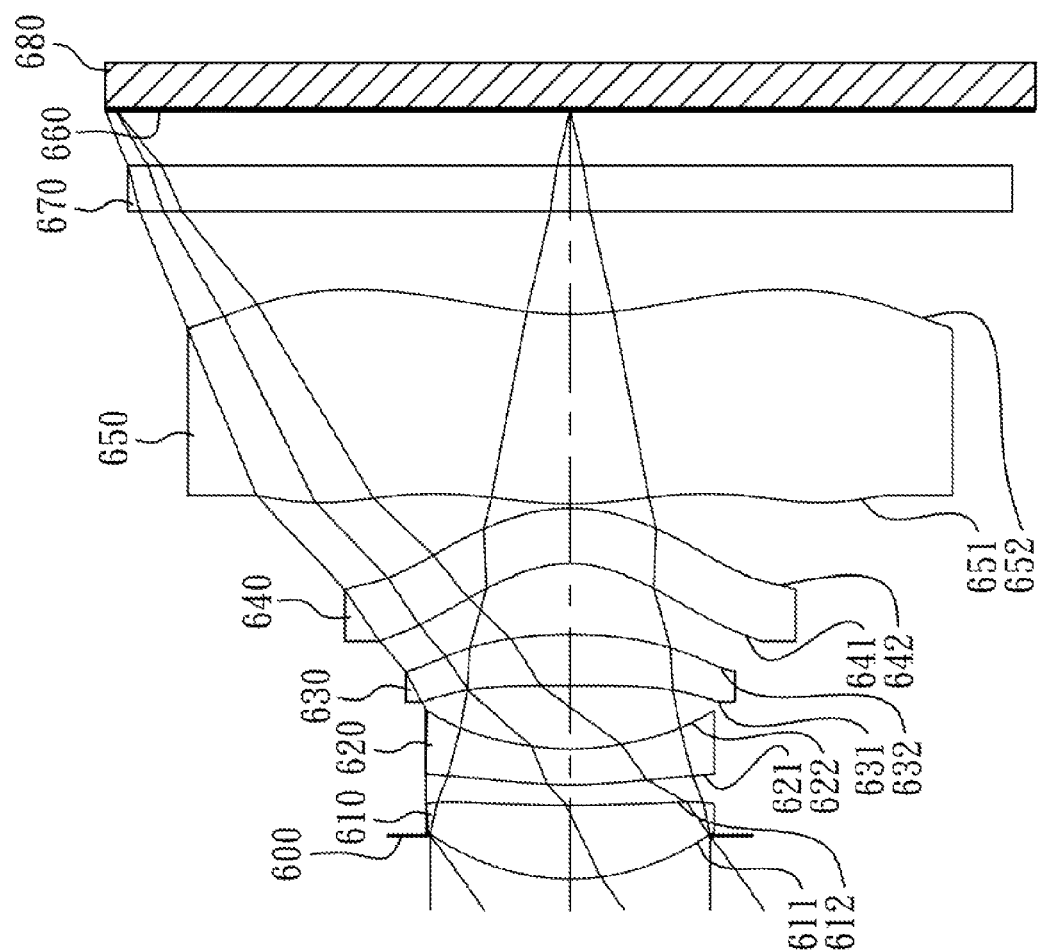
FIG. 6A is a schematic view of a single focus optical image capturing system according to the 6th embodiment of the present disclosure.
Figure 6B:
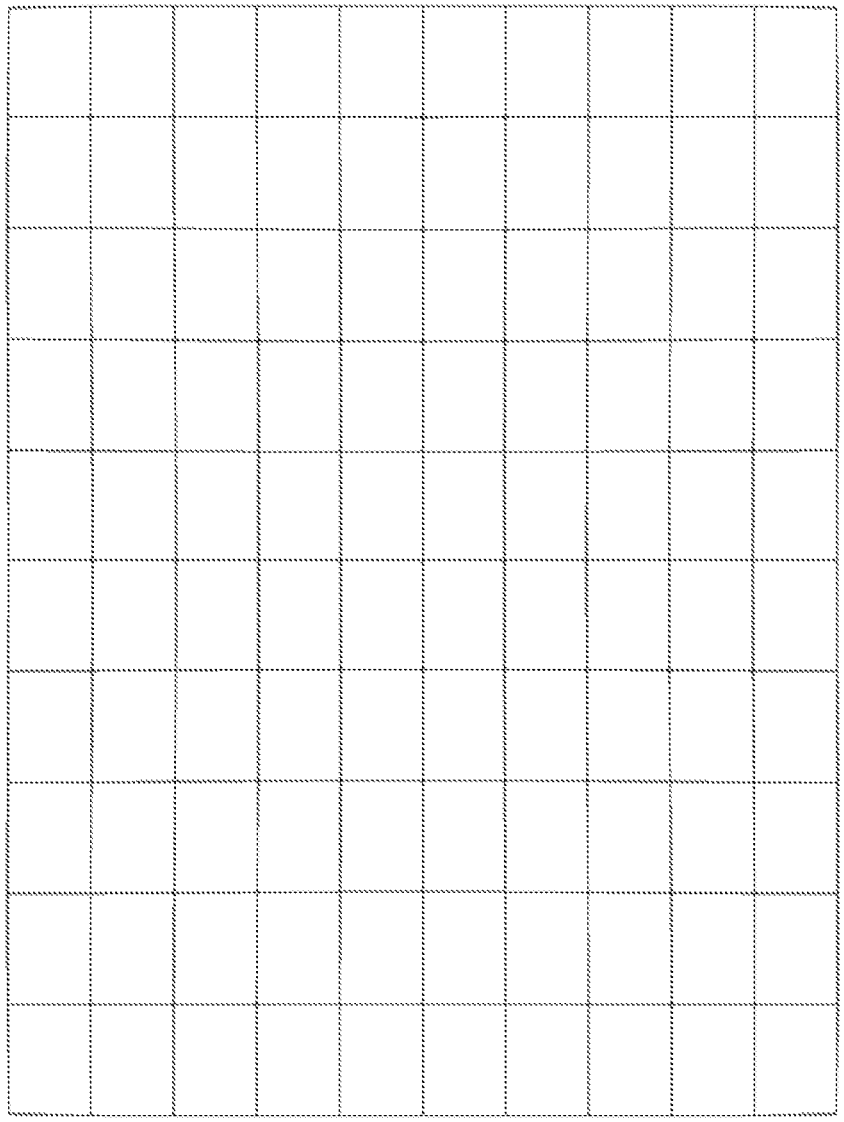
FIG. 6B shows a TV distortion for long distance photographing of the single focus optical image capturing system according to the 6th embodiment.
Figure 6C:
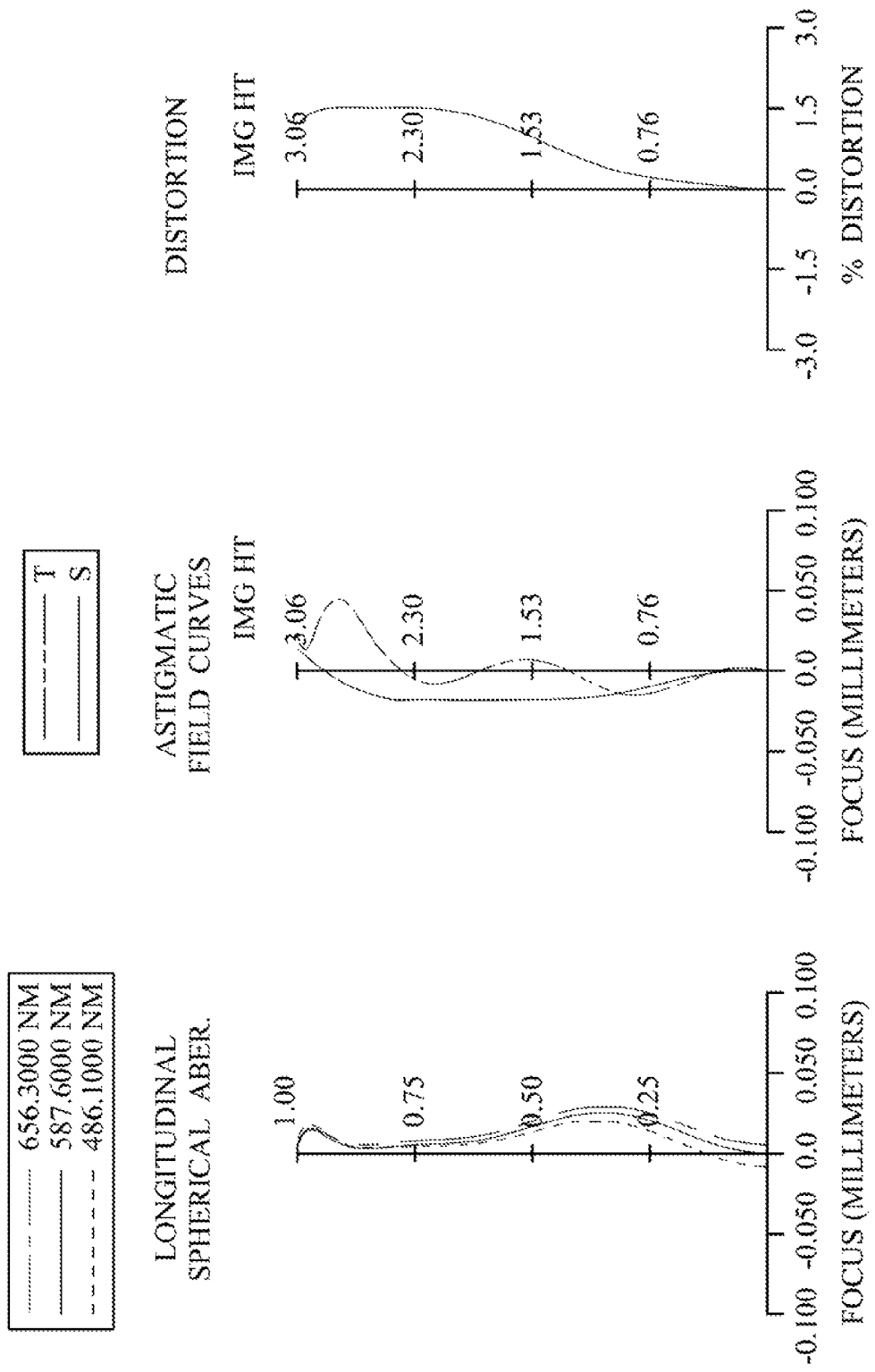
FIG. 6C shows spherical aberration curves, astigmatic field curves and a distortion curve for long distance photographing of the single focus optical image capturing system according to the 6th embodiment.
Figure 6F:
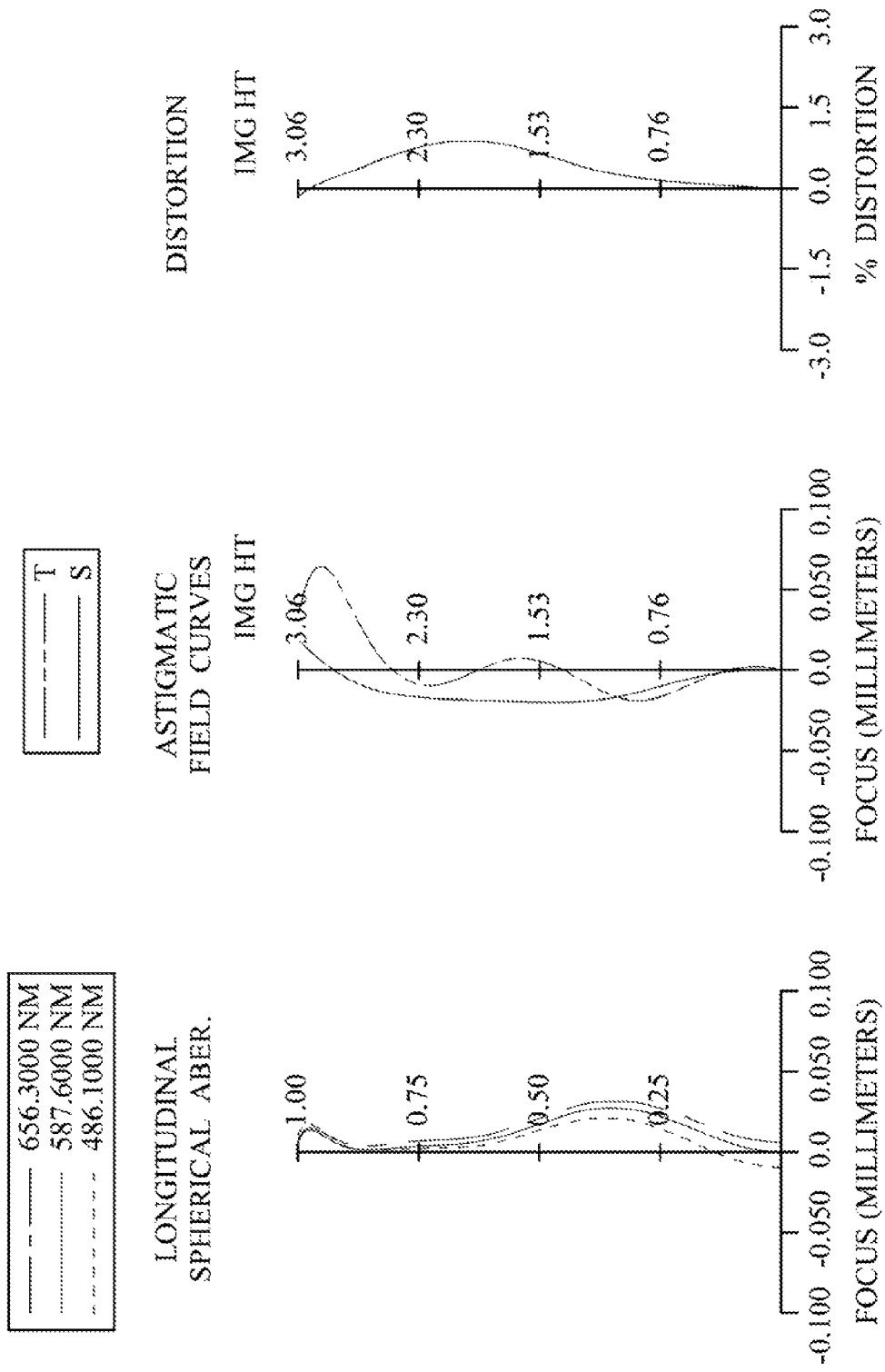
FIG. 6F shows spherical aberration curves, astigmatic field curves and a distortion curve for close-up photographing of the single focus optical image capturing system according to the 6th embodiment.

FIG. 6A is a schematic view of a single focus optical image capturing system according to the 6th embodiment of the present disclosure. FIG. 6B shows TV distortion for long distance photographing of the single focus optical image capturing system according to the 6th embodiment. FIG. 6C shows spherical aberration curves, astigmatic field curves and a distortion curve for long distance photographing of the single focus optical image capturing system according to the 6th embodiment. FIG. 6D shows a TV distortion for close-up photographing of the single focus optical image capturing system according to the 6th embodiment. FIG. 6F shows spherical aberration curves, astigmatic field curves and a distortion curve for close-up photographing of the single focus optical image capturing system according to the 6th embodiment. In FIG. 6A, the single focus optical image capturing system includes, in order from an object side to an image side, an aperture stop 600, a first lens element 610, a second lens element 620, a third lens element 630, a fourth lens element 640, a fifth lens element 650, an IR-cut filter 670, an image plane 660, and an image sensor 680.

The first lens element 610 with positive refractive power has a convex object-side surface 611 and a concave image-side surface 612. The first lens element 610 is made of plastic material and has the object-side surface 611 and the image-side surface 612 being aspheric.

The second lens element 620 with negative refractive power has a convex object-side surface 621 and a concave image-side surface 622. The second lens element 620 is made of plastic material and has the object-side surface 621 and the image-side surface 622 being aspheric.

The third lens element 630 with positive refractive power has a concave object-side surface 631 and a convex image-side surface 632. The third lens element 630 is made of plastic material and has the object-side surface 631 and the image-side surface 632 being aspheric.

The fourth lens element 640 with negative refractive power has a concave object-side surface 641 and a convex image-side surface 642. The fourth lens element 640 is made of plastic material and has the object-side surface 641 and the image-side surface 642 being aspheric.

The fifth lens element 650 with positive refractive power has a convex object-side surface 651 and a concave image-side surface 652. The fifth lens element 650 is made of plastic material and has the object-side surface 651 and the image-side surface 652 being aspheric. Furthermore, the fifth lens element 650 has at least one inflection point on the object-side surface 651 and the image-side surface 652 thereof.

The IR-cut filter 670 made of glass material is located between the fifth lens element 650 and the image plane 660, and will not affect a focal length of the single focus optical image capturing system.

The detailed optical data of the 6th embodiment are shown in Table 11, and the aspheric surface data are shown in Table 12 below.

TABLE 11

6th Embodiment
f = 4.15 mm, Fno = 2.21, HFOV = 36.0 deg,
H = 4.896 mm, V = 3.672 mm, Resolution = 3264 × 2448, Pixel size = 1.5 × 1.5 μm × μm

| Surface # | | Curvature Radius | | Thickness | Material | Index | Abbe # | Focal length |
|---|---|---|---|---|---|---|---|---|
| 0 | Object | Plano | | Long distance | Close-up | | | |
| | | | | 10000.000 | 100.000 | | | |
| 1 | Ape. Stop | Plano | | −0.295 | | | | |
| 2 | Lens 1 | 1.596 | (ASP) | 0.499 | Plastic | 1.544 | 55.9 | 3.54 |
| 3 | | 8.279 | (ASP) | 0.139 | | | | |
| 4 | Lens 2 | 2.968 | (ASP) | 0.240 | Plastic | 1.640 | 23.3 | −6.58 |
| 5 | | 1.685 | (ASP) | 0.423 | | | | |
| 6 | Lens 3 | −99.958 | (ASP) | 0.349 | Plastic | 1.544 | 55.9 | 5.70 |
| 7 | | −3.012 | (ASP) | 0.474 | | | | |
| 8 | Lens 4 | −0.800 | (ASP) | 0.376 | Plastic | 1.640 | 23.3 | −7.60 |
| 9 | | −1.134 | (ASP) | 0.030 | | | | |
| 10 | Lens 5 | 2.267 | (ASP) | 1.273 | Plastic | 1.544 | 55.9 | 20.92 |
| 11 | | 2.270 | (ASP) | 0.700 | | | | |
| 12 | IR-cut filter | Plano | | 0.300 | Glass | 1.517 | 64.2 | — |
| 13 | | Plano | | Long distance | Close-up | | | |
| | | | | 0.382 | 0.561 | | | |
| 14 | Image | Plano | | — | | | | |

Note:
Reference wavelength (d-line) is 587.6 nm.
V (mm) is the height of the imaging area of the image sensor (i.e. the shorter length of the imaging area).
H (mm) is the width of the imaging area of the image sensor (i.e. the longer length of the imaging area).
Pixel size (μm × μm) is the size of a single pixel on the imaging area of the image sensor.

TABLE 12

Aspheric Coefficients

| Surface # | | | | | |
|---|---|---|---|---|---|
| | 2 | 3 | 4 | 5 | 6 |
| k = | −5.2691E−02 | −1.1534E+01 | −3.0508E+01 | −7.6861E+00 | −9.0000E+01 |
| A4 = | −5.2216E−04 | −7.6990E−02 | −1.0736E−01 | 8.7491E−04 | −1.0193E−01 |
| A6 = | 3.3366E−02 | 1.1069E−01 | 1.1952E−01 | 4.7464E−02 | −3.8009E−02 |
| A8 = | −5.1509E−02 | −8.3833E−02 | 2.5596E−02 | 1.4629E−01 | 2.7892E−03 |
| A10 = | −1.2383E−01 | −1.3706E−02 | −1.3525E−01 | −2.4368E−01 | 2.8242E−03 |
| A12 = | 9.9599E−02 | 4.2875E−02 | 4.4865E−02 | 1.5329E−01 | 2.0743E−02 |
| A14 = | −7.7512E−02 | −3.6527E−02 | 1.5158E−02 | −2.4257E−02 | 6.1198E−02 |
| A16 = | | | | | −4.8470E−02 |

| Surface # | | | | | |
|---|---|---|---|---|---|
| | 7 | 8 | 9 | 10 | 11 |
| k = | 2.7898E+00 | −3.5733E+00 | −7.3498E−01 | −2.2235E+01 | −1.0040E+01 |
| A4 = | −3.7301E−02 | −7.2072E−02 | 1.0941E−01 | −1.0898E−01 | −4.8457E−02 |
| A6 = | −4.6685E−02 | −1.6007E−02 | −3.5056E−02 | 6.5631E−02 | 1.9104E−02 |
| A8 = | 1.8609E−02 | 1.2204E−01 | 2.2585E−02 | −4.1963E−02 | −7.8145E−03 |
| A10 = | 3.3412E−02 | −4.7327E−02 | 9.8266E−03 | 2.1065E−02 | 2.1898E−03 |
| A12 = | −2.6622E−03 | −7.2440E−03 | −3.2170E−03 | −5.8801E−03 | −3.8398E−04 |
| A14 = | 1.1122E−03 | 2.7367E−03 | −2.6736E−03 | 8.2522E−04 | 3.8102E−05 |
| A16 = | | 4.6012E−04 | 7.6214E−04 | −4.6114E−05 | −1.5997E−06 |

In the single focus optical image capturing system according to the 6th embodiment, the definitions of f, Fno, HFOV, V2, V3, V4, CT4, CT5, R3, R4, R7, R8, f1, f2, f3, f4, f5, TVDi, TVDm, V, H, TTL, and ImgH are the same as those stated in the 1st embodiment with corresponding values for the 6th embodiment. Moreover, these parameters can be calculated from Table 11 and Table 12 as the following values and satisfy the following relationships:

| | | | |
|---|---|---|---|
| f (mm) | 4.15 | $(|f/f4| + |f/f5|)/(|f/f1| + |f/f2| + |f/f3|)$ | 0.29 |
| Fno | 2.21 | $|TVDi|$ (%) | 0.146 |
| HFOV (deg.) | 36.0 | $|TVDm|$ (%) | 1.038 |
| (V2 + V4)/V3 | 0.83 | $|TVDi - TVDm|$ (%) | 0.892 |
| CT4/CT5 | 0.30 | V (mm) | 3.672 |
| R4/R3 | 0.57 | H (mm) | 4.896 |
| (R7 − R8)/(R7 + R8) | −0.17 | TTL × f/ImgH (mm) | 6.895 |

7th Embodiment

Figure 7C:
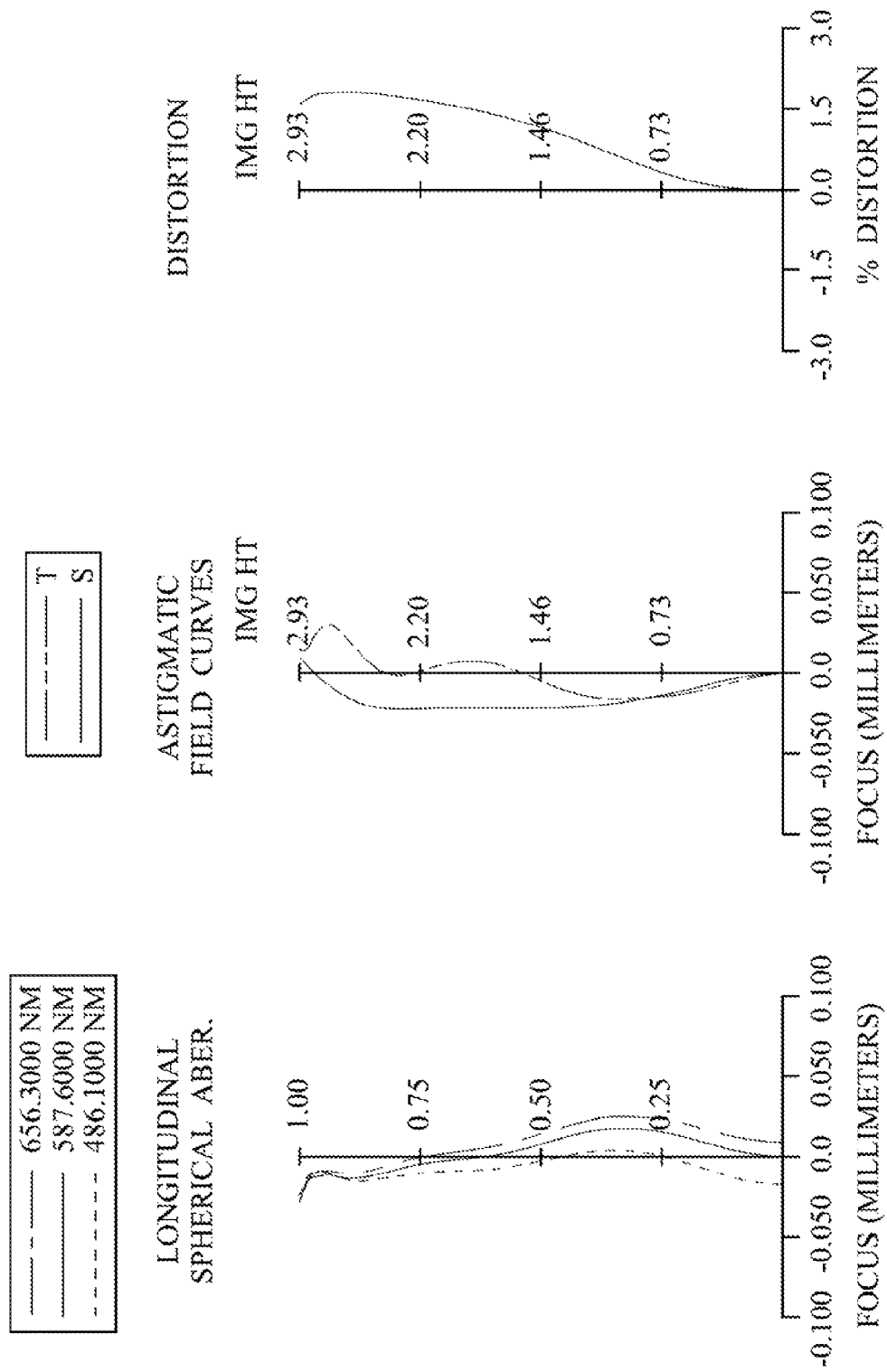
FIG. 7C shows spherical aberration curves, astigmatic field curves and a distortion curve for long distance photographing of the single focus optical image capturing system according to the 7th embodiment.
Figure 7F:
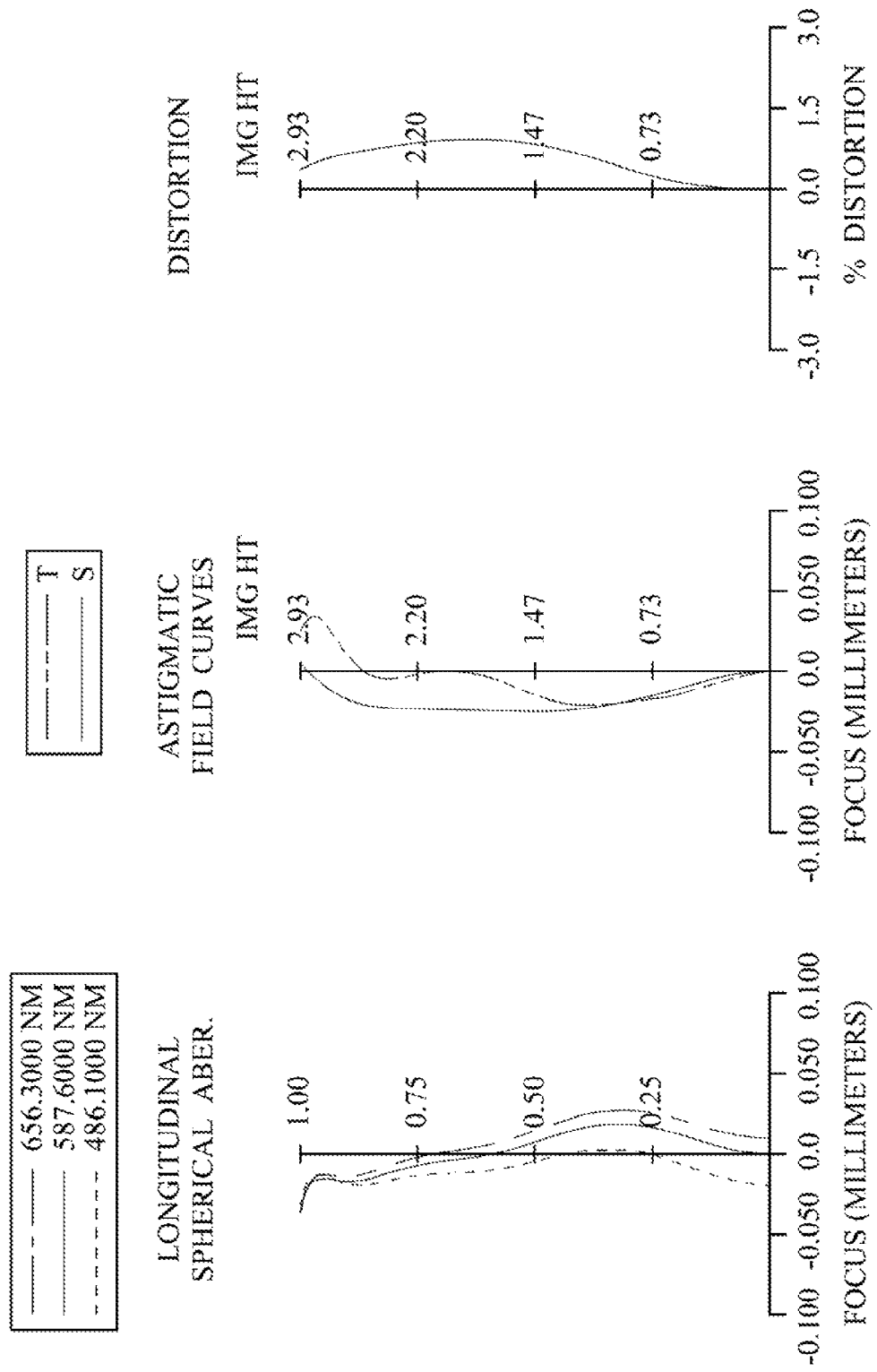
FIG. 7F shows spherical aberration curves, astigmatic field curves and a distortion curve for close-up photographing of the single focus optical image capturing system according to the 7th embodiment.

FIG. 7A is a schematic view of a single focus optical image capturing system according to the 7th embodiment of the present disclosure. FIG. 7B shows a TV distortion for long distance photographing of the single focus optical image capturing system according to the 7th embodiment. FIG. 7C shows spherical aberration curves, astigmatic field curves and a distortion curve for long distance photographing of the single focus optical image capturing system according to the 7th embodiment. FIG. 7D shows a TV distortion far close-up photographing of the single focus optical image capturing system according to the 7th embodiment. FIG. 7F shows spherical aberration curves, astigmatic field curves and a distortion curve for close-up photographing of the single focus optical image capturing system according to the 7th embodiment. In FIG. 7A, the single focus optical image capturing system includes, in order from an object side to an image side, an aperture stop 700, a first lens element 710, a second lens element 720, a third lens element 730, a fourth lens element 740, a fifth lens element 750, an IR-cut filter 770, an image plane 760, and an image sensor 780.

The first lens element 710 with positive refractive power has a convex object-side surface 711 and a concave image-side surface 712. The first lens element 710 is made of plastic material and has the object-side surface 711 and the image-side surface 712 being aspheric.

The second lens element 720 with negative refractive power has a convex object-side surface 721 and a concave image-side surface 722. The second lens element 720 is made of plastic material and has the object-side surface 721 and the image-side surface 722 being aspheric.

The third lens element 730 with positive refractive power has a concave object-side surface 731 and a convex image-side surface 732. The third lens element 730 is made of plastic material and has the object-side surface 731 and the image-side surface 732 being aspheric.

The fourth lens element 740 with negative refractive power has a concave object-side surface 741 and a convex image-side surface 742. The fourth lens element 740 is made of plastic material and has the object-side surface 741 and the image-side surface 742 being aspheric.

The fifth lens element 750 with negative refractive power has a convex object-side surface 751 and a concave image-side surface 752. The fifth lens element 750 is made of plastic material and has the object-side surface 751 and the image-side surface 752 being aspheric. Furthermore, the fifth lens element 750 has at least one inflection point on the object-side surface 751 and the image-side surface 752 thereof.

The IR-cut filter 770 made of plastic material is located between the fifth lens element 750 and the image plane 760, and will not affect a focal length of the single focus optical image capturing system.

The detailed optical data of the 7th embodiment are shown in Table 13, and the aspheric surface data are shown in Table 14 below.

TABLE 13

7th Embodiment
f = 4.08 mm, Fno = 2.43, HFOV = 35.3 deg,
H= 4.713 mm, V = 3.494 mm, Resolution = 4208 × 3120, Pixel size = 1.12 × 1.12 μm × μm

| Surface # | | Curvature Radius | | Thickness | | Material | Index | Abbe # | Focal length |
|---|---|---|---|---|---|---|---|---|---|
| 0 | Object | Plano | | Long distance 10000.000 | Close-up 100.000 | | | | |
| 1 | Ape. Stop | Plano | | −0.298 | | | | | |
| 2 | Lens 1 | 1.300 | (ASP) | 0.492 | | Plastic | 1.544 | 55.9 | 3.13 |
| 3 | | 4.754 | (ASP) | 0.113 | | | | | |
| 4 | Lens 2 | 4.043 | (ASP) | 0.240 | | Plastic | 1.640 | 23.3 | −6.31 |
| 5 | | 1.973 | (ASP) | 0.338 | | | | | |
| 6 | Lens 3 | −15.370 | (ASP) | 0.260 | | Plastic | 1.544 | 55.9 | 7.29 |
| 7 | | −3.173 | (ASP) | 0.363 | | | | | |
| 8 | Lens 4 | −0.898 | (ASP) | 0.286 | | Plastic | 1.640 | 23.3 | −19.93 |
| 9 | | −1.086 | (ASP) | 0.238 | | | | | |
| 10 | Lens 5 | 2.299 | (ASP) | 0.714 | | Plastic | 1.544 | 55.9 | −22.04 |
| 11 | | 1.718 | (ASP) | 0.600 | | | | | |
| 12 | IR-cut filter | Plano | | 0.110 | | Plastic | 1.514 | 56.8 | — |
| 13 | | Plano | | Long distance 0.781 | Close-up 0.951 | | | | |
| 14 | Image | Plano | | — | | | | | |

Note:
Reference wavelength (d-line) is 587.6 nm.
V (mm) is the height of the imaging area of the image sensor (i.e. the shorter length of the imaging area).
H (mm) is the width of the imaging area of the image sensor (i.e. the longer length of the imaging area).
Pixel size (μm × μm) is the size of a single pixel on the imaging area of the image sensor.

TABLE 14

Aspheric Coefficients

| | Surface # | | | | |
|---|---|---|---|---|---|
| | 2 | 3 | 4 | 5 | 6 |
| k = | −6.4331E−02 | −3.6844E+01 | −9.0000E+01 | −4.9698E+00 | −9.0000E+01 |
| A4 = | −2.3307E−04 | −1.0653E−01 | −1.6814E−01 | −1.2529E−01 | −1.4071E−01 |
| A6 = | 5.3852E−02 | 1.3070E−01 | 2.0703E−01 | 4.2523E−01 | −1.3340E−01 |
| A8 = | −9.5166E−02 | −4.4741E−02 | 1.1905E−01 | −2.0595E−01 | 5.3180E−01 |
| A10 = | 5.8395E−03 | −8.3818E−02 | −2.4827E−01 | 1.7049E−01 | −9.3419E−01 |
| A12 = | 2.2301E−01 | 4.0676E−02 | −1.0173E−01 | −3.3968E−02 | 1.1272E+00 |
| A14 = | −2.4111E−0 | −7.5396E−02 | 1.5294E−01 | 3.9534E−02 | −1.3266E−01 |
| A16 = | | | | | −4.6883E−01 |

| | Surface # | | | | |
|---|---|---|---|---|---|
| | 7 | 8 | 9 | 10 | 11 |
| k = | 1.4111E+00 | −3.7008E+00 | −7.2570E−01 | −1.3657E+01 | −8.8144E+00 |
| A4 = | −2.6059E−02 | −5.9632E−02 | 1.1041E−01 | −2.5702E−01 | −1.2627E−01 |
| A6 = | −2.9749E−02 | −7.1283E−03 | −3.7248E−02 | 1.9146E−01 | 6.5182E−02 |
| A8 = | 4.4131E−02 | 1.5139E−01 | 4.0367E−02 | −1.4054E−01 | −3.2269E−02 |
| A10 = | 9.3714E−02 | −8.9287E−02 | 1.7983E−02 | 8.2482E−02 | 1.1687E−02 |
| A12 = | −3.8683E−03 | −1.6177E−02 | −7.4478E−03 | −2.7854E−02 | −2.7731E−03 |
| A14 = | −3.9523E−02 | 3.2551E−03 | −6.8231E−03 | 4.7940E−03 | 3.8292E−04 |
| A16 = | | 7.3415E−03 | 1.0893E−03 | −3.3006E−04 | −2.2651E−05 |

In the single focus optical image capturing system according to the 7th embodiment, the definitions of f, Fno, HFOV, V2, V3, V4, CT4, CT5, R3, R4, R7, R8, f1, f2, f3, f4, f5, TVDi, TVDm, V, H, TTL, and ImgH are the same as those stated in the 1st embodiment with corresponding values for the 7th embodiment. Moreover, these parameters can be calculated from Table 13 and Table 14 as the following values and satisfy the following relationships:

| | | | |
|---|---|---|---|
| f (mm) | 4.08 | (|f/f4| + |f/f5|)/(|f/f1| + |f/f2| + |f/f3|) | 0.16 |
| Fno | 2.43 | |TVDi| (%) | 0.199 |
| HFOV (deg.) | 35.3 | |TVDm| (%) | 0.495 |
| (V2 + V4)/V3 | 0.83 | |TVDi − TVDm| (%) | 0.694 |
| CT4/CT5 | 0.40 | V (mm) | 3.494 |
| R4/R3 | 0.49 | H (mm) | 4.713 |
| (R7 − R8)/(R7 + R8) | −0.09 | TTL × f/ImgH (mm) | 6.265 |

8th Embodiment

Figure 8A:
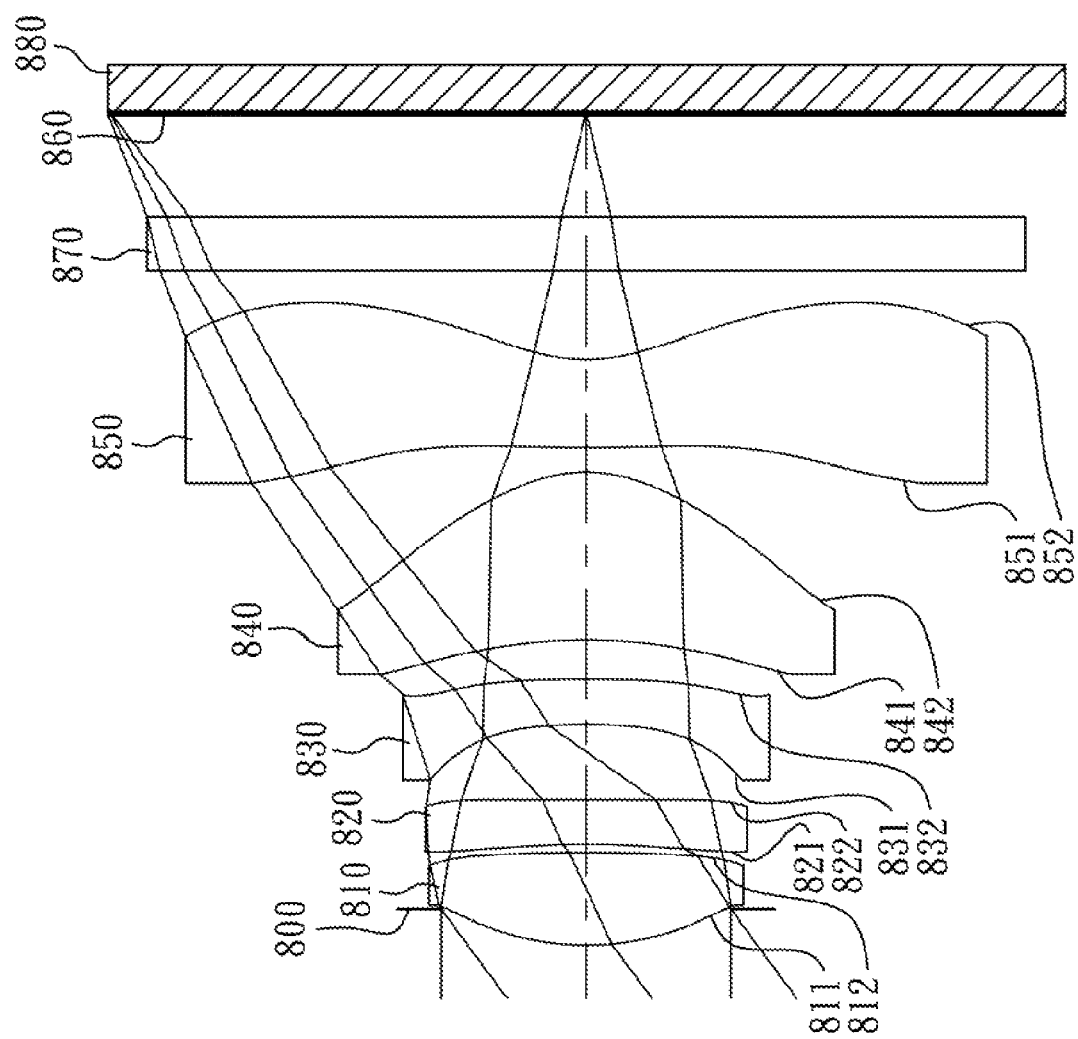
FIG. 8A is a schematic view of a single focus optical image capturing system according to the 8th embodiment of the present disclosure.
Figure 8C:
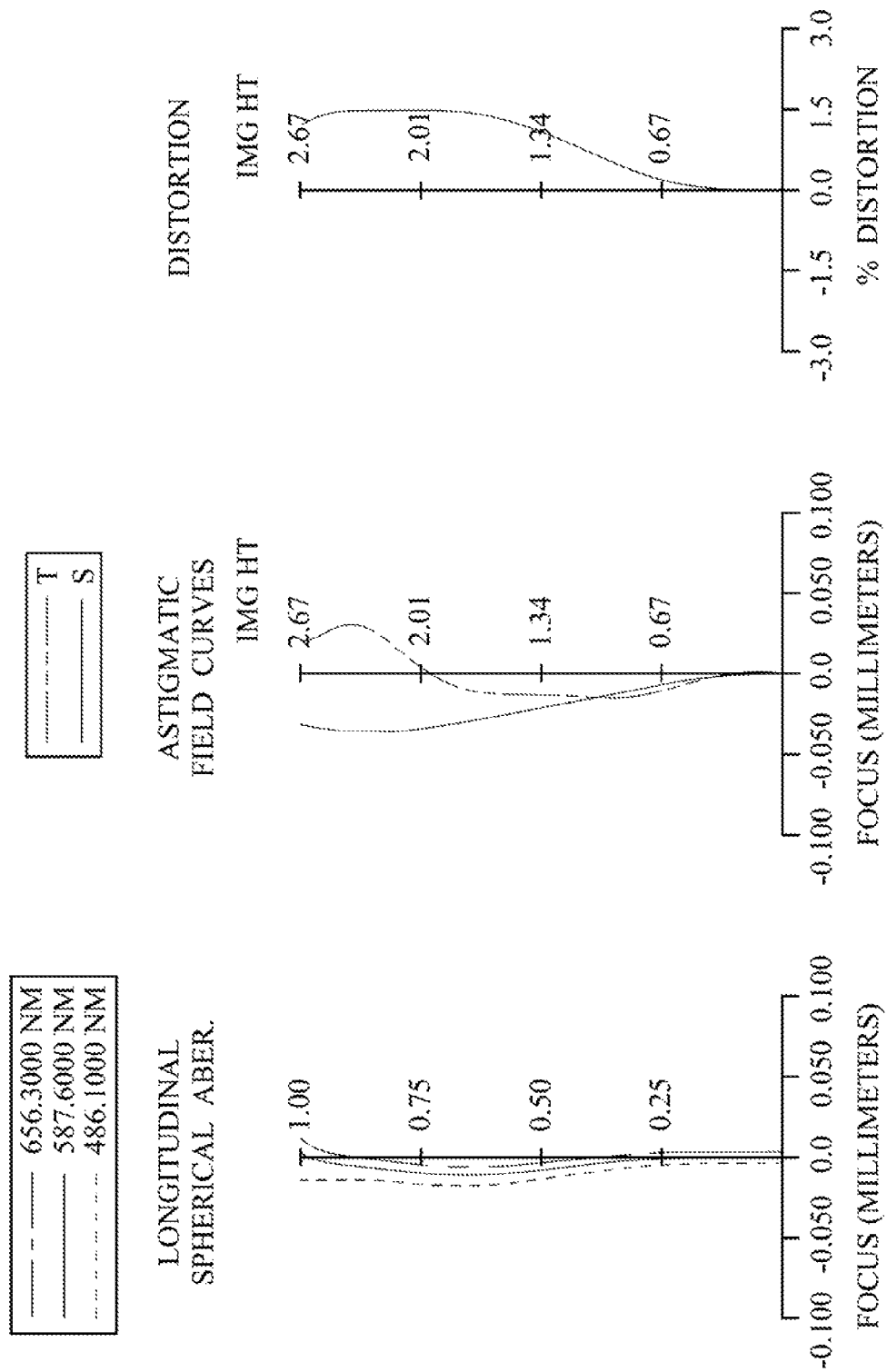
FIG. 8C shows spherical aberration curves, astigmatic field curves and a distortion curve for long distance photographing of the single focus optical image capturing system according to the 8th embodiment.
Figure 8D:
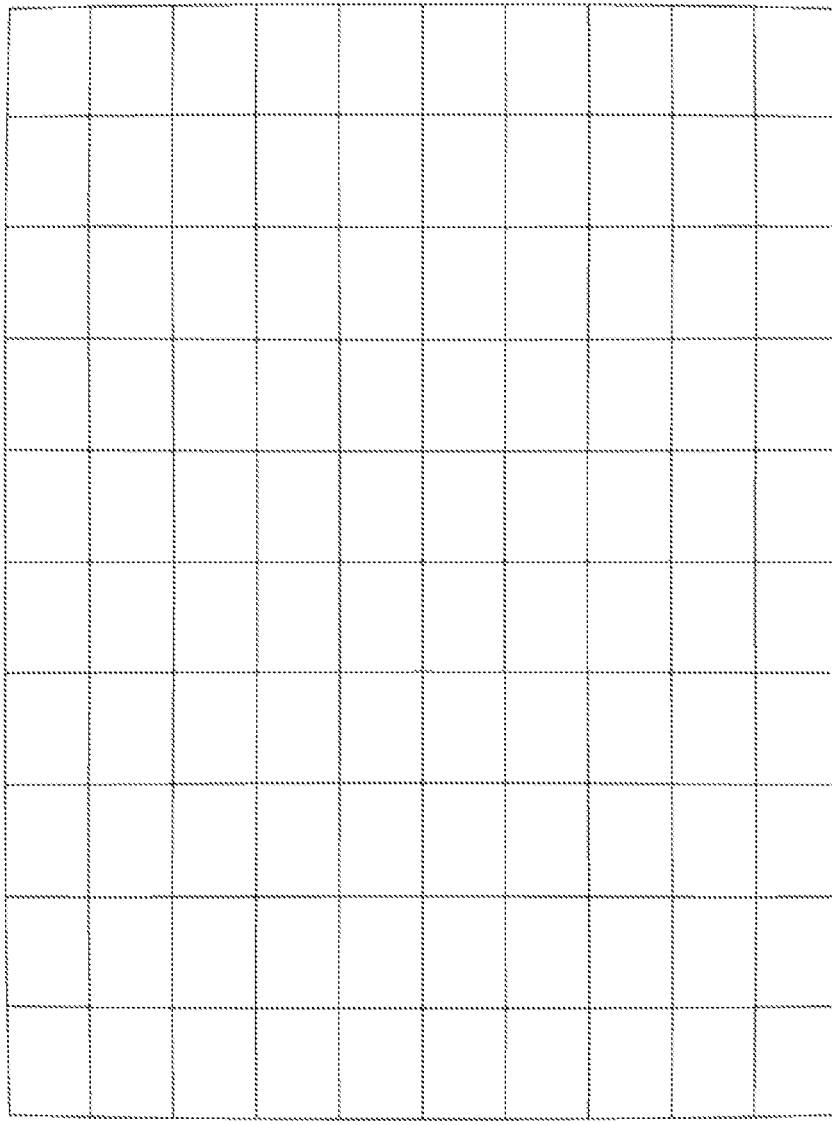
FIG. 8D shows a TV distortion for close-up photographing of the single focus optical image capturing system according to the 8th embodiment.
Figure 8F:
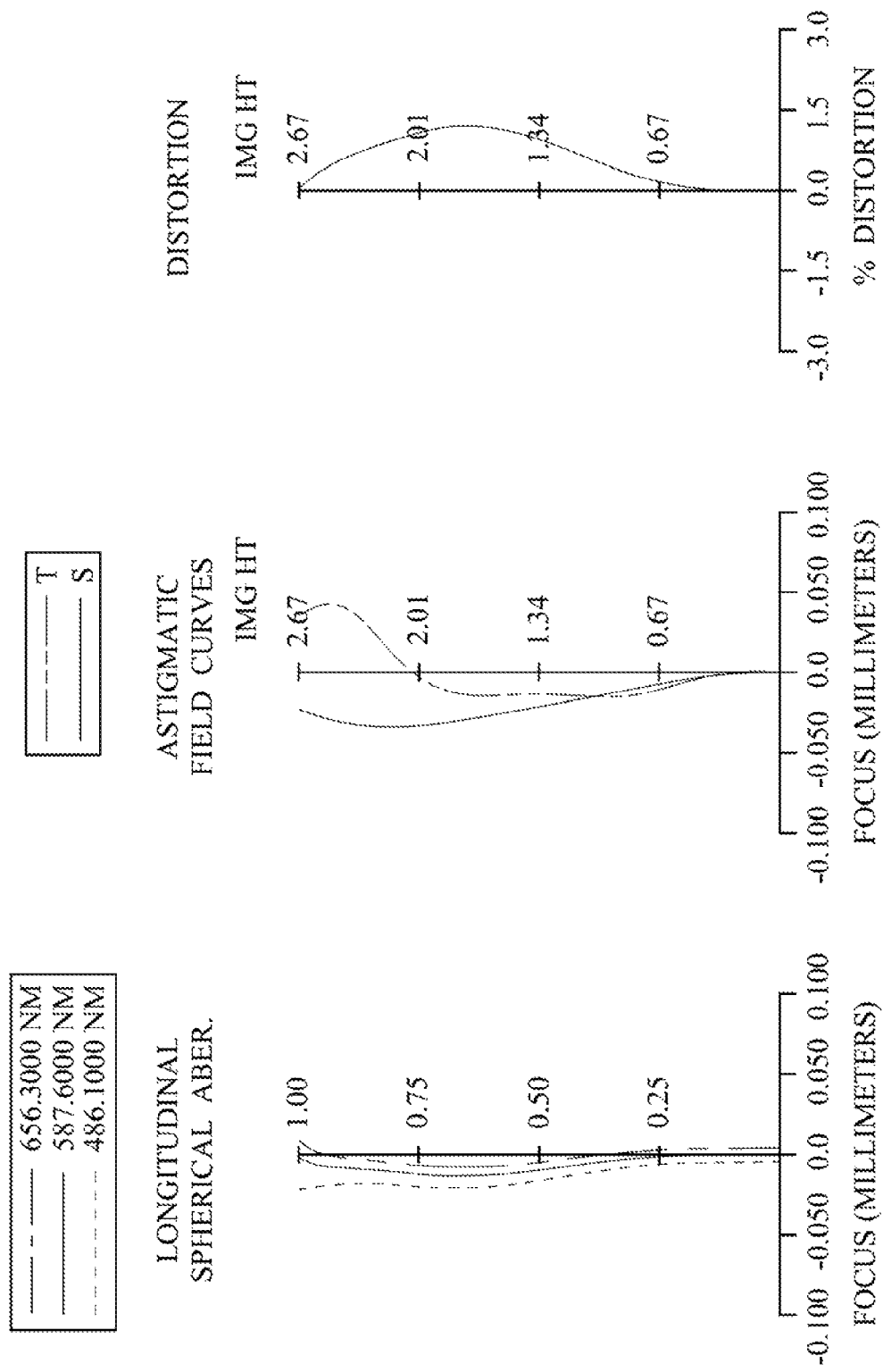
FIG. 8F shows spherical aberration curves, astigmatic field curves and a distortion curve for close-up photographing of the single focus optical image capturing system according to the 8th embodiment.

FIG. 8A is a schematic view of a single focus optical image capturing system according to the 8th embodiment of the present disclosure. FIG. 8B shows a TV distortion for long distance photographing of the single focus optical image capturing system according to the 8th embodiment. FIG. 8C shows spherical aberration curves, astigmatic field curves and a distortion curve for long distance photographing of the single focus optical image capturing system according to the 8th embodiment. FIG. 8D shows a TV distortion for close-up photographing of the single focus optical image capturing system according to the 8th embodiment. FIG. 8F shows spherical aberration curves, astigmatic field curves and a distortion curve for close-up photographing of the single focus optical image capturing system according to the 8th embodiment. In FIG. 8A, the single focus optical image capturing system includes, in order from an object side to an image side, an aperture stop 800, a first lens element 810, a second lens element 820, a third lens element 830, a fourth lens element 840, a fifth lens element 850, an IR-cut filter 870, an image plane 860, and an image sensor 880.

The first lens element 810 with positive refractive power has a convex object-side surface 811 and a convex image-side surface 812. The first lens element 810 is made of plastic material and has the object-side surface 811 and the image-side surface 812 being aspheric.

The second lens element 820 with negative refractive power has a concave object-side surface 821 and a convex image-side surface 822. The second lens element 820 is made of plastic material and has the object-side surface 821 and the image-side surface 822 being aspheric.

The third lens element 830 with negative refractive power has a concave object-side surface 831 and a convex image-side surface 832. The third lens element 830 is made of plastic material and has the object-side surface 831 and the image-side surface 832 being aspheric.

The fourth lens element 840 with positive refractive power has a concave object-side surface 841 and a convex image-side surface 842. The fourth lens element 840 is made of plastic material and has the object-side surface 841 and the image-side surface 842 being aspheric.

The fifth lens element 850 with negative refractive power has a convex object-side surface 851 and a concave image-side surface 852. The fifth lens element 850 is made of plastic material and has the object-side surface 851 and the image-side surface 852 being aspheric. Furthermore, the fifth lens element 850 has at least one inflection point on the object-side surface 851 and the image-side surface 852 thereof.

The IR-cut filter 870 made of glass material is located between the fifth lens element 850 and the image plane 860, and will not affect a focal length of the single focus optical image capturing system.

The detailed optical data of the 8th embodiment are shown in Table 15 and the aspheric surface data are shown in Table 16 below.

TABLE 15

8th Embodiment
f = 3.58 mm, Fno = 2.20, HFOV = 36.5 deg,
H = 4.277 mm, V = 3.208 mm, Resolution = 2592 × 1944, Pixel size = 1.65 × 1.65 μm × μm

| Surface # | | Curvature Radius | | Thickness | Material | Index | Abbe # | Focal length |
|---|---|---|---|---|---|---|---|---|
| 0 | Object | Plano | | Long distance | Close-up | | | |
| | | | | 10000.000 | 100.000 | | | |
| 1 | Ape. Stop | Plano | | −0.200 | | | | |
| 2 | Lens 1 | 1.534 | (ASP) | 0.521 | Plastic | 1.544 | 55.9 | 2.40 |
| 3 | | −7.848 | (ASP) | 0.046 | | | | |
| 4 | Lens 2 | −3.916 | (ASP) | 0.250 | Plastic | 1.634 | 23.8 | −6.76 |
| 5 | | −46.330 | (ASP) | 0.425 | | | | |
| 6 | Lens 3 | −3.244 | (ASP) | 0.250 | Plastic | 1.634 | 23.8 | −8.18 |
| 7 | | −8.919 | (ASP) | 0.225 | | | | |
| 8 | Lens 4 | −2.630 | (ASP) | 0.943 | Plastic | 1.544 | 55.9 | 1.77 |
| 9 | | −0.795 | (ASP) | 0.135 | | | | |
| 10 | Lens 5 | 9.277 | (ASP) | 0.497 | Plastic | 1.535 | 56.3 | −1.84 |
| 11 | | 0.873 | (ASP) | 0.500 | | | | |
| 12 | IR-cut filter | Plano | | 0.300 | Glass | 1.517 | 64.2 | — |
| 13 | | Plano | | Long distance | Close-up | | | |
| | | | | 0.584 | 0.716 | | | |
| 14 | Image | Plano | | — | | | | |

Note:
Reference wavelength (d-line) is 587.6 nm.
V (mm) is the height of the imaging area of the image sensor (i.e. the shorter length of the imaging area).
H (mm) is the width of the imaging area of the image sensor (i.e. the longer length of the imaging area).
Pixel size (μm × μm) is the size of a single pixel on the imaging area of the image sensor.

TABLE 16

Aspheric Coefficients

| Surface # | | | | |
|---|---|---|---|---|
| 2 | 3 | 4 | 5 | 6 |
| k = −7.6539E+00 | −4.9861E+01 | −4.4200E+01 | −5.0000E+01 | −2.8887E+01 |
| A4 = 2.5089E−01 | 7.1462E−02 | 1.1310E−01 | 8.5394E−02 | −2.9105E−01 |
| A6 = −2.7330E−01 | −5.3587E−05 | −1.0150E−01 | −2.6202E−01 | −3.5404E−01 |
| A8 = 3.4514E−01 | −4.8162E−01 | −6.1365E−02 | 3.7620E−01 | 4.0276E−01 |
| A10 = −5.5748E−01 | 3.4235E−01 | −2.6477E−01 | −5.0021E−01 | −1.1444E−01 |
| A12 = 5.9544E−01 | 2.6551E−01 | 8.5856E−01 | 3.6750E−01 | −2.2031E−02 |
| A14 = −3.8856E−01 | −3.0024E−01 | −4.8607E−01 | −1.5325E−01 | |

| Surface # | | | | |
|---|---|---|---|---|
| 7 | 8 | 9 | 10 | 11 |
| k = −3.4073E+01 | −1.7986E+01 | −3.5113E+00 | −5.5539E+01 | −5.8131E+00 |
| A4 = −3.5751E−02 | −2.7174E−02 | −1.6493E−01 | −7.1712E−02 | −7.6893E−02 |
| A6 = −2.7637E−01 | 7.0440E−02 | 1.6130E−01 | −9.1102E−03 | 2.9708E−02 |
| A8 = 3.3708E−01 | −2.6542E−01 | −1.4959E−01 | 2.1507E−02 | −9.5702E−03 |
| A10 = −6.6294E−02 | 3.5026E−01 | 8.6366E−02 | −7.4391E−03 | 2.0066E−03 |
| A12 = −6.9544E−04 | −1.9067E−01 | −2.0065E−02 | 1.0934E−03 | −2.3676E−04 |
| A14 = | 3.8266E−02 | 9.6608E−04 | −6.0807E−05 | 1.1550E−05 |

In the single focus optical image capturing system according to the 8th embodiment, the definitions of f, Fno, HFOV, V2, V3, V4, CT4, CT5, R3, R4, R7, R8, f1, f2, f3, f4, f5, TVDi, TVDm, V, H, TTL, and ImgH are the same as those stated in the 1st embodiment with corresponding values for the 8th embodiment. Moreover, these parameters can be calculated from Table 15 and Table 16 as the following values and satisfy the following relationships:

| | | | |
|---|---|---|---|
| f (mm) | 3.58 | (|f/f4| + |f/f5|)/(|f/f1| + |f/f2| + |f/f3|) | 1.61 |
| Fno | 2.20 | |TVDi| (%) | 0.051 |
| HFOV (deg.) | 36.5 | |TVDm| (%) | 1.042 |
| (V2 + V4)/V3 | 3.35 | |TVDi − TVDm| (%) | 0.991 |
| CT4/CT5 | 1.90 | V (mm) | 3.208 |
| R4/R3 | 11.83 | H (mm) | 4.277 |
| (R7 − R8)/(R7 + R8) | 0.54 | TTL × f/ImgH (mm) | 6.122 |

9th Embodiment

Figure 9B:
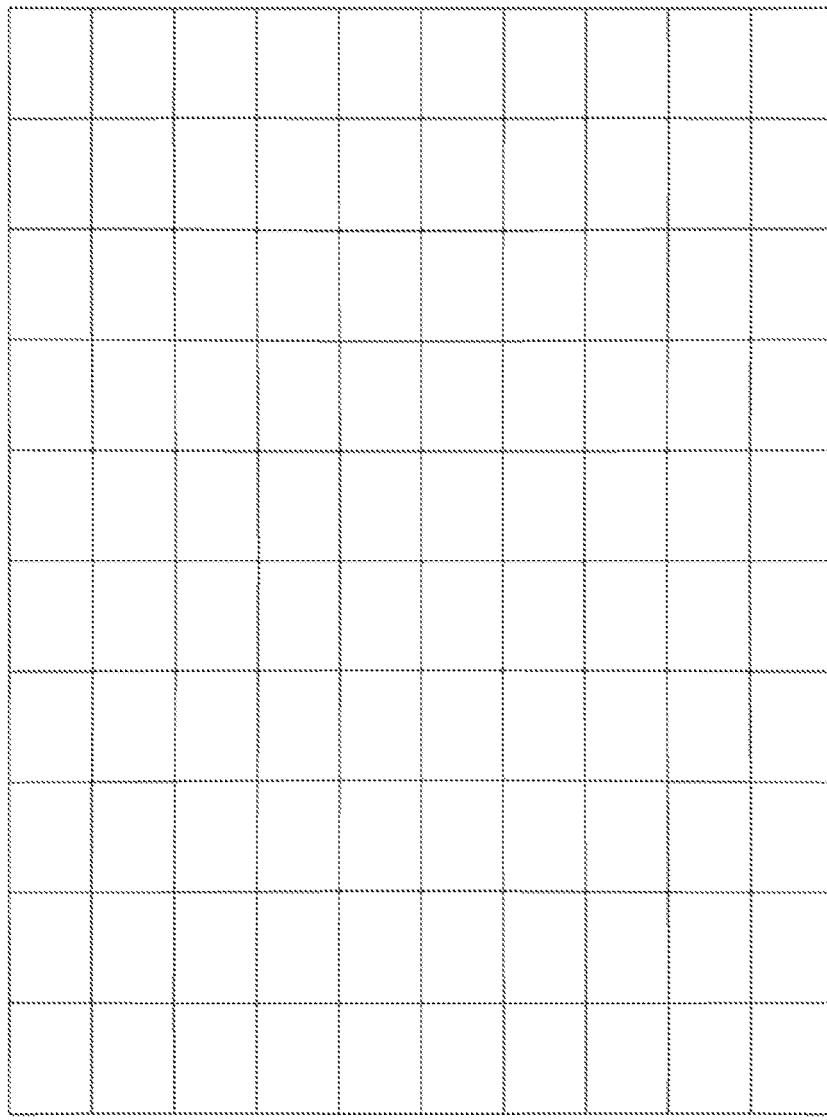
FIG. 9B shows a TV distortion for long distance photographing of the single focus optical image capturing system according to the 9th embodiment.
Figure 9C:
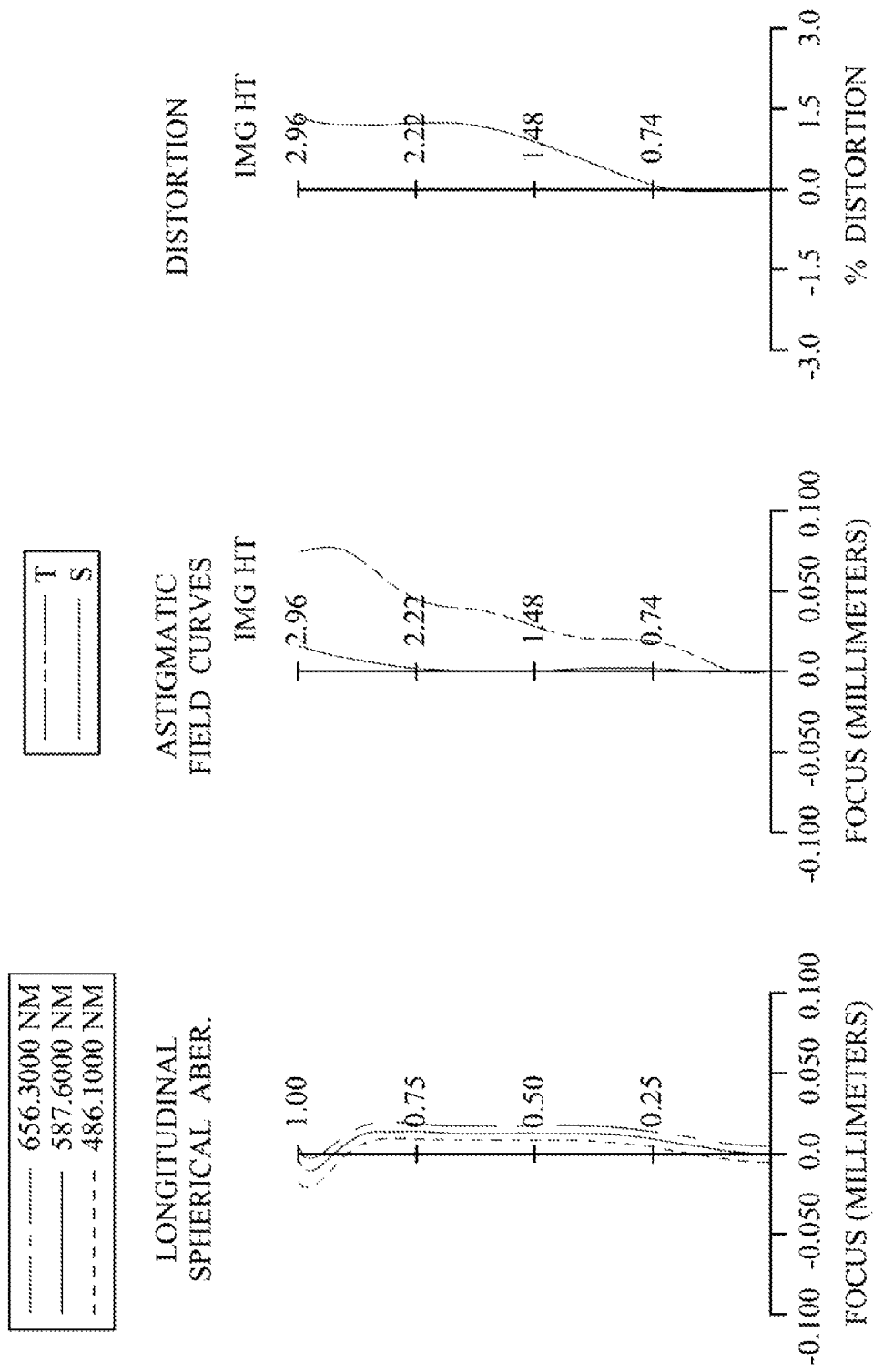
FIG. 9C shows spherical aberration curves, astigmatic field curves and a distortion curve for long distance photographing of the single focus optical image capturing system according to the 9th embodiment.
Figure 9D:
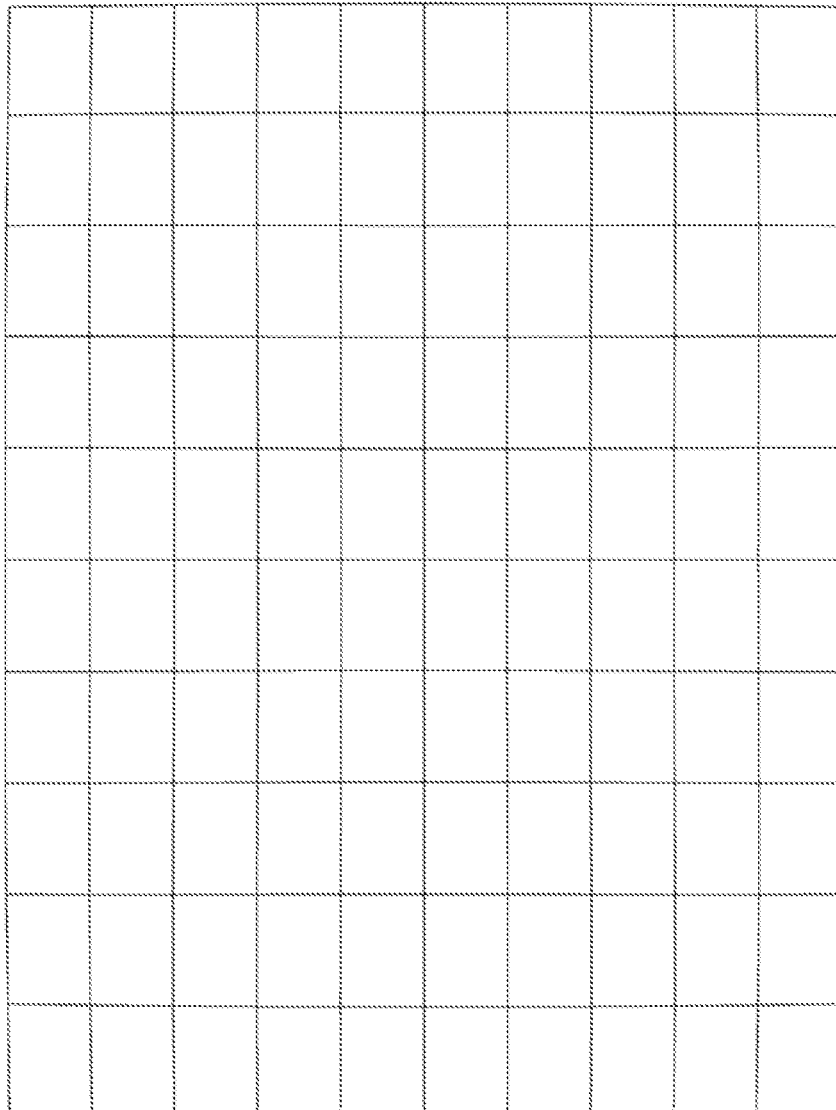
FIG. 9D shows a TV distortion for close-up photographing of the single focus optical image capturing system according to the 9th embodiment.
Figure 9F:
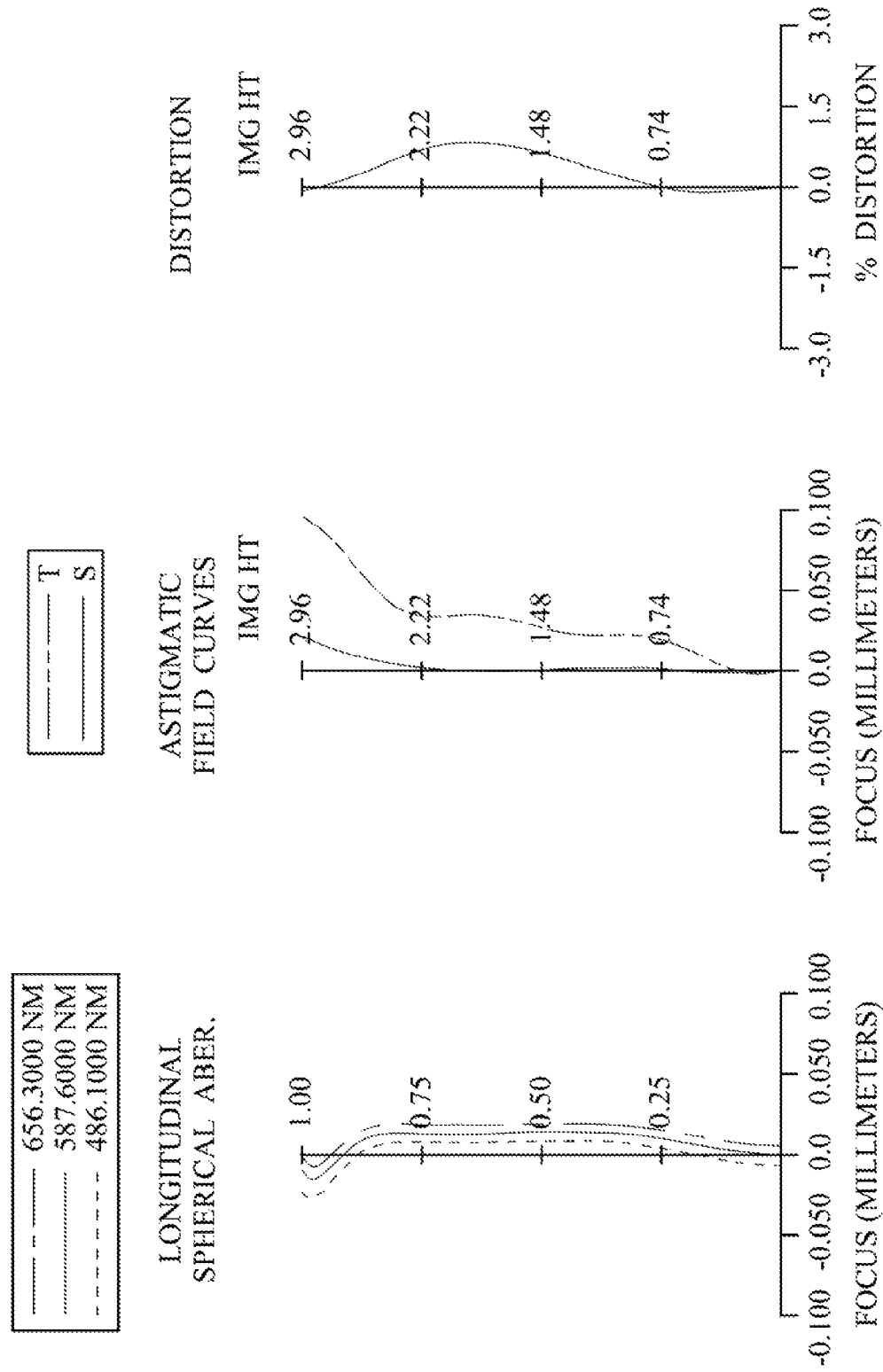
FIG. 9F shows spherical aberration curves, astigmatic field curves and a distortion curve for close-up photographing of the single focus optical image capturing system according to the 9th embodiment.

FIG. 9A is a schematic view of a single focus optical image capturing system according to the 9th embodiment of the present disclosure. FIG. 9B shows a TV distortion for long distance photographing of the single focus optical image capturing system according to the 9th embodiment. FIG. 9C shows spherical aberration curves, astigmatic field curves and a distortion curve for long distance photographing of the single focus optical image capturing system according to the 9th embodiment. FIG. 9D shows a TV distortion for close-up photographing of the single focus optical image capturing system according to the 9th embodiment. FIG. 9F shows spherical aberration curves, astigmatic field curves and a distortion curve for close-up photographing of the single focus optical image capturing system according to the 9th embodiment. In FIG. 9A, the single focus optical image capturing system includes, in order from an object side to an image side, a first lens element 910, an aperture stop 900, a second lens element 920, a third lens element 930, a fourth lens element 940, a fifth lens element 950, an IR-cut filter 970, an image plane 960, and an image sensor 980.

The first lens element 910 with positive refractive power has a convex object-side surface 911 and a convex image-side surface 912. The first lens element 910 is made of plastic material and has the object-side surface 911 and the image-side surface 912 being aspheric.

The second lens element 920 with negative refractive power has a concave object-side surface 921 and a concave image-side surface 922. The second lens element 920 is made of plastic material and has the object-side surface 921 and the image-side surface 922 being aspheric.

The third lens element 930 with negative refractive power has a concave object-side surface 931 and a convex image-side surface 932. The third lens element 930 is made of plastic material and has the object-side surface 931 and the image-side surface 932 being aspheric.

The fourth lens element 940 with positive refractive power has a concave object-side surface 941 and a convex image-side surface 942. The fourth lens element 940 is made of plastic material and has the object-side surface 941 and the image-side surface 942 being aspheric.

The fifth lens element 950 with negative refractive power has a concave object-side surface 951 and a concave image-side surface 952. The fifth lens element 950 is made of plastic material and has the object-side surface 951 and the image-side surface 952 being aspheric. Furthermore, the fifth lens element 950 has at least one inflection point on the image-side surface 952 thereof.

The IR-cut filter 970 made of glass material is located between the fifth lens element 950 and the image plane 960, and will not affect a focal length of the single focus optical image capturing system.

The detailed optical data of the 9th embodiment are shown in Table 17, and the aspheric surface data are shown in Table 18 below.

TABLE 17

9th Embodiment
f = 4.47 mm, Fno = 2.45, HFOV = 33.1 deg,
H = 4.731 mm, V = 3.557 mm, Resolution = 4224 × 3176, Pixel size = 1.12 × 1.12 μm × μm

| Surface # | | Curvature Radius | | Thickness | | Material | Index | Abbe # | Focal length |
|---|---|---|---|---|---|---|---|---|---|
| 0 | Object | Plano | | Long distance | Close-up | | | | |
|   |        |       | | 10000.000 | 100.000 | | | | |
| 1 | Lens 1 | 1.663 | (ASP) | 0.674 | | Plastic | 1.544 | 55.9 | 2.84 |
| 2 |        | −18.277 | (ASP) | −0.008 | | | | | |
| 3 | Ape. Stop | Plano | | 0.058 | | | | | |
| 4 | Lens 2 | −14.260 | (ASP) | 0.300 | | Plastic | 1.634 | 23.8 | −6.46 |
| 5 |        | 5.788 | (ASP) | 0.508 | | | | | |
| 6 | Lens 3 | −3.244 | (ASP) | 0.332 | | Plastic | 1.634 | 23.8 | −11.03 |
| 7 |        | −6.291 | (ASP) | 0.255 | | | | | |
| 8 | Lens 4 | −3.154 | (ASP) | 0.960 | | Plastic | 1.544 | 55.9 | 1.69 |
| 9 |        | −0.789 | (ASP) | 0.184 | | | | | |
| 10 | Lens 5 | −4.482 | (ASP) | 0.400 | | Plastic | 1.530 | 55.8 | −1.72 |
| 11 |       | 1.183 | (ASP) | 0.700 | | | | | |
| 12 | IR-cut filter | Plano | | 0.300 | | Glass | 1.517 | 64.2 | — |
| 13 |              | Plano | | Long distance | Close-up | | | | |
|    |              |       | | 0.811 | 1.020 | | | | |
| 14 | Image | Plano | | — | | | | | |

Note:
Reference wavelength (d-line) is 587.6 nm.
V (mm) is the height of the imaging area of the image sensor (i.e. the shorter length of the imagines area).
H (mm) is the width of the imaging area of the image sensor (i.e. the longer length of the imaging area).
Pixel size (μm × μm) is the size of a single pixel on the imaging area of the image sensor.

TABLE 18

Aspheric Coefficients

| Surface # | 1 | 2 | 4 | 5 | 6 |
|---|---|---|---|---|---|
| k = | −8.2157E+00 | −5.0850E−17 | −5.0000E+01 | −2.3389E+01 | −2.3104E+01 |
| A4 = | 2.0908E−01 | −1.3926E−02 | 2.2828E−02 | 2.5670E−02 | −2.7698E−01 |
| A6 = | −1.8221E−01 | 4.7493E−02 | −3.2682E−02 | −5.6850E−02 | −1.3732E−01 |
| A8 = | 1.4495E−01 | −1.8645E−01 | 2.4848E−01 | 1.7988E−01 | 2.7969E−01 |
| A10 = | −8.5884E−02 | 2.5841E−01 | −6.6268E−01 | −2.8477E−01 | −3.2845E−01 |
| A12 = | 2.5244E−01 | −2.0432E−01 | 8.4226E−01 | 2.0324E−01 | 2.2470E−01 |
| A14 = | −1.4028E−02 | 6.1880E−02 | −3.9181E−01 | −3.1277E−02 | |

| Surface # | 7 | 8 | 9 | 10 | 11 |
|---|---|---|---|---|---|
| k = | −5.0407E−01 | 3.9702E+00 | −3.5395E+00 | −1.0954E+02 | −9.8912E+00 |
| A4 = | −1.1223E−01 | −1.9047E−03 | −1.2808E−01 | −2.0401E−02 | −5.7491E−02 |
| A6 = | −8.3955E−02 | 6.9341E−02 | 1.2266E−01 | −2.1899E−02 | 1.5929E−02 |
| A8 = | 1.2617E−01 | −1.6237E−01 | −9.6383E−02 | 8.6030E−03 | −4.9956E−03 |
| A10 = | −2.8510E−02 | 1.9591E−01 | 4.4485E−02 | −7.2193E−04 | 1.0502E−03 |
| A12 = | 1.0176E−02 | −1.0404E−01 | −9.5436E−03 | −1.1843E−04 | −1.2645E−04 |
| A14 = | | 2.1198E−02 | 5.3820E−04 | 1.7748E−05 | 6.3873E−06 |

In the single focus optical image capturing system according to the 9th embodiment, the definitions of f, Fno, HFOV, V2, V3, V4, CT4, CT5, R3, R4, R7, R8, f1, f2, f3, f4, f5, TVDi, TVDm, V, H, TTL, and ImgH are the same as those stated in the 1st embodiment with corresponding values for the 9th embodiment. Moreover, these parameters can be calculated from Table 17 and Table 18 as the following values and satisfy the following relationships:

| | | | |
|---|---|---|---|
| f (mm) | 4.47 | (|f/f4| + |f/f5|)/(|f/f1| + |f/f2| + |f/f3|) | 1.96 |
| Fno | 2.45 | |TVDi| (%) | 0.122 |
| HFOV (deg.) | 33.1 | |TVDm| (%) | 0.921 |
| (V2 + V4)/V3 | 3.35 | |TVDi − TVDm| (%) | 1.043 |
| CT4/CT5 | 2.40 | V (mm) | 3.557 |
| R4/R3 | −0.41 | H (mm) | 4.731 |
| (R7 − R8)/(R7 + R8) | 0.60 | TTL × f/ImgH (mm) | 8.123 |

10th Embodiment

Figure 10A:
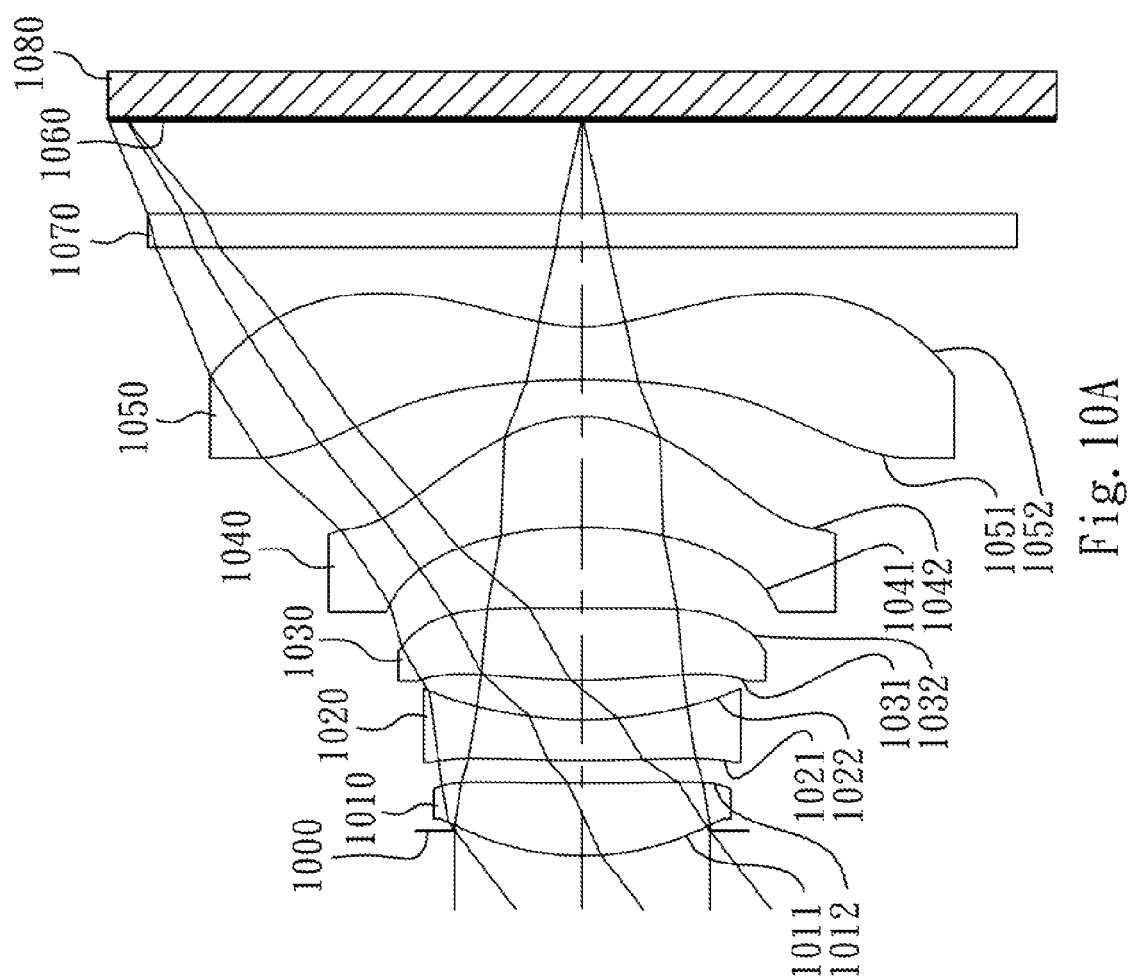
FIG. 10A is a schematic view of a single focus optical image capturing system according to the 10th embodiment of the present disclosure.
Figure 10B:
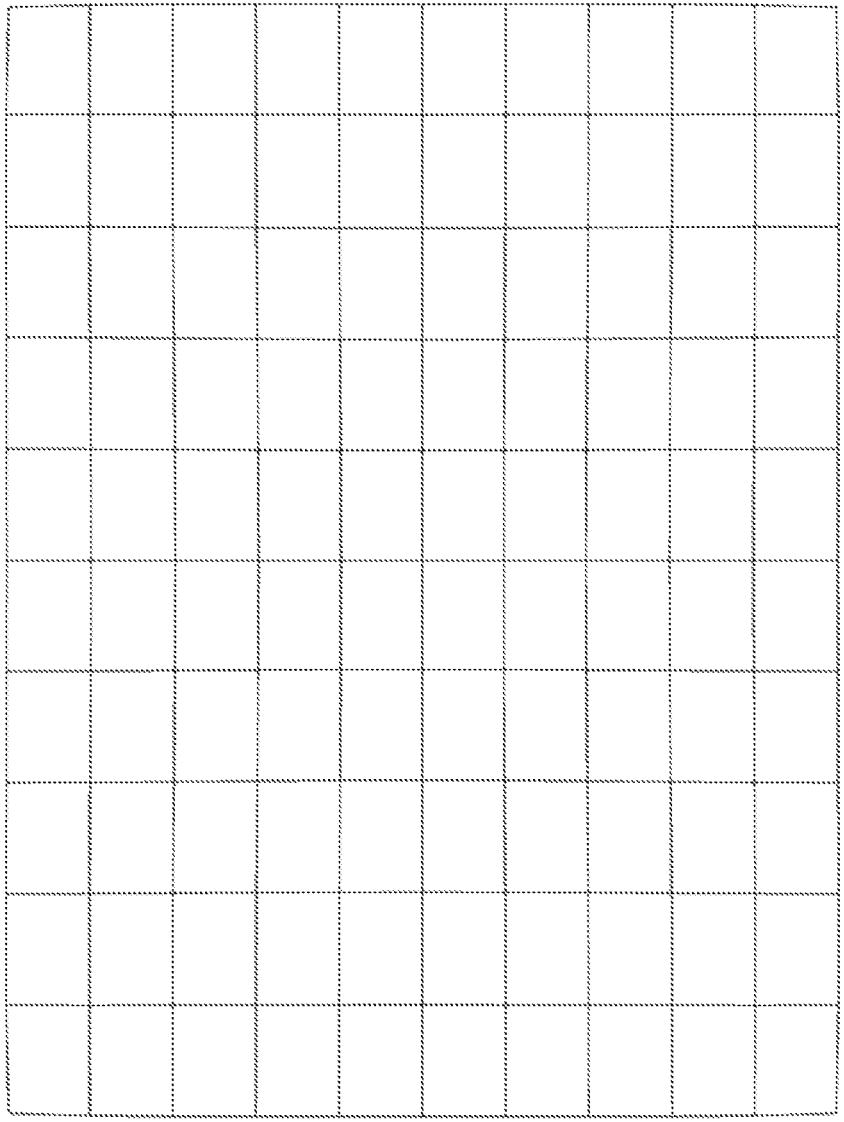
FIG. 10B shows a TV distortion for long distance photographing of the single focus optical image capturing system according to the 10th embodiment.
Figure 10C:
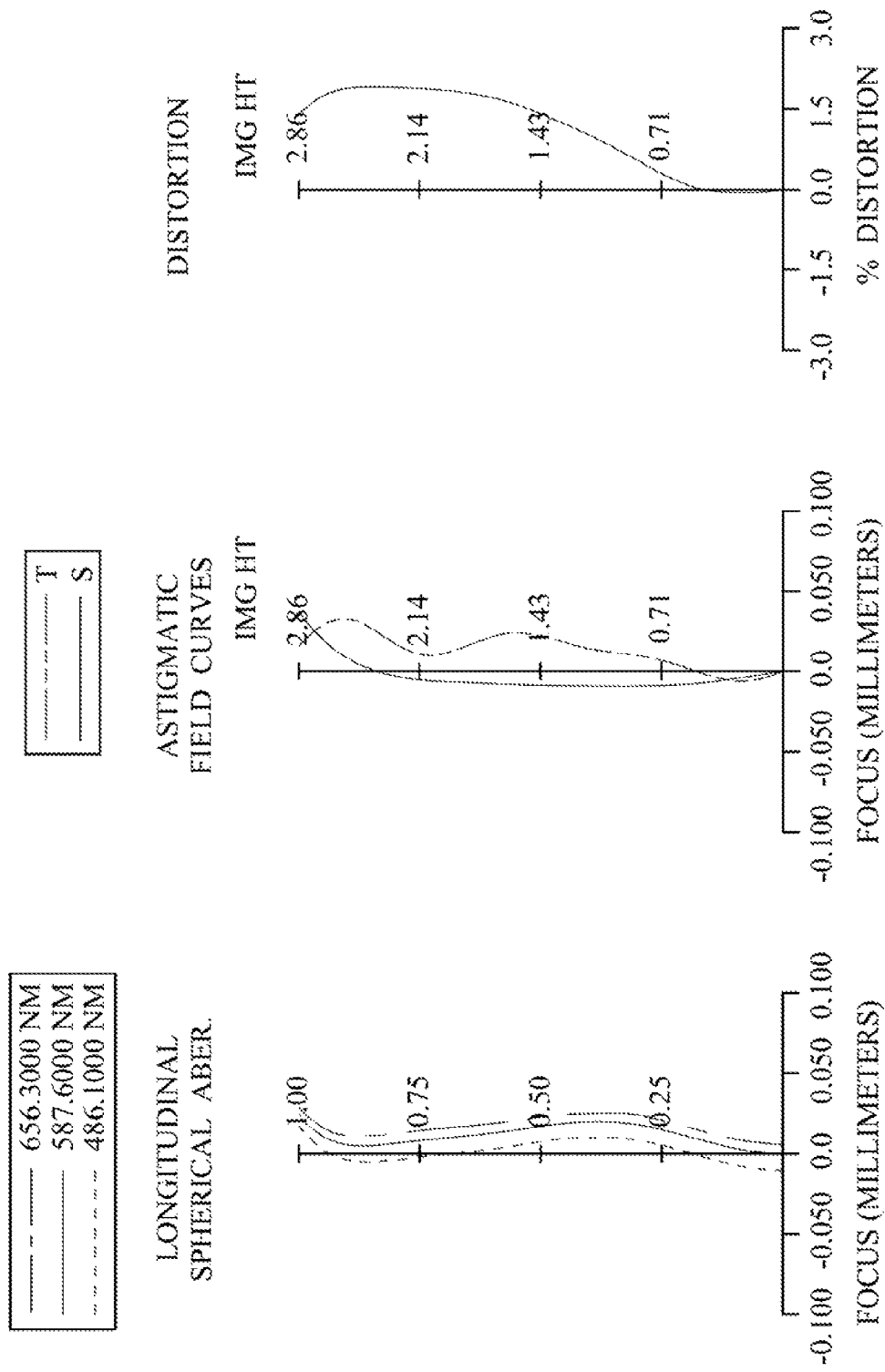
FIG. 10C shows spherical aberration curves, astigmatic field curves and a distortion curve for long distance photographing of the single focus optical image capturing system according to the 10th embodiment.
Figure 10D:
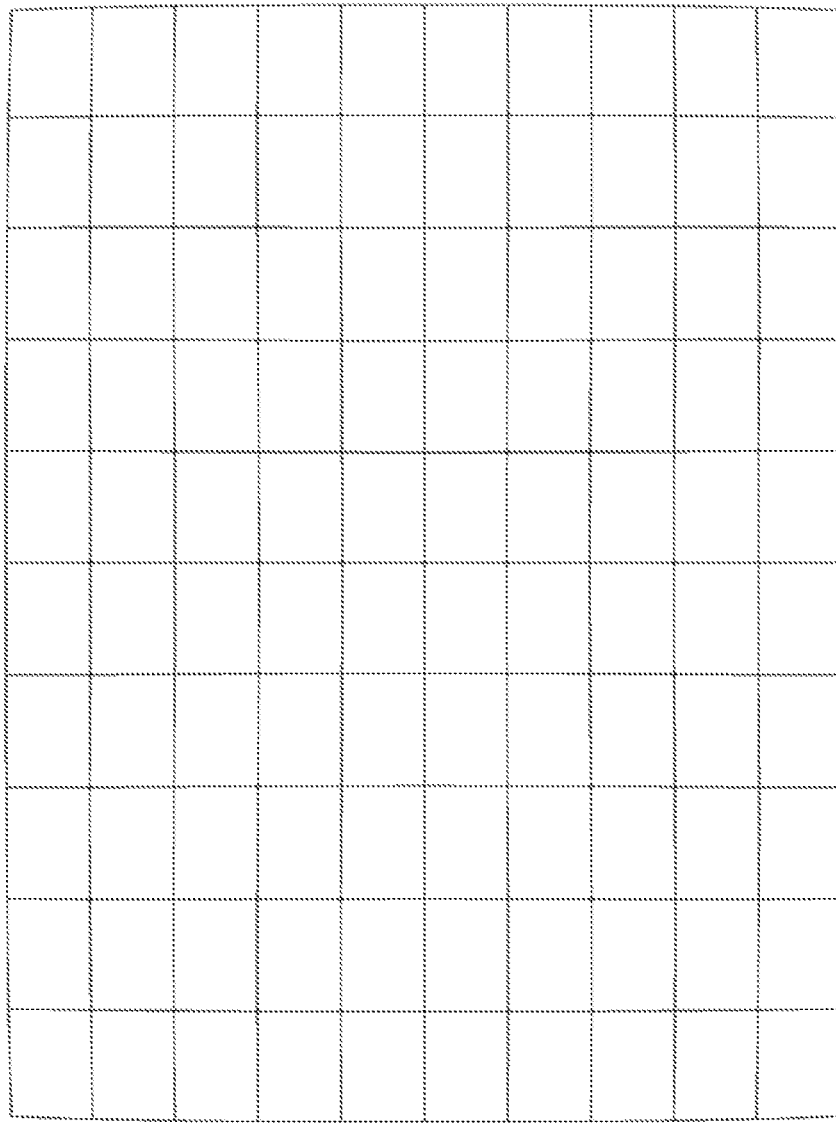
FIG. 10D shows a TV distortion for close-up photographing of the single focus optical image capturing system according to the 10th embodiment.
Figure 10F:
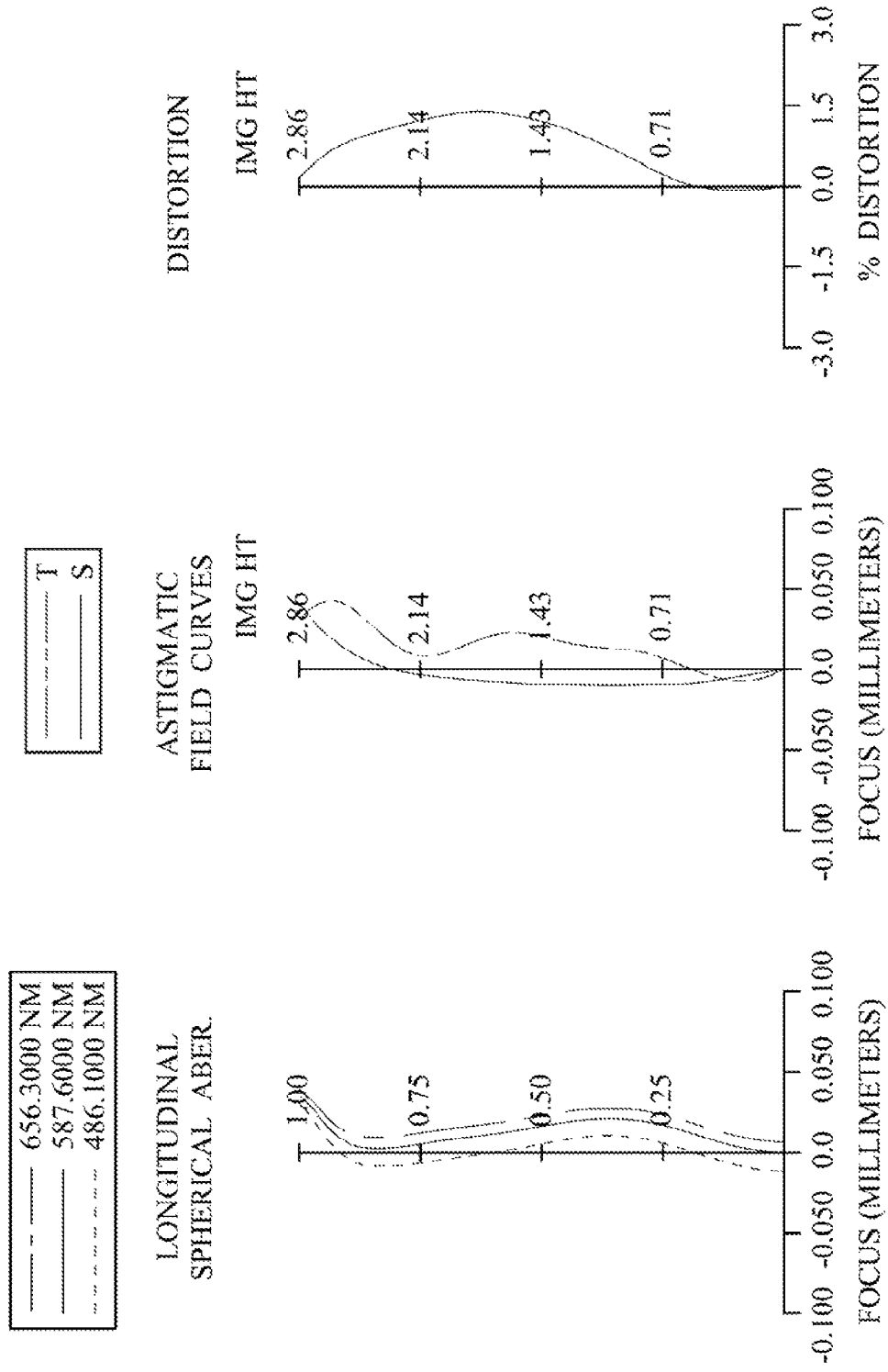
FIG. 10F shows spherical aberration curves, astigmatic field curves and a distortion curve for close-up photographing of the single focus optical image capturing system according to the 10th embodiment.

FIG. 10A is a schematic view of a single focus optical image capturing system according to the 10th embodiment of the present disclosure. FIG. 10B shows a TV distortion for long distance photographing of the single focus optical image capturing system according to the 10th embodiment. FIG. 10C shows spherical aberration curves, astigmatic field curves and a distortion curve for long distance photographing of the single focus optical image capturing system according to the 10th embodiment. FIG. 10D shows a TV distortion for close-up photographing of the single focus optical image capturing system according to the 10th embodiment. FIG. 10F shows spherical aberration curves, astigmatic field curves and a distortion curve for close-up photographing of the single focus optical image capturing system according to the 10th embodiment. In FIG. 10A, the single focus optical image capturing system includes, in order from an object side to an image side, an aperture stop 1000, a first lens element 1010, a second lens element 1020, a third lens element 1030, a fourth lens element 1040, a fifth lens element 1050, an IR-cut filter 1070, an image plane 1060, and an image sensor 1080.

The first lens element 1010 with positive refractive power has a convex object-side surface 1011 and a concave image-side surface 1012. The first lens element 1010 is made of plastic material and has the object-side surface 1011 and the image-side surface 1012 being aspheric.

The second lens element 1020 with negative refractive power has a convex object-side surface 1021 and a concave image-side surface 1022. The second lens element 1020 is made of plastic material and has the object-side surface 1021 and the image-side surface 1022 being aspheric.

The third lens element 1030 with positive refractive power has a convex object-side surface 1031 and a concave image-side surface 1032. The third lens element 1030 is made of plastic material and has the object-side surface 1031 and the image-side surface 1032 being aspheric.

The fourth lens element 1040 with positive refractive power has a concave object-side surface 1041 and a convex image-side surface 1042. The fourth lens element 1040 is made of plastic material and has the object-side surface 1041 and the image-side surface 1042 being aspheric.

The fifth lens element 1050 with negative refractive power has a concave object-side surface 1051 and a concave image-side surface 1052. The fifth lens element 1050 is made of plastic material and has the object-side surface 1051 and the image-side surface 1052 being aspheric. Furthermore, the fifth lens element 1050 has at least one inflection point on the image-side surface 1052 thereof.

The IR-cut filter 1070 made of glass material is located between the fifth lens element 1050 and the image plane 1060, and will not affect a focal length of the single focus optical image capturing system.

The detailed optical data of the 10th embodiment are shown in Table 19, and the aspheric surface data are shown in Table 20 below.

TABLE 19

10th Embodiment
f = 3.67 mm, Fno = 2.30, HFOV = 37.4 deg,
H = 4.570 mm, V = 3.427 mm, Resolution = 3264 × 2448, Pixel size = 1.4 × 1.4 μm × μm

| Surface # | | Curvature Radius | | Thickness | Material | Index | Abbe # | Focal length |
|---|---|---|---|---|---|---|---|---|
| 0 | Object | Plano | | Long distance | Close-up | | | |
| | | | | 10000.000 | 100.000 | | | |
| 1 | Ape. Stop | Plano | | −0.160 | | | | |
| 2 | Lens 1 | 1.705 | (ASP) | 0.456 | Plastic | 1.544 | 55.9 | 3.52 |
| 3 | | 14.129 | (ASP) | 0.143 | | | | |
| 4 | Lens 2 | 6.571 | (ASP) | 0.250 | Plastic | 1.640 | 23.3 | −4.87 |
| 5 | | 2.082 | (ASP) | 0.250 | | | | |
| 6 | Lens 3 | 3.372 | (ASP) | 0.453 | Plastic | 1.544 | 55.9 | 7.13 |
| 7 | | 24.498 | (ASP) | 0.506 | | | | |
| 8 | Lens 4 | −2.810 | (ASP) | 0.694 | Plastic | 1.544 | 55.9 | 1.81 |
| 9 | | −0.794 | (ASP) | 0.230 | | | | |
| 10 | Lens 5 | −5.637 | (ASP) | 0.328 | Plastic | 1.544 | 55.9 | −1.61 |
| 11 | | 1.059 | (ASP) | 0.500 | | | | |
| 12 | IR-cut filter | Plano | | 0.210 | Glass | 1.517 | 64.2 | — |
| 13 | | Plano | | Long distance | Close-up | | | |
| | | | | 0.594 | 0.734 | | | |
| 14 | Image | Plano | | — | | | | |

Note:
Reference wavelength (d-line) is 587.6 nm.
V (mm) is the height of the imaging area of the image sensor (i.e. the shorter length of the imaging area).
H (mm) is the width of the imaging area of the image sensor (i.e. the longer length of the imaging area).
Pixel size (μm × μm) is the size of a single pixel on the imaging area of the image sensor.

TABLE 20

Aspheric Coefficients

| Surface # | | | | | |
|---|---|---|---|---|---|
| | 2 | 3 | 4 | 5 | 6 |
| k = | 4.0468E−01 | −1.0000E+00 | −4.9702E+01 | −3.7352E+00 | −3.8491E+01 |
| A4 = | −2.7068E−02 | −1.1952E−01 | −3.0175E−01 | −2.8232E−01 | −9.7542E−02 |
| A6 = | 6.2377E−02 | 3.2896E−01 | 9.3511E−01 | 8.3812E−01 | 5.8127E−02 |
| A8 = | −1.9890E−01 | −4.5378E−01 | −1.4583E+00 | −1.0903E+00 | −9.1393E−02 |
| A10 = | 2.7472E−01 | 7.1794E−02 | 1.0298E+00 | 6.7605E−01 | 1.5705E−01 |
| A12 = | −1.7191E−01 | 2.1453E−01 | −3.3298E−01 | −1.6823E−01 | −1.8998E−01 |
| A14 = | −2.8832E−02 | −1.6955E−01 | 4.0319E−02 | 1.6355E−02 | 7.3006E−02 |

| Surface # | | | | | |
|---|---|---|---|---|---|
| | 7 | 8 | 9 | 10 | 11 |
| k = | −1.0000E+00 | −1.0665E+00 | −3.1447E+00 | −8.8362E+01 | −7.7358E+00 |
| A4 = | −1.2552E−01 | −1.1784E−01 | −1.2714E−01 | −7.0998E−02 | −8.9150E−02 |
| A6 = | 1.0985E−01 | 1.3087E−01 | 8.1474E−02 | 5.4265E−03 | 3.4976E−02 |
| A8 = | −2.9022E−01 | −1.4567E−01 | −3.0397E−02 | 3.5183E−03 | −1.2145E−02 |
| A10 = | 3.5344E−01 | 1.0782E−01 | 1.3963E−02 | −1.5988E−04 | 2.7162E−03 |
| A12 = | −2.5672E−01 | −6.3480E−02 | −5.1897E−04 | −9.2967E−05 | −3.4575E−04 |
| A14 = | 7.0650E−02 | 1.2316E−02 | −8.0506E−04 | 6.0446E−06 | 1.8442E−05 |

In the single focus optical image capturing system according to the 10th embodiment, the definitions of f, Fno HFOV, V2, V3, V4, CT4, CT5, R3, R4, R7, R8, f1, f2, f3, f4, f5, TVDi, TVDm, V, H, TTL, and ImgH are the same as those stated in the 1st embodiment with corresponding values for the 10th embodiment. Moreover, these parameters can be calculated from Table 19 and Table 20 as the following values and satisfy the following relationships:

| f (mm) | 3.67 | (|f/f4| + |f/f5|)/(|f/f1| + |f/f2| + |f/f3|) | 1.86 |
|---|---|---|---|
| Fno | 2.30 | |TVDi| (%) | 0.403 |
| HFOV (deg.) | 37.4 | |TVDm| (%) | 1.268 |
| (V2 + V4)/V3 | 1.42 | |TVDi − TVDm| (%) | 0.865 |
| CT4/CT5 | 2.12 | V (mm) | 3.427 |
| R4/R3 | 0.32 | H (mm) | 4.570 |
| (R7 − R8)/(R7 + R8) | 0.56 | TTL × f/ImgH (mm) | 5.842 |

It will be apparent to those skilled in the art that various modifications and variations can be made to the structure of the present disclosure without departing from the scope or spirit of the disclosure. In view of the foregoing, it is intended that the present disclosure cover modifications and variations of this invention provided they fall within the scope of the following claims.

What is claimed is:

1. A single focus optical image capturing system comprising, in order from an object side to an image side:
   a first lens element with positive refractive power having a convex object-side surface;
   second lens element having negative refractive power;
   a third lens element having refractive power;
   a fourth lens element with refractive power having an object-side surface and an image-side surface being aspheric; and
   a fifth lens element with refractive power having a concave image-side surface, wherein an object-side surface and the image-side surface of the fifth lens element are aspheric, and the fifth lens element has at least one inflection point on at least one of the object-side surface and the image-side surface thereof;
   wherein a TV distortion for close-up photographing of the single focus optical image capturing system is TVDm, a TV distortion for long distance photographing of the single focus optical image capturing system is TVDi, and the following relationships are satisfied:

|TVDi−TVDm|<1.5%;

|TVDi|<1.5%; and

|TVDm|<1.5%.

2. The single focus optical image capturing system of claim 1, wherein the TV distortion for close-up photographing of the single focus optical image capturing system is TVDm, the TV distortion for long distance photographing of the single focus optical image capturing system is TVDi, and the following relationship is satisfied:

|TVDi−TVDm|<1.0%.

3. The single focus optical image capturing system of claim 2, wherein the image-side surface of the fourth lens element is convex.

4. The single focus optical image capturing system of claim 3, wherein the TV distortion for close-up photographing of the single focus optical image capturing system is TVDm, the TV distortion for long distance photographing of the single focus optical image capturing system is TVDi, and the following relationships are satisfied:

|TVDi|<1.0%; and

|TVDm|<1.0%.

5. The single focus optical image capturing system of claim 4, wherein the TV distortion for long distance photographing of the single focus optical image capturing system is TVDi, and the following relationship is satisfied:

|TVDi|<0.5%.

6. The single focus optical image capturing system of claim 5, wherein the TV distortion for close-up photographing of the single focus optical image capturing system is TVDm, the TV distortion for long distance photographing of the single focus optical image capturing system is TVDi, and the following relationship is satisfied:

|TVDi−TVDm|<0.8%.

7. The single focus optical image capturing system of claim 3, wherein the object-side surface of the fourth lens element is concave.

8. The single focus optical image capturing system of claim 7, wherein an axial distance between the object-side surface of the first lens element and an image plane is TTL, a maximum image height of the single focus optical image capturing system is ImgH, a focal length of the single focus optical image capturing system is f, and the following relationship is satisfied:

5.0 mm<$TTL \times f/ImgH$<7.0 mm.

9. The single focus optical image capturing system of claim 8, wherein the axial distance between the object-side surface of the first lens element and the image plane is TTL, the maximum image height of the single focus optical image capturing system is ImgH, the focal length of the single focus optical image capturing system is f, and the following relationship is satisfied:

5.5 mm<$TTL \times f/ImgH$<6.5 mm.

10. The single focus optical image capturing system of claim 3, wherein the second lens element has a convex image-side surface.

11. The single focus optical image capturing system of claim 3, wherein the first lens element has a concave image-side surface.

12. The single focus optical image capturing system of claim 3, wherein the third lens element with negative refractive power has a convex image-side surface.

13. The single focus optical image capturing system of claim 3, wherein the fifth lens element with negative refractive power has the object-side surface being convex.

14. The single focus optical image capturing system of claim 3, further comprising:
an image sensor located on an image plane, wherein a height of an imaging area of the image sensor is V, a width of the imaging area of the image sensor is H, and the following relationships are satisfied:

3.0 mm<$V$<4.5 mm; and 4.0 mm<$H$<6.0 mm.

15. The single focus optical image capturing system of claim 3, wherein the fourth lens element has negative refractive power, a curvature radius of the object-side surface of the fourth lens element is R7, a curvature radius of the image-side surface of the fourth lens element is R8, and the following relationship is satisfied:

−0.35<$(R7-R8)/(R7+R8)$<0.

16. The single focus optical image capturing system of claim 15, wherein an Abbe number of the second lens element is V2, an Abbe number of the third lens element is V3, an Abbe number of the fourth lens element is V4, and the following relationship is satisfied:

0.7<$(V2+V4)/V3$<1.0.

17. The single focus optical image capturing system of claim 15, wherein a central thickness of the fourth lens element is CT4, a central thickness of the fifth lens element is CT5, and the following relationship is satisfied:

0.10<$CT4/CT5$<0.60.

18. A single focus optical image capturing system comprising, in order from an object side to an image side:
a first lens element with positive refractive power having a convex object-side surface;
a second lens element having negative refractive power;
a third lens element having refractive power;
a fourth lens element with refractive power having a concave object-side surface and a convex image-side surface, wherein the object-side surface and the image-side surface of the fourth lens element are aspheric; and
a fifth lens element with refractive power having a concave image-side surface, wherein an object-side surface and the image-side surface of the fifth lens element are aspheric, and the fifth lens element has at least one inflection point on at least one of the object-side surface and the image-side surface thereof;
wherein a TV distortion for close-up photographing of the single focus optical image capturing system is TVDm, a TV distortion for long distance photographing of the single focus optical image capturing system is TVDi, and the following relationship is satisfied:

$|TVDi-TVDm|$<1.0%.

19. The single focus optical image capturing system of claim 18, wherein the TV distortion for close-up photographing of the single focus optical image capturing system is TVDm, the TV distortion for long distance photographing of the single focus optical image capturing system is TVDi, and the following relationships are satisfied:

$|TVDi|$<1.0%; and $|TVDm|$<1.0%.

20. The single focus optical image capturing system of claim 19, wherein the third lens element has positive refractive power, and the fourth lens element has negative refractive power.

21. The single focus optical image capturing system of claim 20, wherein the second lens element has a concave image-side surface, a curvature radius of an object-side surface of the second lens element is R3, a curvature radius of the image-side surface of the second lens element is R4, and the following relationship is satisfied:

0.3<$R4/R3$<0.7.

22. The single focus optical image capturing system of claim 19, further comprising:
an image sensor located on an image plane, wherein a height of an imaging area of the image sensor is V, a width of the imaging area of the image sensor is H, the object-side surface of the fifth lens element is convex, and the following relationships are satisfied:

3.0 mm<$V$<4.5 mm; and 4.0 mm<$H$<6.0 mm.

23. The single focus optical image capturing system of claim 19, wherein a focal length of the single focus optical image capturing system is f, a focal length of the first lens element is f1, a focal length of the second lens element is f2, a focal length of the third lens element is f3, a focal length of the fourth lens element is f4, a focal length of the fifth lens element is f5, and the following relationship is satisfied:

0.1<$(|f/f4|+|f/f5|)/(|f/f1|+|f/f2|+|f/f3|)$<0.4.

24. The single focus optical image capturing system of claim 19, wherein a central thickness of the fourth lens element is CT4, a central thickness of the fifth lens element is CT5, and the following relationship is satisfied:

0.10<$CT4/CT5$<0.60.

25. The single focus optical image capturing system of claim 19, wherein an Abbe number of the second lens element is V2, an Abbe number of the third lens element is V3, an Abbe number of the fourth lens element is V4, and the following relationship is satisfied:

$0.7 < (V2+V4)/V3 < 1.0$.

* * * * *